United States Patent
Minoura et al.

[11] Patent Number: 6,108,064
[45] Date of Patent: Aug. 22, 2000

[54] REFLECTIVE-TYPE LIQUID CRYSTAL DISPLAY DEVICE INCLUDING A SINGLE POLARIZER PLATE

[75] Inventors: Kiyoshi Minoura; Masayuki Okamoto; Seiichi Mitsui, all of Kashiwa, Japan

[73] Assignee: Sharp Kabushiki Kaisha, Osaka, Japan

[21] Appl. No.: 09/186,640

[22] Filed: Nov. 6, 1998

[30] Foreign Application Priority Data

| | | | |
|---|---|---|---|
| Nov. 6, 1997 | [JP] | Japan | 9-304255 |
| Jun. 29, 1998 | [JP] | Japan | 10-181731 |
| Jul. 27, 1998 | [JP] | Japan | 10-2101145 |

[51] Int. Cl.$^7$ .................................................. G02F 1/1337
[52] U.S. Cl. ........................... 349/130; 349/113; 349/117
[58] Field of Search .................................... 349/130, 131, 349/113, 117, 118, 119

[56] References Cited

U.S. PATENT DOCUMENTS

| | | | |
|---|---|---|---|
| 3,914,022 | 10/1975 | Kashnow | 349/130 |
| 3,960,438 | 6/1976 | Bonne et al. . | |
| 4,492,432 | 1/1985 | Kaufmann et al. . | |
| 4,701,028 | 10/1987 | Clerc et al. . | |
| 5,179,456 | 1/1993 | Aizawa et al. | 359/73 |
| 5,220,444 | 6/1993 | Mitsui et al. . | |
| 5,576,860 | 11/1996 | Nakamura et al. | 349/113 |
| 5,684,551 | 11/1997 | Nakamura et al. . | |
| 5,691,791 | 11/1997 | Nakamura et al. . | |
| 5,847,789 | 12/1998 | Nakamura et al. . | |

FOREIGN PATENT DOCUMENTS

| | | |
|---|---|---|
| 5-127822A | 5/1993 | Japan . |
| 6-337421A | 12/1994 | Japan . |
| 7-064089A | 3/1995 | Japan . |

OTHER PUBLICATIONS 32.1: High–Brightness Projection Displays Using Mixed–Mode Twisted–Nematic Liquid–Crystal Cells. S.–T. Wu, C.–S. Wu, Hughes Research Laboratories, Malibu, CA. SID 96 Digest, pp. 763–766.

LP–F: A New Reflective Display with High Multiplexibility and Gray Scale Capability, Hidehiro seki and Motomitsu Itoh. Hachinohe Institute of Technology, Aomori 031, Japan. Euro Display '96, pp. 464–467.

*Primary Examiner*—James A. Dudek

[57] ABSTRACT

A reflective-type liquid crystal display device in accordance with the present invention includes: a first substrate including a light-reflective electrode; a transparent second substrate including a transparent electrode; a nematic liquid crystal layer, sandwiched between the first and second substrates, having negative dielectric anisotropy, and twisting with application of a voltage; a plurality of optical retardation compensation plates disposed on a light-entering side of the second substrate; and a polarizer plate disposed on the light-entering side of the second substrate, wherein surfaces of the first and second substrates undergo substantially vertical alignment processing, and liquid crystal has a natural pitch p, a layer thickness d, and a refractive index differece $\Delta n$ with respect to characteristic polarization thereof selected so as to satisfy $0<|d/p|<1$ and $135 \text{ nm} \leq \Delta n \times d \leq 1200 \text{ nm}$. Moreover, liquid crystal molecules on a surface of at least one of the first and second substrates tilt 3° to 30° with respect to a normal direction of that substrate. With this arrangement, a color-display-capable reflective-type liquid crystal display device with high contrast and excellent viewing angle characteristics can be obtained. Especially, such a reflective-type liquid crystal display device could be suitably applied to a liquid crystal display device with an integral pressure sensitive input device, provided with a touch panel.

35 Claims, 49 Drawing Sheets

NO VOLTAGE APPLIED | VOLTAGE APPLIED

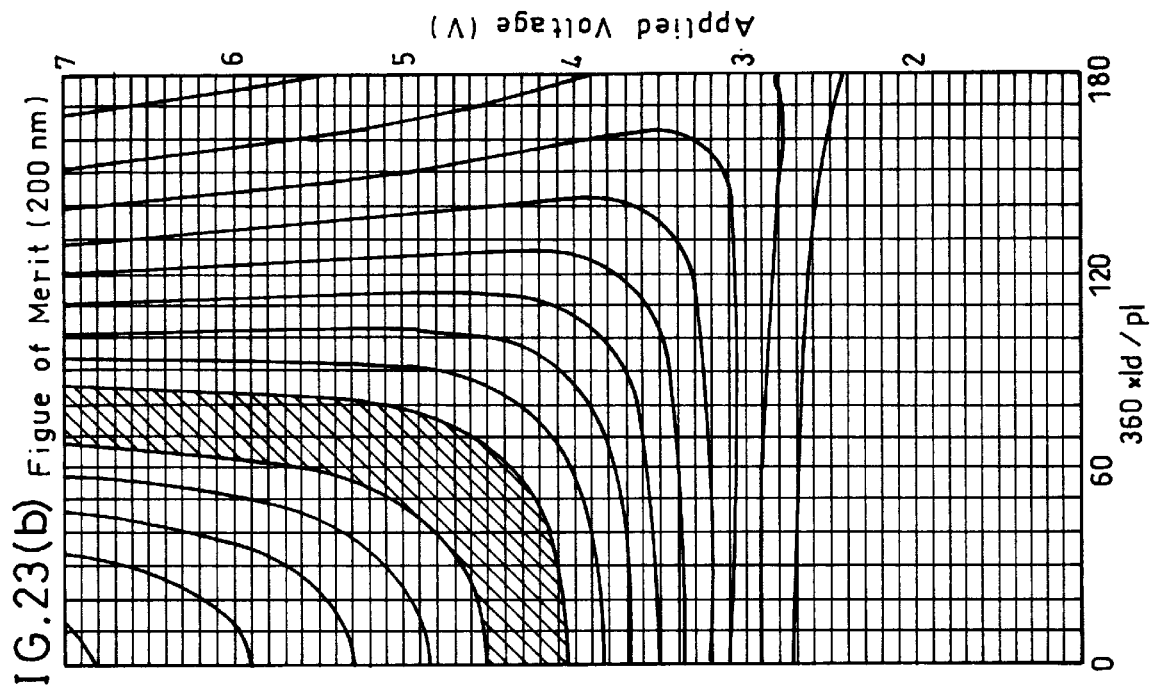
FIG.23(a) Figure of Merit (350 nm)
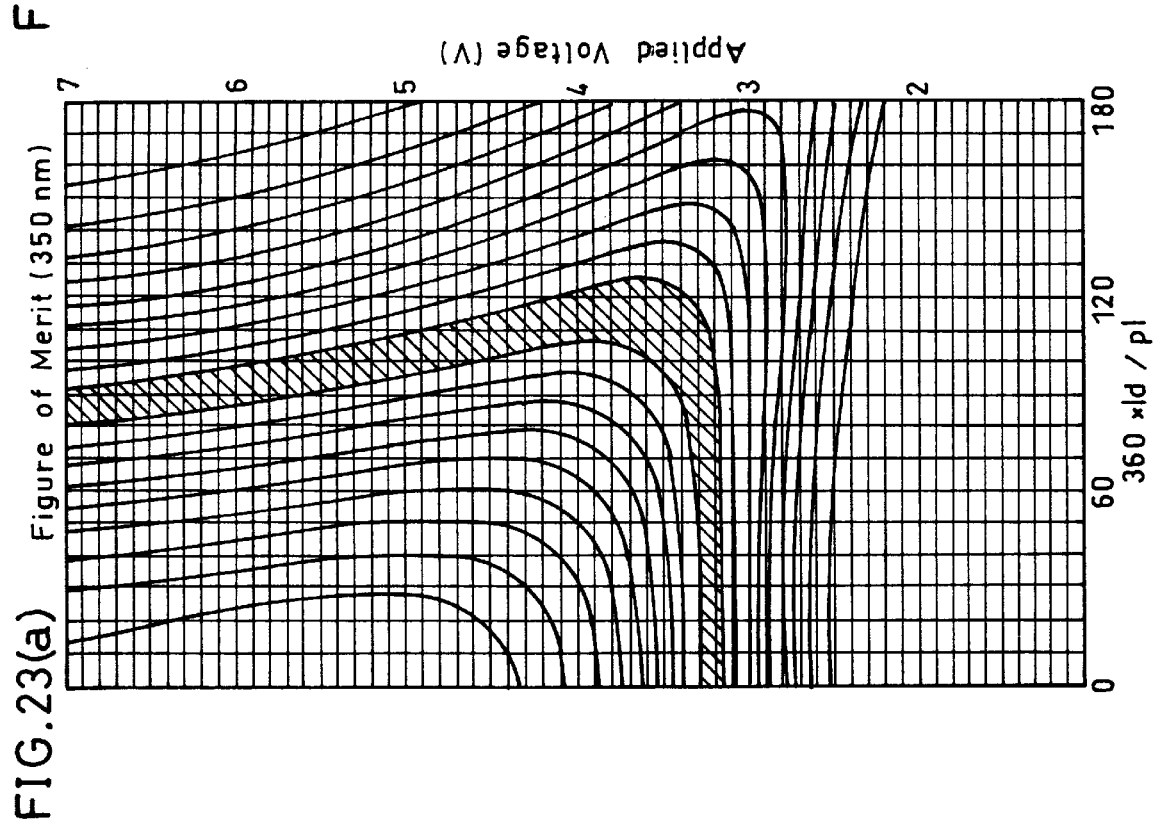
FIG.23(b) Figure of Merit (200 nm)

NO VOLTAGE APPLIED    VOLTAGE APPLIED

2
REFLECTIVE-TYPE LIQUID CRYSTAL DISPLAY DEVICE INCLUDING A SINGLE POLARIZER PLATE

FIELD OF THE INVENTION

The present invention relates to a reflective-type liquid crystal display device having no direct-view-type backlight for use with office automation (OA) equipment, such as word processors and notebook personal computers, various visual displays, and game machines.

BACKGROUND OF THE INVENTION

At present, liquid crystal display devices have found varieties of applications as a thin light color display. Among the color liquid crystal display devices, transparent liquid crystal display devices, equipped with a light source at the back, are particularly popular and their use is still expanding.

A reflective-type liquid crystal display device, since adopting a different display method from the transparent liquid crystal display device with no backlight, can save the power consumption for the light source. In the reflective-type liquid crystal display device, the space and weight for the backlight can be spared. In other words, the reflective-type liquid crystal display device consumes less power as a whole and can obtain enough power from even a smaller battery, being suitable for devices whose priority is light weight and thin size. If the reflective-type liquid crystal display device is designed having the same size or weight as the transparent liquid crystal display device, the reflective-type liquid crystal display device can accommodate a larger battery, and therefore operate much longer than the transparent liquid crystal display device.

Another feature of the reflective-type liquid crystal display device can be found in the contrast characteristics of the display surface. The light emitting display, for example a Cathode Ray Tube (CRT), has a greatly decreased contrast ratio in the daylight. A transparent liquid crystal display device having undergone low reflection processing also inevitably suffers from a largely decreased contrast ratio when the surrounding light, for example, direct sun light, is too strong in comparison to the display light. By contrast, the reflective-type liquid crystal display device provides display light proportional to the amount of surrounding light, being especially suitable for apparatuses that are often used outdoors, such as portable information terminals, digital cameras, and portable video cameras.

Despite very promising fields of applications as discussed above, no reflective-type liquid crystal display device has been successfully made so far with satisfactory operability due to insufficient performance regarding the contrast ratio, reflectance, full color display, and compatibility with high definition display and animation.

The following description will explain the reflective-type liquid crystal display device in more detail.

A conventional TN (twisted nematic) liquid crystal display device, including two polarizer plates, boasts an excellent performance in contrast ratio and viewing angle dependence, but inevitably has a low reflectance. Moreover, in the TN liquid crystal display device, since the liquid crystal modulation layer and the light-reflective layer are distanced by the thickness of a substrate and other components, there occurs a difference in the optical path when the incident light enters and reflects, causing a parallax.

A transparent liquid crystal display device typically displays colors with an arrangement (display mode) including a combination of a single liquid crystal modulation layer and a color filter that is painted in color such that neighboring pixels provide color elements and is arranged such that the neighboring pixels act s display units. However, if that display mode is applied to the reflective-type liquid crystal display device and light travels along a path that inclines with respect to the normal direction of the display surface, there is a possibility that the incident light and the reflected light, when travelling through the color filter, pass through different color elements. For these reasons, the application of the display mode to the reflective-type liquid crystal display device is not suitable for high resolution and fidelity in color, and the reflective color display using the display mode has not yet commercialized.

Meanwhile, a Guest-Host liquid crystal display device (hereinafter, will be referred to simply as a GH) using no or only one polarizer plate and containing dye in liquid crystal has been developed. However, the GH lacks reliability due to the addition of dye in the liquid crystal, and fails to offer a high contrast ratio due to a low dichroism of the dye. Especially, in color display using a color filter, color purity drops greatly due to insufficient contrast, and therefore a color filter having a high color purity needs be combined. The use of a color filter with high color purity, however, causes a decrease in brightness and erases off the advantage of this method that the high brightness is achieved without a polarizer plate.

This is the background leading to the development of liquid crystal display devices using a single polarizer plate (hereinafter, will be referred to as a single polarizer plate method) that is expected to achieve high resolution and high contrast display. Among such liquid crystal display devices, the largest number of disclosures are made on those combined with a quarter-wave plate that are expected to realize high contrast.

Japanese Laid-Open Patent Application No. 55-48733/1980 (Tokukaisho 55-48733/1980) discloses an example of such a liquid crystal display device: specifically, a reflective TN-method (45°-twisted) liquid crystal display device using one polarizer plate and a quarter-wave plate. This prior art, using a 45°-twisted liquid crystal layer and controlling the electric field applied across the liquid crystal layer, displays black and white by effecting two states in which the polarization plane of the incident linearly polarized light into the quarter-wave plate is parallel and twisted by 45°, respectively, to the optic axis of the quarter-wave plate. The liquid crystal cell includes a polarizer, a 45°-twisted liquid crystal layer, a quarter-wave plate, and a reflective plate in sequent from the light entering side.

U.S. Pat. No. 4,701,028 (Clerc et al.) discloses a reflective-type liquid crystal display device including a combination of a single polarizer plate, a quarter-wave plate, and a vertically aligned liquid crystal cell. Japanese Laid-Open Patent Application No. 6-337421/1994 (Tokukaihei 6-337421/1994) discloses a reflective-type liquid crystal display device including a combination of a single polarizer plate, a quarter-wave plate, and a bend vertically aligned liquid crystal cell. *A New Reflective Display with High Multiplexibility and Gray Scale Capability* (*Euro Display* '96, page 464) also discloses a reflective-type liquid crystal display device including a combination of a single polarizer plate, a quarter-wave plate, and a vertically aligned liquid crystal cell.

*SID 96 Digest* (page 763) discloses an example of an application to a reflective projection of a display mode in which chiral-dopant-containing liquid crystal having negative dielectric anisotropy is sandwiched between upper and lower substrates having undergone vertical alignment processing.

The following description describes a display operation of the single polarizer plate method disclosed in above Japanese Laid-Open Patent Application No. 6-337421/1994.

The polarizer plate provided to the liquid crystal display device cell on its light entering side allows only the incident light and outgoing light polarized linearly in a certain direction to pass therethrough and blocks the light is polarized linearly in all the other directions. If no electric field is applied across the liquid crystal layer, the incident light having passed through the polarizer plate is converted into circularly polarized light by an optical retardation compensation plate such as a $\lambda/4$ plate (quarter-wave plate), enters the liquid crystal layer, passes through the vertically or substantially vertically aligned liquid crystal layer, and, without any further conversion or change, reaches a reflective plate. The light having reached the reflective plate is converted into circularly polarized light of reverse rotation by the reflective plate, passes through the liquid crystal layer, the $\lambda/4$ plate and other components in reverse order from the incident light, is converted to light that is linearly polarized vertical to the linearly polarized incident light. The dark state is thus effected.

In addition, if the liquid crystal inclines upon application of an electric field across the liquid crystal layer to realize a phase difference of certain conditions, the incident circularly polarized light having passed through the polarizer plate and $\lambda/4$ plate, is converted into linearly polarized light, becomes a linearly polarized line at the reflective plate, resulting in out-going linearly polarized light having the same polarization direction as the linearly polarized light, at the polarizer plate, which is the incident light for the display device having passed through the polarizer plate. The bright state is thus effected.

In other words, regarding the incident and outgoing light vertical to the liquid crystal display device, it is a public knowledge that the necessary and sufficient condition for realizing the bright state is that the light is polarized linearly in an arbitrary direction when it is reflected by the reflective plate, and that the necessary and sufficient condition for realizing the dark state is that the light is polarized circularly leftwards or rightwards when it is reflected by the reflective plate.

In addition, there are problems as follows with the vertical alignment liquid crystal display device described in U.S. Pat. No. 4,701,028, U.S. Pat. No. 4,492,432, Japanese Laid-Open Patent Application No. 6-337421/1994, and *A New Reflective Display wit High Multiplexibility and Gray Scale Capability* (*Euro Display '96*).

First, since the directions of the vertical alignment, especially those of the tilted vertical alignment, are parallel between the upper and lower substrates, the liquid crystal inclines in one direction and the viewing angle dependence on the display surface is extremely large. Secondly, since the reflectance has a large wavelength dependence, there occurs undesirable coloring.

As for the display mode described in previously mentioned *SID 96 Digest* (page 763), no quarter-wave plate is used, and a linearly polarized light is guided to enter the display by a polarized beam splitter, with no consideration being paid to an application thereof to a direct view type. No details are given about the setting of $|d/p|$ where p is the natural pitch of the liquid crystal and d is the cell thickness, and optimum $\Delta n \times d$ where d is the cell thickness and optimum $\Delta n$ is defined as ne-no.

As for the portable information device, a touch panel (pressure sensitive input device) is a useful input tool as well as conventional keyboards. Especially, to input languages that require the conversion of data fed through a keyboard such as the Japanese language, the touch panel acts not only as a pointing device, but also, more and more generally, as a direct input device for handwritten characters thanks to the enhancement of information processing capability and the development of software. This input method is realized by placing an input device before a display.

Since the reflective-type liquid crystal display device utilizes the reflected light to realize display, the touch panel cannot impair display performed by the reflective-type liquid crystal display device placed thereunder. Japanese Laid-Open Patent Application No. 5-127822/1993 (Tokukaihei 5-127822/1993) discloses that the low reflection processing is done by overlapping a quarter-wave plate and a polarizer plate over a touch panel.

However, the liquid crystal display device disclosed in Japanese Laid-Open Patent Application No. 5-548733/1980 needs a quarter-wave plate disposed between the liquid crystal layer and the reflective plate; therefore basically it is difficult to form a reflective film on an inner side of the liquid crystal cells and the liquid crystal display device is not suitable for high resolution, high fidelity display.

In addition, even if a satisfactory level of performance has been successfully realized to be commercialized as a reflective-type liquid crystal display device, the visibility deteriorates greatly when used with a touch panel.

The deterioration in visibility of a transparent liquid crystal display device and other illumination-type displays used with a touch panel can be easily solved by removing, or changing the direction of, the glare image due to the light source (e.g. a light on the ceiling) that is a primary cause for the light reflected by the touch panel. However, in the reflective-type liquid crystal display device, the light source, although causing the light reflected by the touch panel, is the display light source for the display device as well. So the above solution is not applicable.

Therefore, solving the problem of poor visibility is the key to the realization of a useful low-power-consuming portable information device as well as to the realization of a reflective-type liquid crystal display device. The arrangement of a touch panel disclosed in Japanese Laid-Open Patent Application No. 5-127822/1993 is advantageous in that the combination of the polarizer plate at the quarter-wave plate prevents reflection, but an ordinary quarter-wave plate inevitably worsens visibility at certain wavelengths in the visible region of the spectrum.

If the display device (e.g. a white-tailor-type Guest Host liquid crystal display device with pigment added to the 360°-twisted liquid crystal) with practically negligible polarization characteristics is used beneath the touch panel, the reflection efficiency takes a half of the value obtained when no touch panel is used, due to transparency of the polarizer plate before the touch panel.

If the display beneath the touch panel uses linearly polarized light to perform display (e.g., TN and STN liquid crystal display devices having another polarizer plate between the touch panel and the liquid crystal cell), the reflection efficiency takes a half of the value obtained when no touch panel is used. In addition, since the phase difference of the quarter-wave plate depends on the wavelength of light, and the quarter-wave plate is sandwiched by the polarizer plates, tones are changed.

In any of the above cases, the brightness is not satisfactory, the touch panel cannot be suitably combined with a reflective-type liquid crystal display device with no means to improve brightness, such as a backlight. In other words, the touch panel disclosed in Japanese Laid-Open Patent Application No. 5-127822/1993 raises a need for a further improvement of the reflection prevention function, and the Patent Application dose not disclose a suitable arrangement to utilize the external light entering the touch panel for the reflective-type liquid crystal.

Typically, the present liquid crystal display device adopts a planar alignment mode where liquid crystal molecules are aligned parallel to the substrate when no voltage is applied.

On the other hand, a vertical alignment mode where liquid crystal molecules are aligned vertical to the substrate when no voltage is applied is adoptable to perform display. When a liquid crystal display device operates in a so-called normally black mode, in which dark display is effected using the vertical alignment when no voltage is applied across the liquid crystal layer, a darker and better black display can be effected in comparison to the planar alignment mode, and therefore the display contrast is improved. Since the liquid crystal layer does not cause birefringence with light transmitted in the normal direction of the liquid crystal layer through the liquid crystal layer when no voltage is applied across the liquid crystal layer, the normally black mode has a characteristic that the arbitrariness in the liquid crystal layer thickness (liquid crystal cell gap) is greater.

In other words, in this case, the liquid crystal layer thickness can be larger than the conventional planar alignment mode, the margin is wider for variations in the cell gap, and in any case good black display becomes possible. It is further known that if vertical alignment normally black mode is used, there is little negative effect from light leaking due to spacer beads for maintaining the cell gap of the liquid crystal layer.

Despite the characteristics described above, it has been considered that the vertical alignment mode is difficult to realize a uniform alignment state and can find few applications in industry. Especially, it has been considered that the vertical alignment mode is difficult to effect stable alignment when an electric field is applied across the liquid crystal layer and the alignment of the liquid crystal layer molecules is deformed from the vertical direction.

Recent publications including *Enclosure Electrode Method* (Japanese Laid-Open Patent Application No. 7-64089/1995 [Tokukaihei 7-64089/1995]) and *Multidomain Method* (Nikkei Microdevice, January 1998 Issue, page 136) disclose that a useful method to provide a solution to this problem and effect a vertical alignment mode in an industrially more stable manner is to change the shape of the substrate by a method of changing the direction of the electric field or an insulating structure within an area of approximately one pixel of a display.

Methods to slightly incline (tilt) the initial liquid crystal alignment with respect to the normal direction of the substrate using a rubbing method (Japanese Laid-Open Patent Application No. 62-299814/1987 [Tokukaisho 62-299814/1987]) or an photo-induced alignment method (*Control of Liquid Crystal Alignment Using an Optically Active Polymer Film*, by Mr. Yasushi IIMURA, Tokyo University of Agriculture and Technology, First JLCS-ALCOM Joint Conference) are disclosed as means to obtain uniform alignment with respect to the vertical alignment over the entire panel when voltage is applied. It is expected that the methods will provide other solutions for the problem than the creation of microdomains with the previously mentioned methods.

However, the enclosure electrode method and the multi-domain method are needed to make the upper and lower substrates sandwiching the liquid crystal layer in a precise and complex structure, resulting in an increased number of manufacturing processes, and inevitably the need to make a domain having a period of repetition equal to the size of a pixel. This means that the period of repetition of an insulating component or the structure of an enclosure electrode that determine the period of repetition of the domain cannot be designed freely due to the need to effect stable alignment, and should be designed to fall in a certain range.

The size of the pixel, determined by the displayed content, the size of the displayed image, and the display capacity, ranges from the minimum value of about $10 \mu m$ to the maximum value of about 1mm, the former being a hundred times the latter. The shape of the pixel also varies greatly. However, there is no report on whether the period of repetition of the domain is effective with the hundred-time-wide range and various pixel shapes, and it is not yet confirmed whether the period of repetition of the domain is applicable to all the liquid crystal display devices adopting vertical alignment. Moreover, there is a structure of an insulating body provided to, or inside of, the electrodes of both substrates, which reduces the voltage applied across the liquid crystal layer and therefore increases the driving voltage.

As described so far, since there are problems to be solved to achieve a stable vertical alignment through the electrode structure or substrate structure, it is considered that the above-mentioned rubbing and photo-induced alignment methods that are free from such problems are preferable. However, as for these methods, there is no specific description on the conditions of the tilt angle of the liquid crystal molecules with respect to the normal direction of the substrate, no insight is obtained about to what extent the alignment should be inclined to take effect.

Accordingly, the inventors of the present invention have diligently worked and sorted out specifically that a small tilt angle leads to three problems.

First when an electric field is applied to effect display with a liquid crystal display device adopting a vertical alignment and a small tilt angle, a disturbance in liquid crystal alignment properties due to application of an external stimulus, such as pressure, to the substrate results in a persistent alignment disturbance or in an alignment defect such as a domain wall. This is an especially serious problem to hand-writing input utilizing a touch panel or another device that is useful input device for portable information devices.

Secondly a small tilt angle results in the optical transparency and reflectance showing slow response and change with the application of an electric field.

Thirdly a small tilt angle results in an increased driving voltage in comparison to a large tilt angle.

SUMMARY OF THE INVENTION

An object of the present invention is to offer a full color reflective-type liquid crystal display device having a high contrast ratio and an excellent viewing angle characteristics.

The reflective-type liquid crystal display device in accordance with the present invention is composed of:
  a first substrate including a light-reflective electrode;
  a transparent second substrate including a transparent electrode;
  a nematic liquid crystal layer, sandwiched between the first and second substrates, having negative dielectric anisotropy, and twisting with application of a voltage;

a plurality of optical retardation compensation plates disposed on a light-entering side of the second substrate; and a polarizer plate disposed on the light-entering side of the second substrate, wherein surfaces, of the first and second substrates, that are in contact with the liquid crystal layer undergo substantially vertical alignment processing, and liquid crystal has a natural pitch p, a layer thickness d, and a refractive index difference $\Delta n$ with respect to characteristic polarization selected thereof so as to satisfy $0 < |d/p| < 1$ and $135 \text{ nm} \leq \Delta n \times d \leq 1200 \text{ nm}$.

With the arrangement, the reflective-type liquid crystal display device can effect good dark display when no voltage is applied and good bright display when a voltage is applied. In other words, the viewing angle dependence can be improved by such an arrangement that the liquid crystal layer has a good vertical alignment when no voltage is applied and has an inclined and twisted alignment when a voltage is applied.

In addition, owing to the setting of $\Delta n \times d$ and $|d/p|$ of the liquid crystal layer to special values, the reflective-type liquid crystal display device can effect a good bright state for a wide range of wavelengths, thus effecting good white display. Here, the inventors specify that the lower limit for the retardation value of the liquid crystal layer is 135 nm. This is because when the mean wavelength of the visible region of the spectrum is presumably 540 nm, the retardation for realizing good bright display, i.e. the lowest $\Delta n \times d$ at which the liquid crystal layer is equipped with an optical capability to convert incident circularly polarized light into linearly polarized light at a reflective plate, is 135 nm, a value one-fourth the mean wavelength, in the foregoing range of $|d/p|$.

Moreover, preferably, by specifying the natural pitch p and the layer thickness d of the liquid crystal to satisfy $\frac{1}{6} < |d/p| < 1$, the reflective-type liquid crystal display device can effect good display with small wavelength dependence.

Moreover, the reflective-type liquid crystal display device in accordance with the present invention is composed of:

a first substrate including a light-reflective electrode;

a transparent second substrate including a transparent electrode;

a nematic liquid crystal layer, sandwiched between the first and second substrates, having negative dielectric anisotropy, and inclining and twisting with application of a voltage;

a plurality of optical retardation compensation plates disposed on a light-entering side of the second substrate; and a polarizer plate disposed on the light-entering side of the second substrate, wherein surfaces, of the first and second substrates, that are in contact with the liquid crystal layer undergo substantially vertical alignment processing, and liquid crystal molecules on a surface of at least one of the first and second substrates tilt 3° to 30° with respect to a normal direction of that substrate.

The arrangement prevents a liquid crystal alignment disturbance caused by an external stimulus, such as pressure applied to the substrate from causing a display defect. Thus it realizes a highly responsive liquid crystal display device having a low driving voltage utilizing a vertical alignment mode. This makes the liquid crystal display device in accordance with the present invention have an improved display quality in a use in real environment, which can be suitably applied to a liquid crystal display device integrating a pressure sensitive input device, which is suitably applied to electronic devices such as personal computers and portable information terminal devices.

For a fuller understanding of the nature and advantages of the invention, reference should be made to the ensuing detailed description taken in conjunction with the accompanying drawings.

BRIEF DESCRIPTION OF THE DRAWINGS

FIGS. 23(a) and 23(b) are drawings showing an evaluative function (figure of merit [FOM]) as a contour map in a space defined by the applied voltage that is a driving condition for the liquid crystal layer and 360×|d/p| that shows the degree of twist of liquid crystal, with Δn×d at 350 nm and 200 nm respectively.

DESCRIPTION OF THE EMBODIMENTS

The following will explain an embodiment of the present invention.

Figure 1:
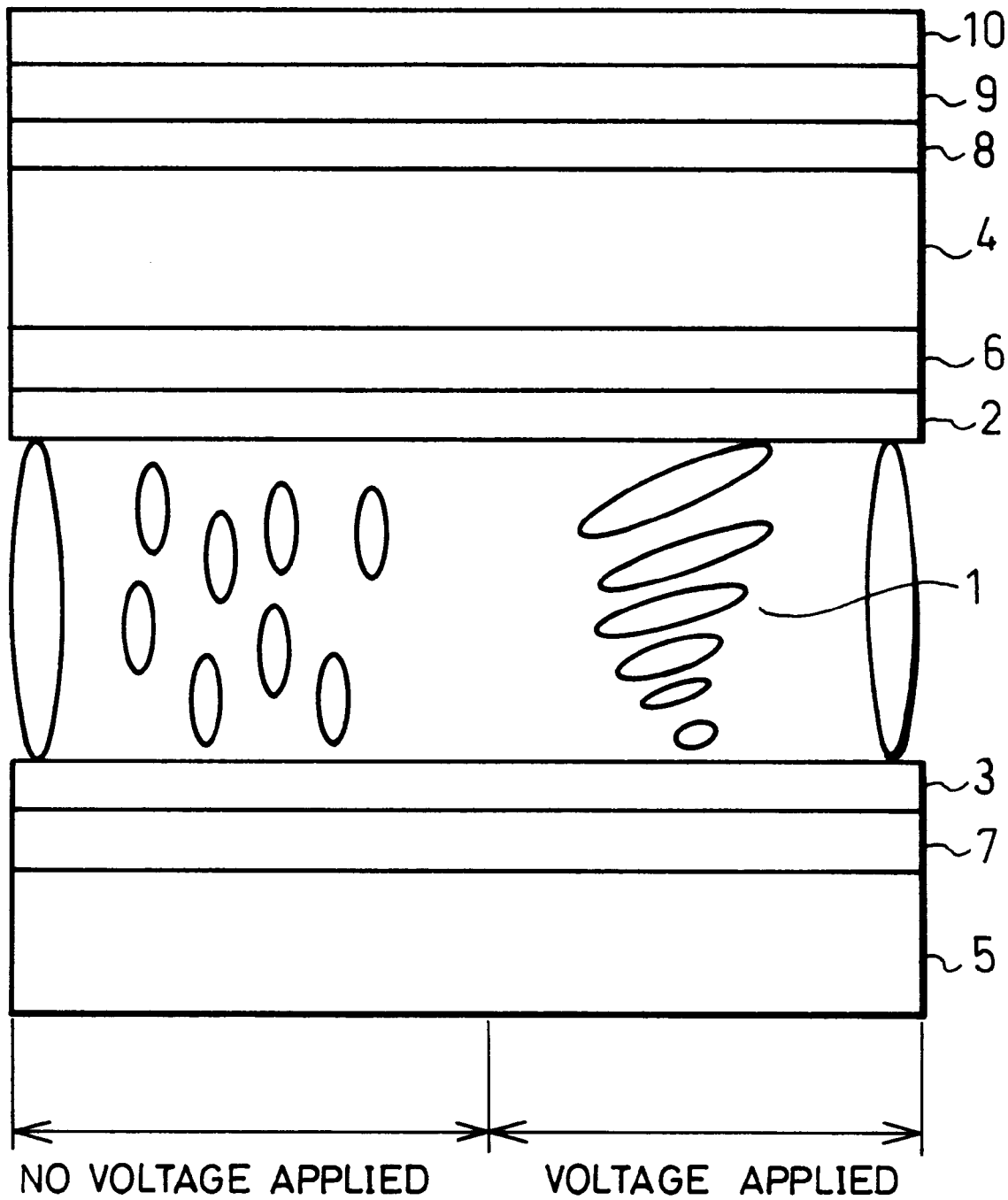
FIG. 1 is a cross-sectional view showing one example of a structure for a reflective-type liquid crystal display device in accordance with the present invention incorporating two optical retardation compensation plates.

FIG. 1 is a cross-sectional view showing one example of a structure for a reflective-type liquid crystal display device according to the present invention. A liquid crystal layer 1 is sandwiched between a vertical alignment film 2, which has undergone rubbing alignment processing, disposed on an upper substrate 4 (second substrate), and a vertical alignment film 3, which has undergone rubbing alignment processing in the same manner, disposed on a lower substrate 5 (first substrate). The upper and lower substrates 4 and 5 are provided with electrodes 6 and 7, respectively, for applying a voltage across the liquid crystal layer 1.

The electrode 7 may also act as a reflective plate, and in this case the electrode 7 may have the shape of continuous micro-meter-scale undulation, to an extent which maintains the polarization of reflected light. The period of repetition of the micro-meter-scale undulation may vary depending on direction (i.e., the irregularity of the surface is anisotropic). Further, as a voltage applying device for the pair of electrodes of the foregoing structure, an active element may be used. It goes without saying that the distinctive features of the present invention are not influenced by the voltage applying device.

In the liquid crystal display device structured as above, the side of the upper substrate 4 toward the viewer is provided with first and second optical retardation compensation plates 8 and 9, and with a polarizer plate 10.

Next, the effects of the various optical elements will be explained.

The foregoing liquid crystal display device is a reflective-type liquid crystal display device, into which incident light, such as external light, enters a liquid crystal layer 1 via the polarizer plate 10, and which is viewed from the side of the polarizer plate 10 through which the incident light enters. At this time, of the incident light which enters the polarizer plate 10, only a linearly polarized component with a specific direction is selectively transmitted through the polarizer plate 10 to the plurality of optical retardation compensation plates. The optical retardation compensation plates are optically arranged so as to change the state of polarization of the light transmitted from the polarizer plate from linearly polarized to circularly polarized light.

For example, in the structure shown in FIG. 1, incident light, in passing through the optical retardation compensation plate 9 and then the optical retardation compensation plate 8, is for the most part, within the visible region of the spectrum, converted into circularly polarized light. Whether this circularly polarized light is of left or right circular polarization depends on the arrangement of the optical elements, i.e., the polarizer plate and two optical retardation compensation plates.

Figure 2:
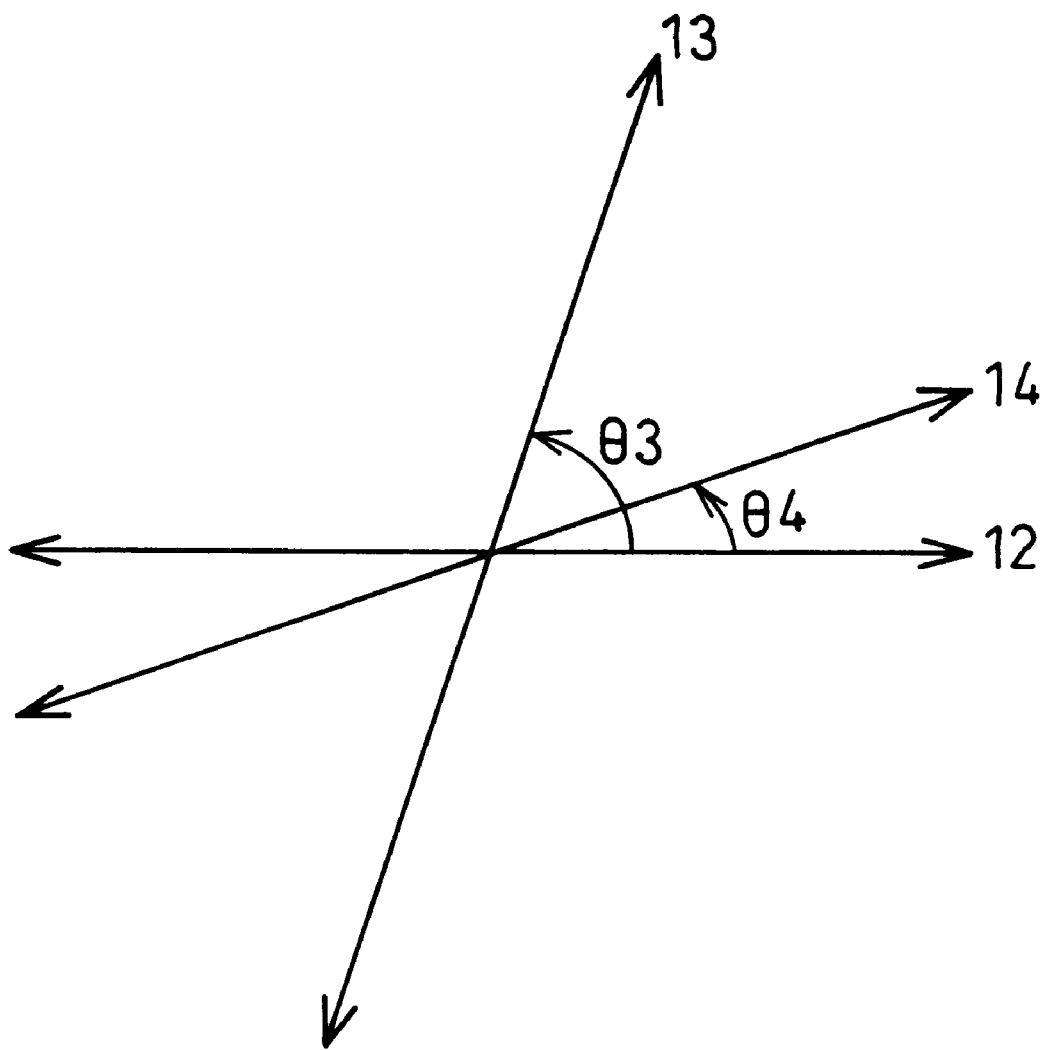
FIG. 2 is a plan view showing directions of arrangement of a polarizer plate and the optical retardation compensation plates of the reflective-type liquid crystal display device.

For example, the following will explain a case in which, as shown in FIG. 2, the first and second optical retardation compensation plates 8 and 9 are arranged so that their retardations for passing light in the normal direction of the display surface are 135 nm and 270 nm, respectively. The following explains a case when viewed from the direction of incident light entering the liquid crystal display device. In FIG. 2, when the optical elements are arranged such that θ3 (an angle formed by a polarizer plate transmission axis direction 12 and a first optical retardation compensation plate slow axis direction 13)=75° and θ4 (an angle formed by the polarizer plate transmission axis direction 12 and a second optical retardation compensation plate slow axis direction 14)=15°, light entering the liquid crystal display device, in passing through the polarizer plate 10 and the optical retardation compensation plates 9 and 8, is for the most part, within the visible region of the spectrum, converted into circularly polarized light of right circular polarization.

Figure 3:
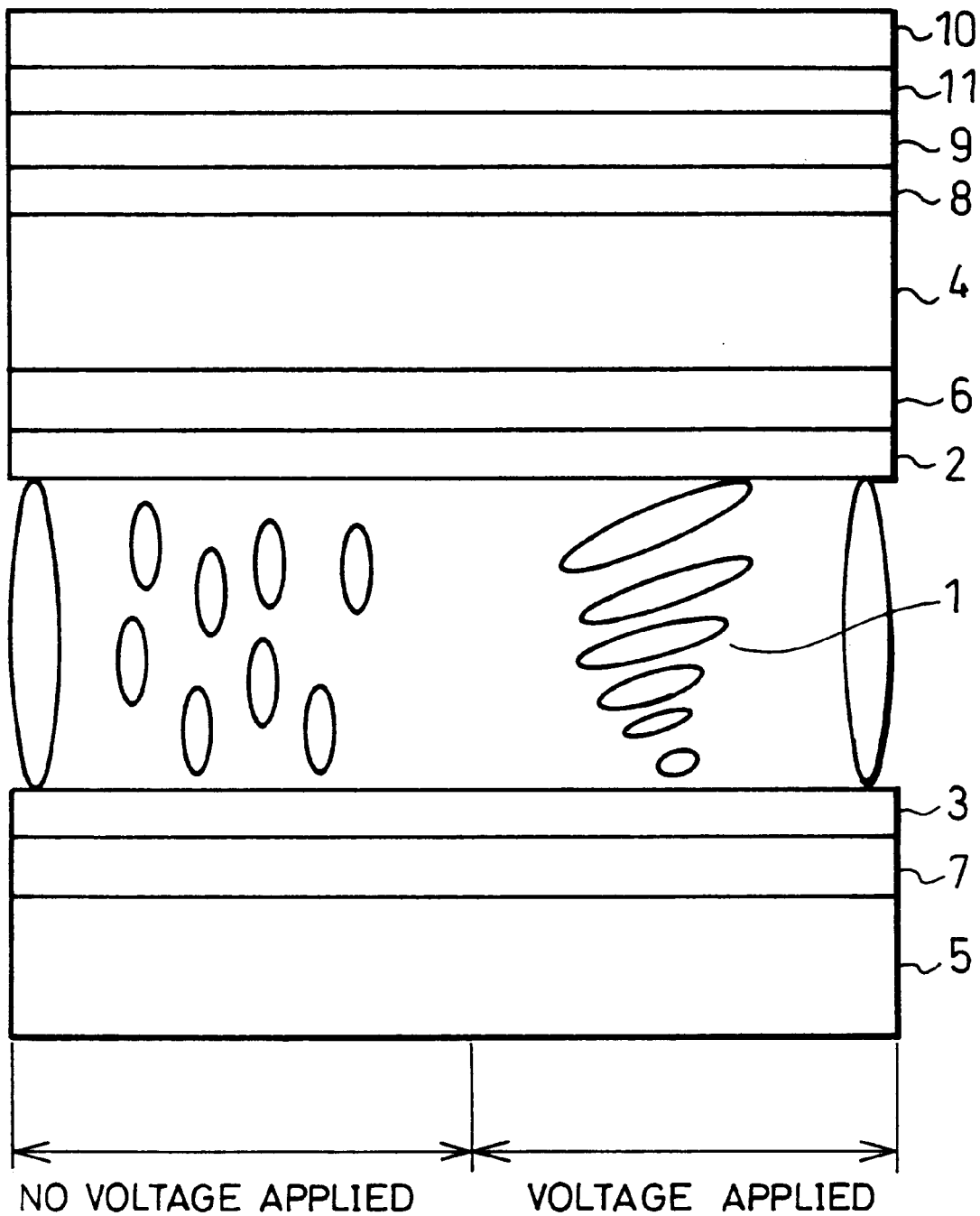
FIG. 3 is a cross-sectional view showing one example of a structure for a reflective-type liquid crystal display device in accordance with the present invention incorporating three optical retardation compensation plates.
Figure 4:
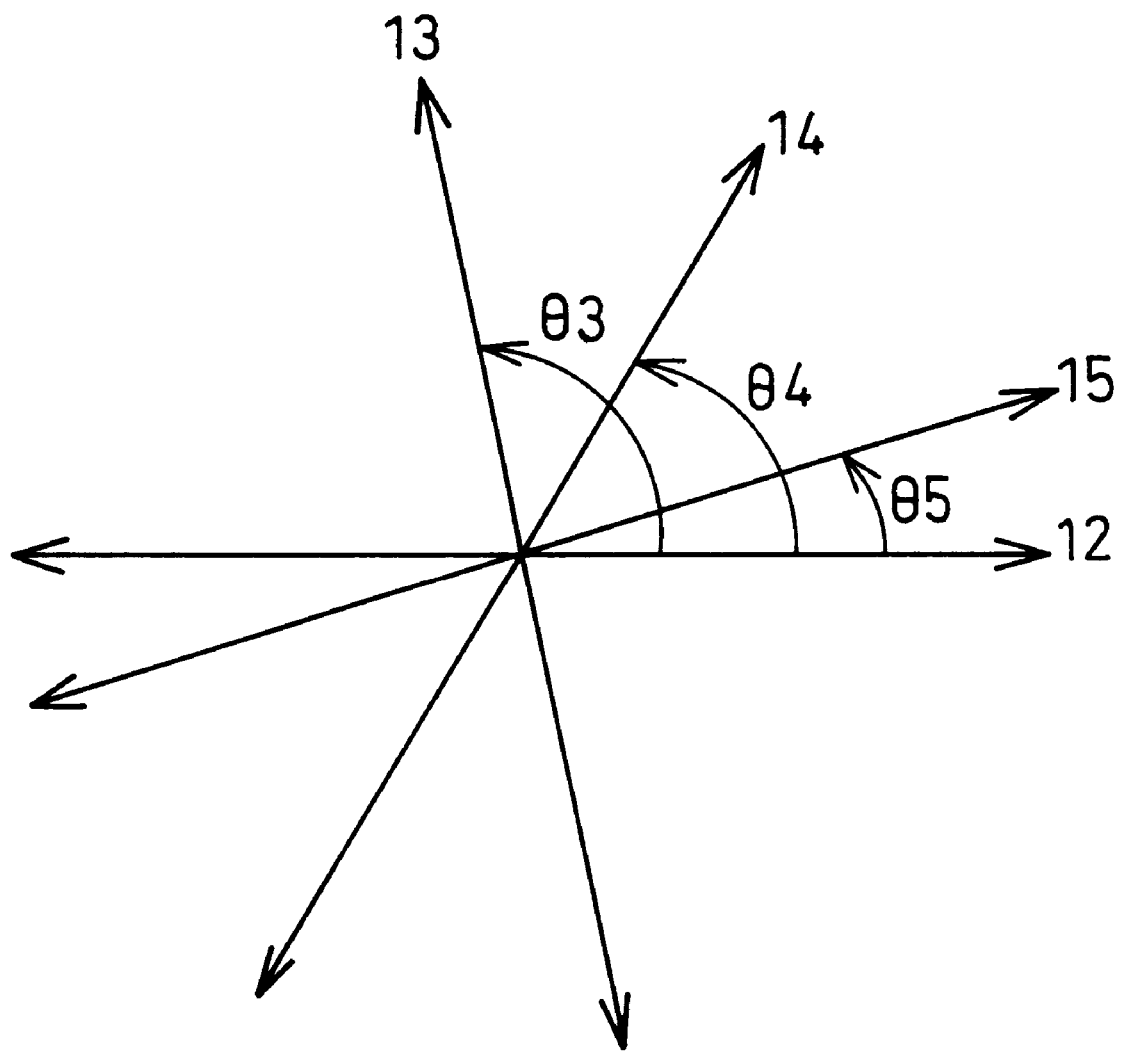
FIG. 4 is a plan view showing directions of arrangement of the polarizer plate and optical retardation compensation plates of the reflective-type liquid crystal display device.
Figure 5:
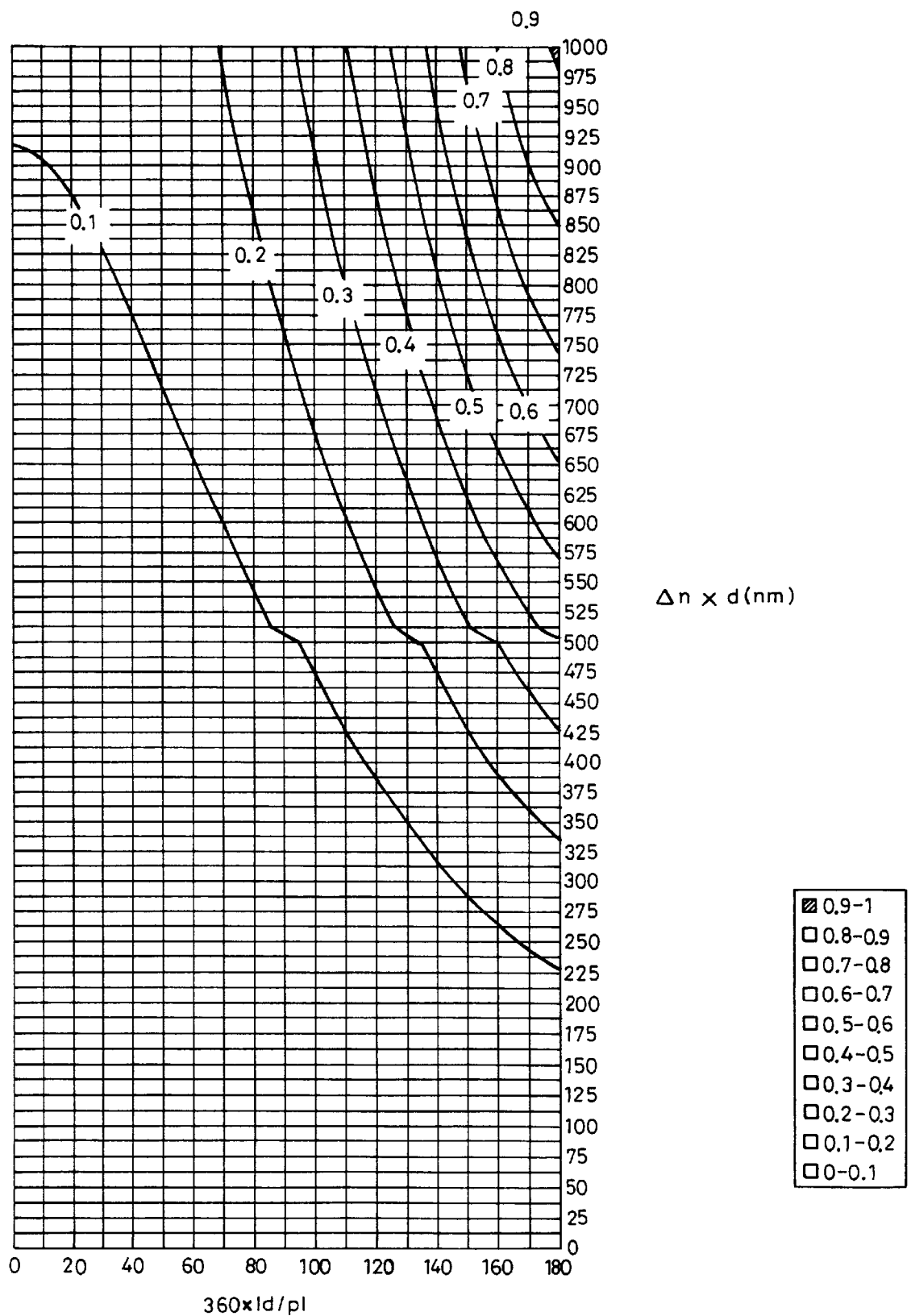
FIG. 5 is a drawing showing an evaluative function (figure of merit [FOM]) as a contour map in a space defined by $\Delta n \times d$ that is a design parameter of a liquid crystal layer and $360 \times |d/p|$ that shows the degree of twist of liquid crystal when a voltage of 2.5V is being applied the liquid crystal layer.
Figure 6:
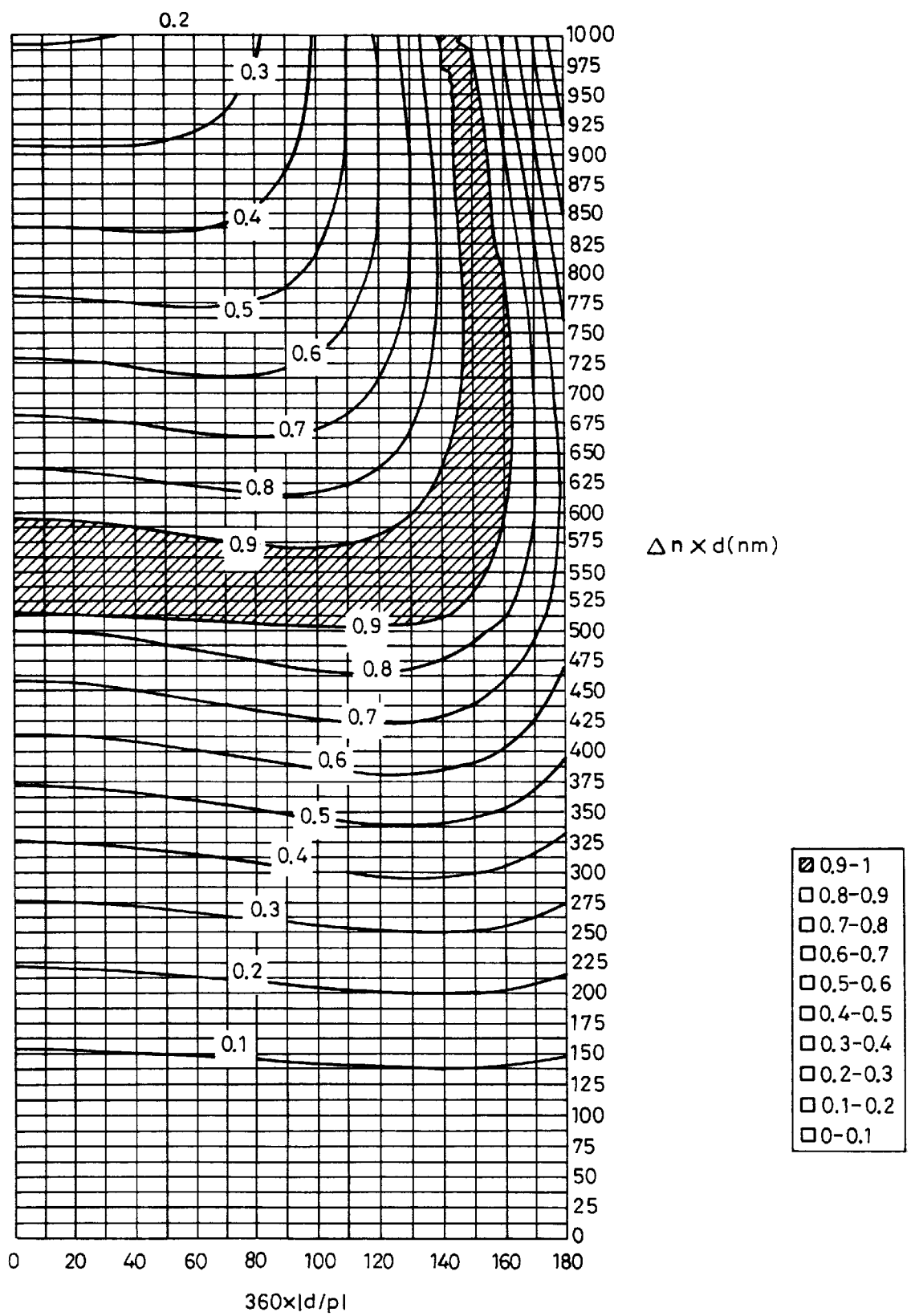
FIG. 6 is a drawing showing an evaluative function (figure of merit [FOM]) as a contour map in a space defined by $\Delta n \times d$ that is a design parameter of a liquid crystal layer and $360 \times |d/p|$ that shows the degree of twist of liquid crystal when a voltage of 3.0V is being applied the liquid crystal layer.
Figure 7:
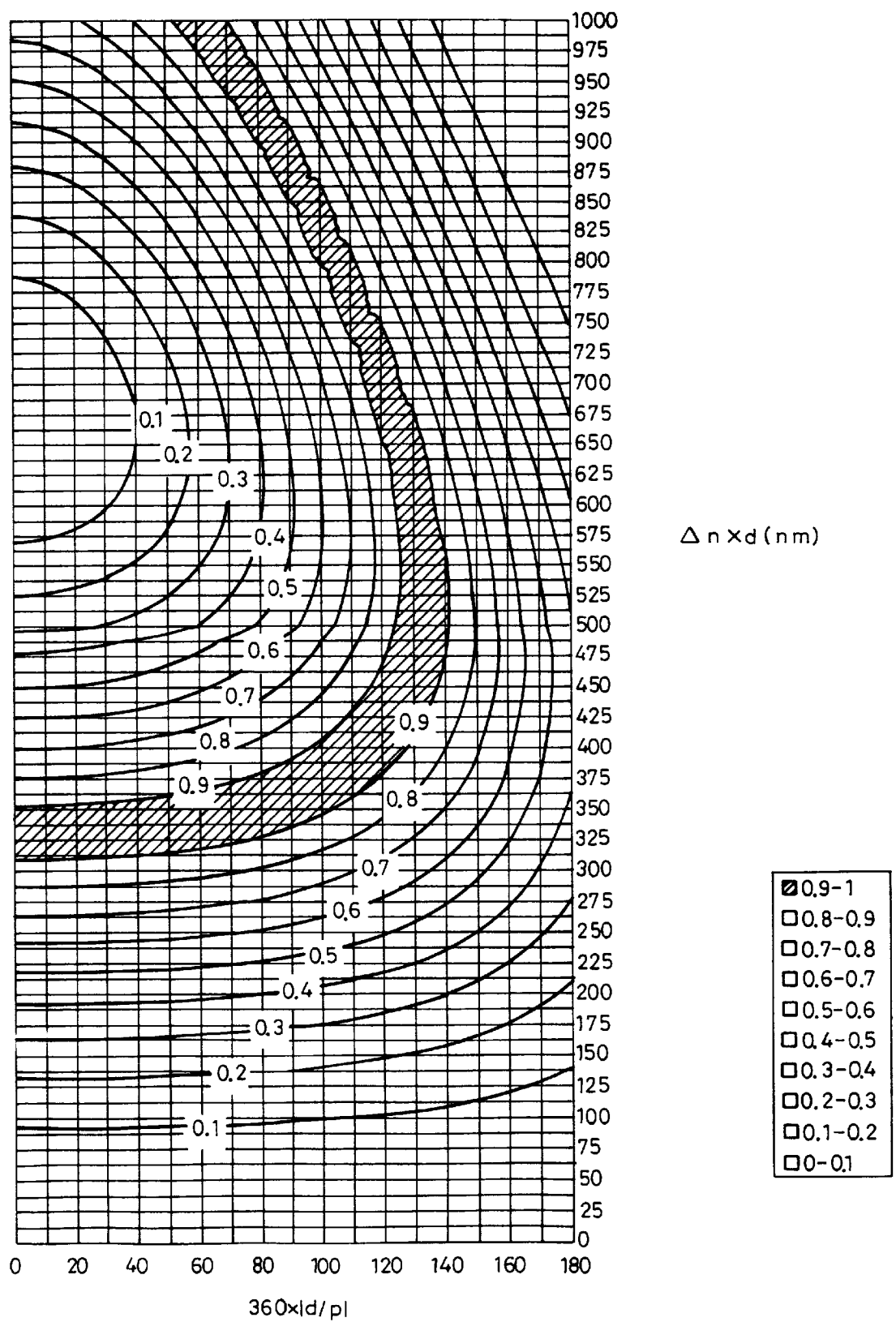
FIG. 7 is a drawing showing an evaluative function (figure of merit [FOM]) as a contour map in a space defined by $\Delta n \times d$ that is a design parameter of a liquid crystal layer and $360 \times |d/p|$ that shows the degree of twist of liquid crystal when a voltage of 3.5V is being applied the liquid crystal layer.
Figure 8:
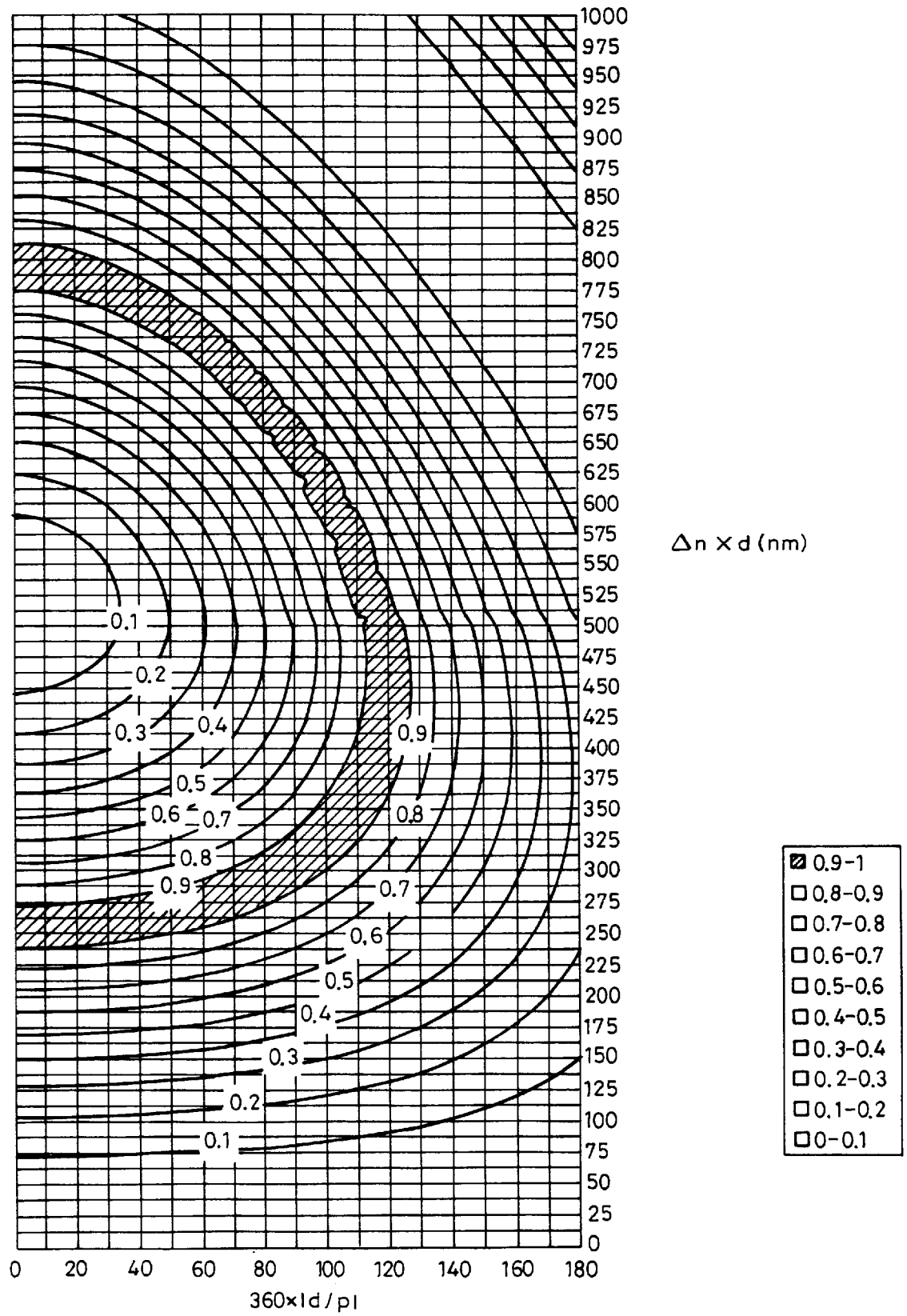
FIG. 8 is a drawing showing an evaluative function (figure of merit [FOM]) as a contour map in a space defined by $\Delta n \times d$ that is a design parameter of a liquid crystal layer and $360 \times |d/p|$ that shows the degree of twist of liquid crystal when a voltage of 4.0V is being applied the liquid crystal layer.

Next, in a structure, shown in FIG. 3, provided with three optical retardation compensation plates, the following will explain a case in which the first and second optical retardation compensation plates 8 and 9 and a third optical retardation compensation plate 11 are arranged so that their retardations of passing light in the normal direction of the display surface are 135 nm, 270 nm, and 270 nm, respectively. As shown in FIG. 4, when the optical elements are arranged such that θ3 (an angle formed by the polarizer plate transmission axis direction 12 and the first optical retardation compensation plate slow axis direction 13)=100.2°, θ4 (an angle formed by the polarizer plate transmission axis direction 12 and the second optical retardation compensation plate slow axis direction 14)=34.2°, and θ5 (an angle formed by the polarizer plate transmission axis direction 12 and a third optical retardation compensation plate slow axis direction 15)=6.5°, light entering the liquid crystal display device, in passing through the polarizer plate 10, the optical retardation compensation plate 11, the optical retardation compensation plate 9, and then the optical retardation compensation plate 8 is converted into circularly polarized light over an even wider region of the spectrum than when two optical retardation compensation plates are used.

The optical retardation compensation plates 9, 9, and 11 are made of stretched films composed of polycarbonate and other raw materials. For light of 550 nm wavelength transmitted in the normal direction thereof, the optical retardation compensation plate 8 has a retardation controlled to 130 nm to 140 nm, and the optical retardation compensation plates 9 and 11 have retardations controlled to 265 nm to 275 nm. Here, the retardation is defined as the product of a refractive index difference determined according to the direction along which light actually travels and the spatial length which light travels, and expressed in the dimension of length. The design of the optical retardation compensation plates, and of the liquid crystal layer 1, may be changed in consideration of characteristics when viewing from an inclined direction. For example, in order to take into consideration light transmitted in an inclined direction, the optical retardation compensation plates 8, 9, and 11 may be set to have the respective angles mentioned above, except that at least one of the optical retardation compensation plates 8, 9, and 11 may be replaced with a biaxial optical retardation compensation plate.

Incident light entering the liquid crystal layer 1 changes its state of polarization in accordance with the birefringence of the liquid crystal molecules arranged in correspondence with the voltage applied thereacross, and the light then reaches the reflective plate. The state of polarization of the light on the reflective plate differs according to the alignment of the liquid crystal molecules.

First, operations in the case of a dark state will be explained. When chiral nematic liquid crystal is sandwiched between substrates on which vertical alignment films are formed, under certain conditions, the liquid crystal molecules have a vertical alignment without twisting. Further, if d is a thickness of the liquid crystal layer and p is a natural pitch of the liquid crystal molecules, it is known from theoretical analysis that the liquid crystal molecules show vertical alignment when d and p satisfy Equation (1) below. The pitch of liquid crystal media can be positive and negative due to the sign of helix of the director configuration. The inventors define it to be positive when the helix is right-handed and vise versa. Accordingly, since a value of d/p can be positive or negative, it will be shown as an absolute value, as below.

$$0 < |d/p| K3/(2 \times K2) \tag{1}$$

Here, K2 and K3 are Franck elastic constants. Judging from material constants of K2 and K3 for liquid crystal materials, it is known that K3/K2 generally shows values in the vicinity of 2, and, thus practically, Equation (1) is substantially equivalent to $0 < |d/p| 1$.

When Equation (1) above is satisfied, the liquid crystal molecules show vertical alignment when no voltage is applied, and thus the liquid crystal layer has almost no optical anisotropy in refractive index with respect to light traveling in the normal direction of the display surface of the device, and the retardation of the liquid crystal layer is close to zero. For this reason, circularly polarized light entering this liquid crystal layer reaches the reflective plate with little change of its state of polarization by the liquid crystal layer. On the surface of the reflective plate, the incident light becomes circularly polarized light of reverse rotation, which is absorbed by the polarizer plate when the light exits, thus realizing a dark state. When this dark state is established throughout the visible region of the spectrum, black display is realized.

In order to realize a bright state, as the inventors of the present invention found, a liquid crystal layer which inclines and tilts and twists at the same time upon application of a voltage is effective.

Further, in order to actually realize the foregoing circularly polarized light within the visible region of the spectrum, the inventors of the present invention found, as a result of collaboration, that the conditions discussed below must be met. The following will explain the course of these investigations in detail.

First, a case was considered in which linearly polarized light was projected vertically into a quarter-wave plate at an angle of 45° with respect to an optical axis of an optical retardation compensation plate which satisfies quarter-wave conditions. Here, quarter-wave conditions are conditions under which the retardation equals ¼ the wavelength of the light. Generally, it is difficult for a single optical retardation compensation plate to meet these conditions across the visible region of the spectrum (400 nm to 700 nm). This is because the refractive index of a typical optical retardation compensation plate is wavelength dependent and therefore the optical retardation compensation plate cannot satisfy conditions for the retardation to be equal to ¼ the wavelength across the entire visible region of the spectrum.

First, in the structure with two optical retardation compensation plates shown in FIG. 1, when light is of a wavelength for which the first optical retardation compensation plate 8 meets quarter-wave conditions, the state of polarization of the light need not be changed before the light enters the optical retardation compensation plate 9. Accordingly, when the incident light, converted, in the visible region of the spectrum, into linearly polarized light by the polarizer plate 10, is to be further converted by the second optical retardation compensation plate 9, it is important that the optical retardation compensation plate 9 satisfies half-wave conditions. Moreover, the direction of polarized light from the optical retardation compensation plate 9 must fall within a range of angles for which the optical retardation compensation plate 8 is capable of producing good circularly polarized light when the wavelength of the light meets the quarter-wave conditions of the optical retardation compensation plate 8. In other words, the direction of light from the optical retardation compensation plate 9 and the direction of a slow axis of the optical retardation compensation plate 8 must form an angle of approximately 45°.

The following will explain the relation ship between the respective directions of the transmission axis of the polarizer plate 10 and the slow axis of the optical retardation compensation plate 9. Of the linearly polarized light which passes through the polarizer plate 10 along the transmission axis thereof, light of a wavelength for which the optical retardation compensation plate 9 meets half-wave conditions is converted into linearly polarized light with a direction of $2 \times \theta 4$, where $\theta 4$ is an angle of the polarization direction measured from the slow axis of the optical retardation compensation plate 9. Accordingly, if the direction of the slow axis of the optical retardation compensation plate 8 differs by approximately 45° from this direction of $2 \times \theta 4$, good circularly polarized light can be realized for light of that wavelength. In other words, in a structure which uses both optical retardation compensation plates 8 and 9, if $\theta 3$ is the angle formed by the slow axis of the optical retardation compensation plate 8 and the transmission axis of the polarizer plate 10, setting $|\theta 3 - 2 \times \theta 4|$ to 45° is a necessary condition in order to obtain good circularly polarized light for the wavelength of light for which good circularly polarized light could be obtained when the optical retardation compensation plate 8 alone was used with the polarizer plate 10. Provided the foregoing condition is met, the combination of θ3 and θ4 may be changed in order to obtain good display conditions. Further, when considering a case where incident light and exiting light travelling vertical to the optical retardation compensation plate as the above settings, although good circularly polarized light can be realized by setting |θ3−2×θ4| to 45°, if, for example, the use to which the liquid crystal display device is to be put dictates that the viewing direction be set to incline with respect to the normal direction of the display surface of the device, there are cases in which slightly changing the foregoing angle can obtain good characteristics. In view of the foregoing, good display can be realized by setting |θ3−2×θ4| to approximately 35° to 550°. In other words, it was found that with the arrangement of a polarizer plate and two optical retardation compensation plates shown in FIG. 2, it was satisfactory to satisfy the following conditions:

$$35°\leq |2\times \theta 4\theta - \theta 3|\leq 55 \qquad (2)$$

within a range satisfying the foregoing conditions, the respective values of θ3 and θ4 may of course be changed; it is preferable to determine the specific values depending on the combination of birefringence dispersions of the two optical retardation compensation plates used.

Further, in order for the optical retardation compensation plates 8 and 9 to satisfy quarter-wave and half-wave conditions, respectively, for visible light having a wavelength from not less than 400 nm to not more than 700 nm, it is preferable if the optical retardation compensation plate 8 has a retardation of not less than 100 nm and not more than 180 nm with respect of light passing in the normal direction to the display surface, and if the optical retardation compensation plate 9 has a retardation of not less than 200 nm and not more than 360 nm with respect of light passing in the normal direction to the display surface.

Further, in the structure with three optical retardation compensation plates shown in FIG. 3, in view of the conditions for ensuring that the light entering the optical retardation compensation plate 8 has a polarization direction at an angle of approximately 45° with respect to the slow axis of the optical retardation compensation plate 8, it is preferable to set |θ3−2×(θ4−θ5)| to approximately 35° to 55°. In other words, with the arrangement of a polarizer plate and three optical retardation compensation plates shown in FIG. 4, when the respective angles θ3, θ4, and θ5 formed by the transmission axis (or absorption axis) of the polarizer plate and the slow axes of the first, second, and third optical retardation compensation plates, respectively, were set to satisfy the following conditions expressed as Equation (3), it was found that circularly polarized light could be obtained over an even wider region of the spectrum than when two optical retardation compensation plates were used:

$$35°\leq |2\times (\theta 5-\theta 4)+\theta 3|\leq 55° \qquad (3)$$

In other words, in the same manner as when two optical retardation compensation plates are used, it is necessary for the optical retardation compensation plate 8 to satisfy the quarter-wave conditions with respect to light within the chief visible region of the spectrum of 400 nm to 700 nm, i.e., to have a retardation of 100 nm to 180 nm with respect to light passing in the normal direction of the display surface. It is necessary for the optical retardation compensation plates 9 and 11, on the other hand, to satisfy the half-wave conditions, i.e., to have a retardation of 200 nm to 360 nm with respect to light passing in the normal direction of the display surface.

When no voltage is applied, the retardation in a case where incident light and exiting light travel in a vertical direction to the optical retardation compensation plate is close to zero. Further, since it is not greatly dependent on the accuracy of the thickness in which the liquid crystal layer is suspended, preparation and manufacturing of the liquid crystal layer are facilitated.

Next, operations for a bright state will be explained. If incident light, converted into circularly polarized light by optical retardation compensation plates set so as to satisfy Equation (2) or (3) above, is converted by the liquid crystal layer and is linearly polarized when reaching at the reflective plate, a bright state is realized. At this time, the polarization of the linearly polarized light may have any direction within the plane of the reflective plate. In other words, a bright state of equal brightness can be realized regardless of whether the light in the visible region of the spectrum is linearly polarized light whose direction differs depending on wavelength, or is the same for all wavelengths.

In particular, it is important to attain the optical effects of a liquid crystal layer which, upon receiving incident light converted into substantially circularly polarized light in order to realize a dark state, further changes the incident light to linearly polarized light of any direction in the visible region of the spectrum. Since the present invention uses a liquid crystal layer having negative dielectric anisotropy, the liquid crystal molecules take on an alignment parallel to the surfaces of the substrates when a voltage is applied. In this kind of liquid crystal layer, it is possible to give the liquid crystal molecules a pre-tilt of several degrees, instead of a perfectly vertical alignment.

In the reflective-type liquid crystal display device according to the present Embodiment, since switching is performed by the technique explained above, it was found that, in order to evaluate the arrangement of optical elements of a particular liquid crystal display device, it was sufficient to evaluate the state of polarization, at the reflective plate, of the incident light which was circularly polarized light when entering the liquid crystal layer. For this purpose, the present inventors hit upon the evaluative functions described below.

Here, analysis of the state of polarization at the reflective plate will be in terms of a form according to the Jones matrix method, in which two components, of the electric field, perpendicular to a direction of movement of light are expressed as a vector, and the transmission medium is expressed as a 2×2 matrix.

Linearly polarized light of a given polarization direction can be expressed as a linear combination of circularly polarized light of right circular polarization with circularly polarized light of left circular polarization of the same amplitude. Further, elliptically polarized light can be expressed as a linear combination of circularly polarized light having various amplitudes. For this reason, when calculating absolute values (generally complex numbers) of right and left of circularly polarized light exiting from the liquid crystal, the light is linearly polarized light if the values in the clockwise and counter-clockwise directions are equal, but elliptically (or circularly) polarized light if the values differ.

Accordingly, if M is the Jones matrix of the liquid crystal, and C+ and C− are incident, respectively, right and left circular polarized light of normalized amplitude, a suitable evaluative function FOM (Figure of Merit) is as follows.

$$\text{FOM}=1-|(|(C+\cdot MC+)|^2-|(C-\cdot MC+)|^2)/|MC+|^2|=1-|S3| \qquad (4)$$

Here, S3 is a standardized Storkes' parameter of light exiting from the liquid crystal layer when circularly polarized light enters there.

In the following explanation, FOM, shown in foregoing Equation (4), will be used as an evaluative function.

In Equation (4), an inner product of the polarized light exiting the liquid crystal (MC+) and the C+ component, and an inner product of the polarized light exiting the liquid crystal (MC+) and the C− component, are evaluated, and the difference between the squares (i.e., intensities) of the absolute values of these complex numbers is evaluated. When these intensities are equal (i.e., when the exiting light is linearly polarized light), then the second term of the right side of the equation is 0, and thus FOM=1. Again, when the exiting light is circularly polarized light, then the second term of the right side of the equation is 1, and FOM=0.

When no voltage is applied, the liquid crystal molecules aligned vertically, and when circularly polarized light enters there, the polarization state on the reflective plate must necessarily be circularly polarized, and a good dark state can be realized. When a voltage is applied, on the other hand, in order to realize a bright state, the circularly polarized light entering the liquid crystal layer must be converted into linearly polarized light upon exiting therefrom and entering to reflector. There are many conditions for a liquid crystal layer to meet this requirement, such as the voltage applied, twist angle of the liquid crystal, $\Delta n \times d$, etc.

Accordingly, the present inventors, through concentrated investigations, took combinations among applied voltage, twist angle, and $\Delta n \times d$ as parameters, and arrived at optimum conditions, and also arrived at conditions regarding a pre-tilt angle to realize a stable alignment and optimum conditions regarding the direction of the rubbing processing performed on the upper substrate 4. Specifically, FIGS. 5 through 9 show the results of plotting of values of FOM shown in Equation (4), from 0 through 1 in increments of 0.1, in a coordinate space defined by a parameter $|d/p|$ showing the twist angle of the liquid crystal between the upper and lower substrates (×360: axis of abscissas) and $\Delta n \times d$ (axis of ordinates).

FIGS. 5 through 9 show the foregoing evaluative function FOM as calculated results for light of 550 nm (in the center of the visible region of the spectrum) under application of 2.5V, 3.0V, 3.5V, and 4.0V, and a theoretically infinite voltage, respectively. Further, the liquid crystal molecules on the rubbed substrate were aligned with a uniform pre-tilt angle of 3° with respect to the normal direction of the substrate.

In FIGS. 5 through 9, in a range where the value of FOM is 0 through 0.1, the circularly polarized light entering the liquid crystal layer is also circularly polarized upon exiting therefrom, and thus a bright state cannot be realized. In contrast, in a range where the value of FOM is 0.9 to 1.0 (shown by hatching in the Figures), the circularly polarized light entering the liquid crystal layer is changed to linearly polarized light upon exiting therefrom, and thus a good bright st ate can be realized.

Further, it is evident from FIGS. 5 through 9 that the region producing a good bright state is changed by varying the applied voltage. The applied voltage can be freely set, giving consideration to the driving voltage of the driving circuitry and the driving method. For example, when steepness is required, as in simple matrix driving, conditions may be set to comparatively low-voltage conditions. Further, in active matrix driving, driving voltage may be adjusted so as to obtain good gray-scale characteristics.

However, FIGS. 5 through 9 show only one example. It was confirmed that the region producing a good bright state shifts slightly depending on the material constants of the liquid crystal material (dielectric anisotropy, elastic constant), tilt angle, etc. For this reason, it is necessary to set the conditions to be optimum for the specific type of liquid crystal, alignment film, etc.

It was also found that FOM for light of colors other than green (550 nm), which was used as the standard, could be plotted on the same coordinate space, without changing the axis of abscissas (twist angle), by lengthening or shortening only the $\Delta n \times d$ axis. In other words, this means that, within a curved "peak" area where the value of FOM is large (shown by hatching in the Figures), in an area thereof where an equally large "peak" can be obtained for light of other wavelengths, conditions are good for light of colors other than green. For this reason, it was found that it is preferable to use a portion of the FOM "peak" which extends in the direction of the axis of ordinates, i.e., a portion where dependence on $\Delta n \times d$ is small, because in this case dependence of display on wavelength was small, and good white display free of coloring could be obtained. In this way, the present inventors found that good display could be obtained only when narrow conditions were met.

The present inventors have found the range of the liquid crystal display parameters of substantially sufficient extent, with which not only satisfactory good bright state for whole visible spectrum is gained, but existing technologies are applicable to realize liquid crystalline mixture designed for the purpose of the easy production of the LCD. The liquid crystal should preferably meet the specific conditions of $|d/p| \leq 1$, where p is the natural pitch of the liquid crystal and d is the thickness of the liquid crystal layer, and $\Delta n \times d$ of the liquid crystal layer within a range of 135 nm through 1200 nm.

Figure 9:
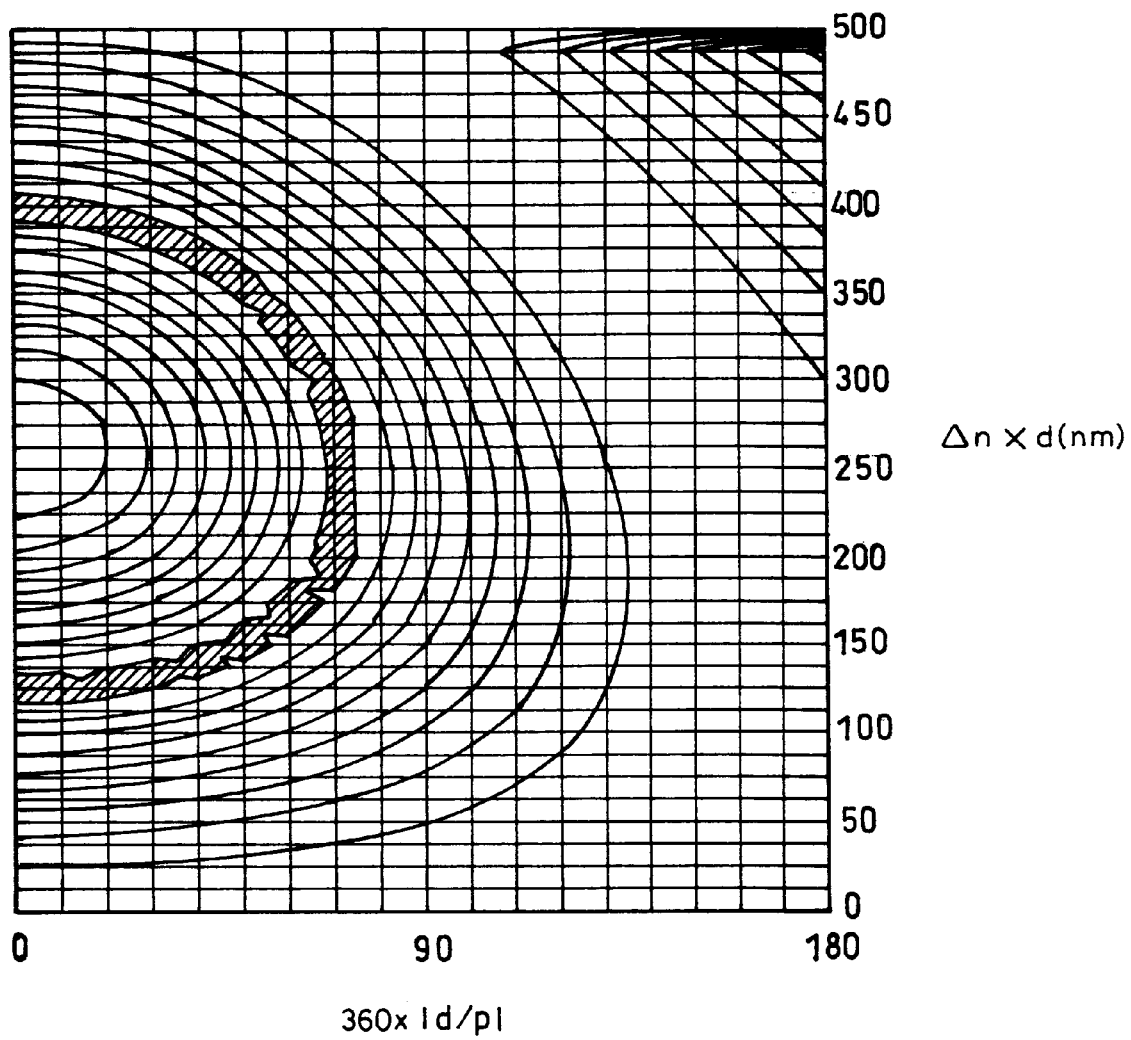
FIG. 9 is a drawing showing an evaluative function (figure of merit [FOM]) as a contour map in a space defined by $\Delta n \times d$ that is a design parameter of a liquid crystal layer and $360 \times |d/p|$ that shows the degree of twist of liquid crystal when a voltage of a theoretically infinite value is being applied the liquid crystal layer.

Here, it can be seen that the lower limit of 135 nm is the lower limit of $\Delta n \times d$ of the hatched area in FIG. 9 which indicates the range of good display. The upper limit of 1200 nm has the following basis.

There is an optimum range for the refractive index difference $\Delta n$ of the liquid crystal material to characteristic polarization. Specifically, in order to assure the stability in low-temperature circumstances, the upper limit of this range is $\Delta n$=approximately 0.2. With regard to the liquid crystal layer thickness d, on the other hand, since response characteristics for changing the reflectance of the liquid crystal display device are greatly dependent on the liquid crystal layer thickness d, in order to obtain a practical value for response time, the upper limit for d is approximately 6 $\mu$m. Accordingly, the upper limit for $\Delta n \times d$ is the product of these two values, i.e., approximately 1.2 $\mu$m. Incidentally, FIGS. 5 through 9 do not show the vicinity of 1200 nm, but, as mentioned above, these Figures merely show one example. It was confirmed that good display could be obtained in the 1200 nm range with voltages other than those shown in FIGS. 5 through 9, specifically, when a voltage of approximately 2.3V was applied.

Further, it was found that conditions satisfying $\frac{1}{6} < |d/p| < 1$ and $\Delta n \times d$ of the liquid crystal layer within a range from 300 nm through 800 nm were more preferable.

Again, when giving consideration to simple matrix driving, in which steepness of electro-optical characteristics is required, a twist angle of 120° to 170° and $\Delta n \times d$ of the liquid crystal layer within a range from 500 nm through 1200 nm were optimum. The foregoing preferred conditions can be realized, even under manufacturing conditions for a liquid crystal display device with a liquid crystal layer thickness set to 4.5 $\mu$m or more, by using a liquid crystal material whose $\Delta n$ is a practical value of around 0.07. Thus a highly practical liquid crystal display device can be manufactured.

The following will explain concrete embodiments according to the foregoing conditions of the present invention, but the present invention is not limited in any way by these Embodiments.

EMBODIMENT 1

Embodiment 1 discusses a reflective-type liquid crystal display device in which upper and lower substrates thereof are rubbed such that 360×|d/p|, i.e. the setting of the natural pitch p of the liquid crystal and the thickness d of the liquid crystal layer, is 110°. In the present Embodiment, Δn×d of the liquid crystal layer is set to 35 nm, and two optical retardation compensation plates having respective retardations of 135 nm and 270 nm with respect to light transmitted in the normal direction of the display surface are used.

In the present Embodiment, a reflective-type liquid crystal display device structured as shown in FIG. 1 was prepared by a typical manufacturing process. The electrode 7 disposed on the lower substrate 5 was made of aluminum as a light-reflective electrode. In other words, the electrode 7 acts as both light-reflective film and as electrode.

Liquid crystal layer thickness was adjusted to 4.7 μm, and rubbing alignment directions were set such that 360×|d/p|, i.e., the setting of the natural pitch p of the liquid crystal and the thickness d of the liquid crystal layer, was 110°. As alignment films, polyimide vertical alignment films were used, and a tilt angle was formed by rubbing processing thereof. The tilt angle inclined 2° with respect to the normal direction of the substrates. In the present Embodiment, both the upper and lower substrates were rubbing processed, but it was confirmed that uniform alignment could also be obtained by rubbing processing of only one substrate. It was further confirmed that even if neither substrate was rubbing processed, the liquid crystal molecules showed alignment, but in this case uniformity of alignment was inferior.

The alignment film used in the present invention is a film which aligns the liquid crystal molecules perpendicular to the substrates, i.e., a vertical alignment film. Provided the film has the foregoing property, any known vertical alignment film may be used. Examples of materials which may be used include materials having a structure in which a long-chain alkyl group is bonded to a polyimide frame, specifically, polyimide resins such as JALS-274 (JSR Co., Ltd. product) and SE-7511L (Nissan Chemical Industries, Ltd. product).

The thickness of each alignment film is approximately 0.054 μm to 0.1 μm. An example of a method of forming the alignment film is to coat the material onto the substrate by spin coating of a solution containing a polymer, coating by dipping, screen printing, roll printing, etc., followed by drying to form the alignment film. Alternatively, a solution of a polymer precursor may be coated onto the substrate by one of the foregoing methods, and then cured under predetermined curing conditions (heating, irradiation, etc.) to form the alignment film. Alternatively, the alignment film may be formed by the Langmuir-Blodgett technique.

The liquid crystal used in the liquid crystal layer is not limited to any particular liquid crystal, provided it is a nematic liquid crystal having negative dielectric anisotropy (n-type). Examples include ZLI-2857, ZLI-4788, ZLI-4788-000 (available from Merck Japan Co.), etc. Further, it is preferable if the liquid crystal layer thickness is 3 μm to 6 μm.

By adding a chiral agent to the liquid crystal, the pitch of the liquid crystal layer can be adjusted to any value. Any known chiral agent may be used, including, for example, S-811 (available from Merck Japan Co.). cholesteryl nanoate, etc. Incidentally, a chiral agent may be used of which positive/negative helical twisting power determining the twist direction when added to liquid crystal is reversed. One example of such a chiral agent is S-811 (available from Merck Japan Co.).

In the present Embodiment, Merck product ZLI-2857, a liquid crystal material having negative dielectric anisotropy, was used, and Merck product S-811 was added as chiral agent. For ZLI-2857, Δn is 0.074, and Δn×d was set to 350 nm.

Figure 10:
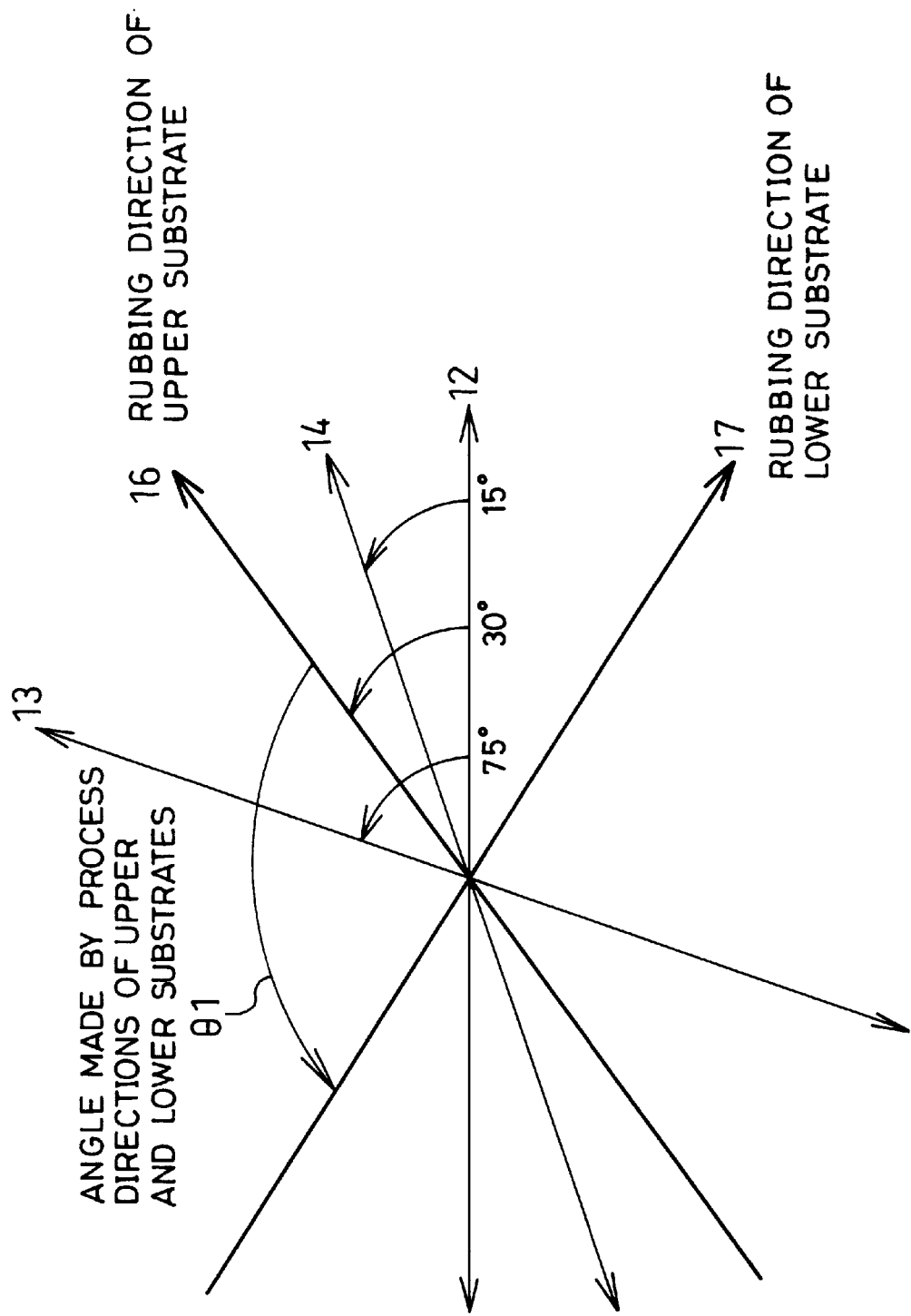
FIG. 10 is a plan view showing directions of arrangement of a polarizer plate and two optical retardation compensation plates incorporated and also showing definition of rubbing directions of an upper substrate and a lower substrate.
Figure 16:
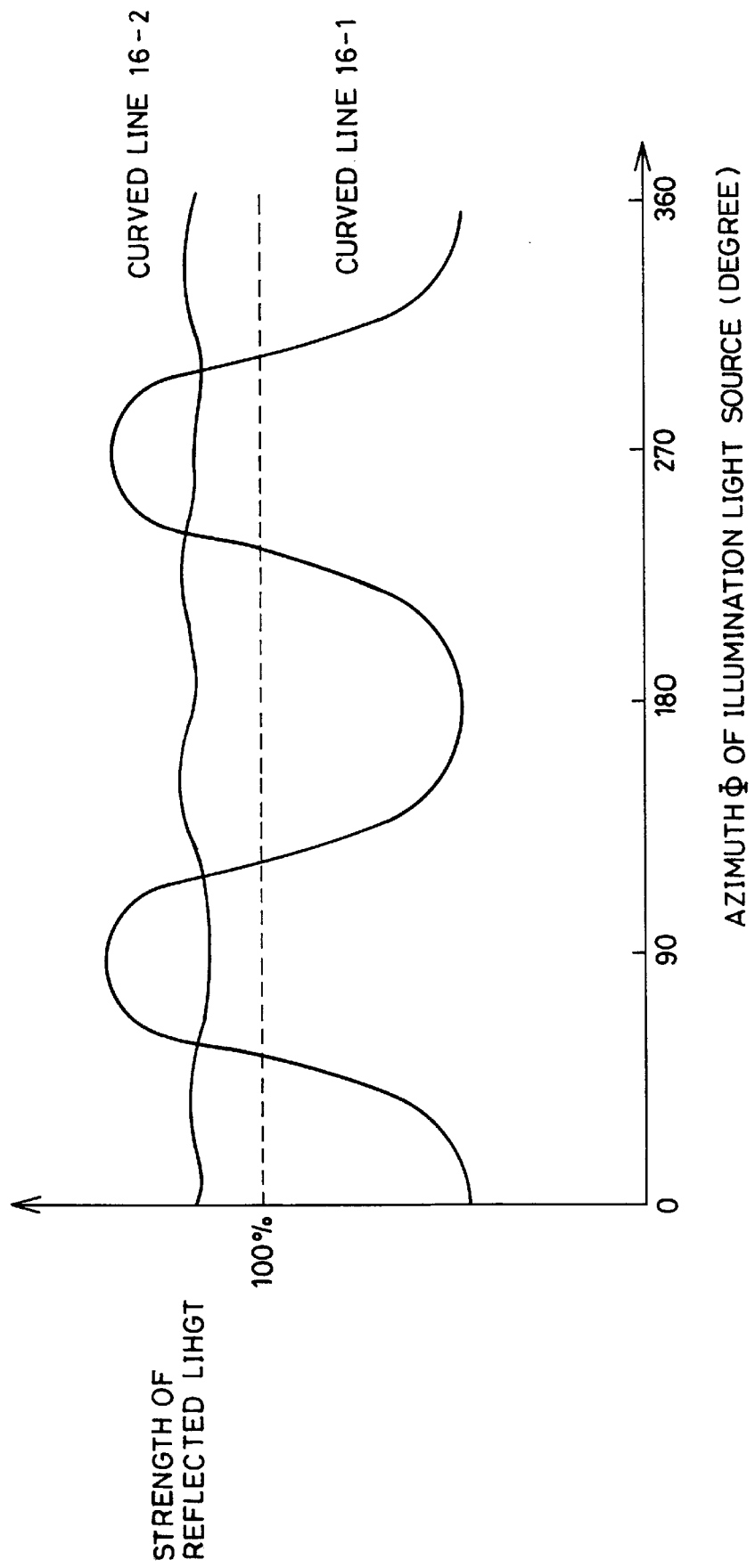
FIG. 16 is a graph showing the reflection characteristics of the anisotropic micro-meter-scale undulation reflective plate of Embodiment 5 and the reflection characteristics of an isotropic micro-meter-scale undulation reflective plate by way of the relations between the strength of reflected light and the azimuth Φ of light source.
Figure 17:
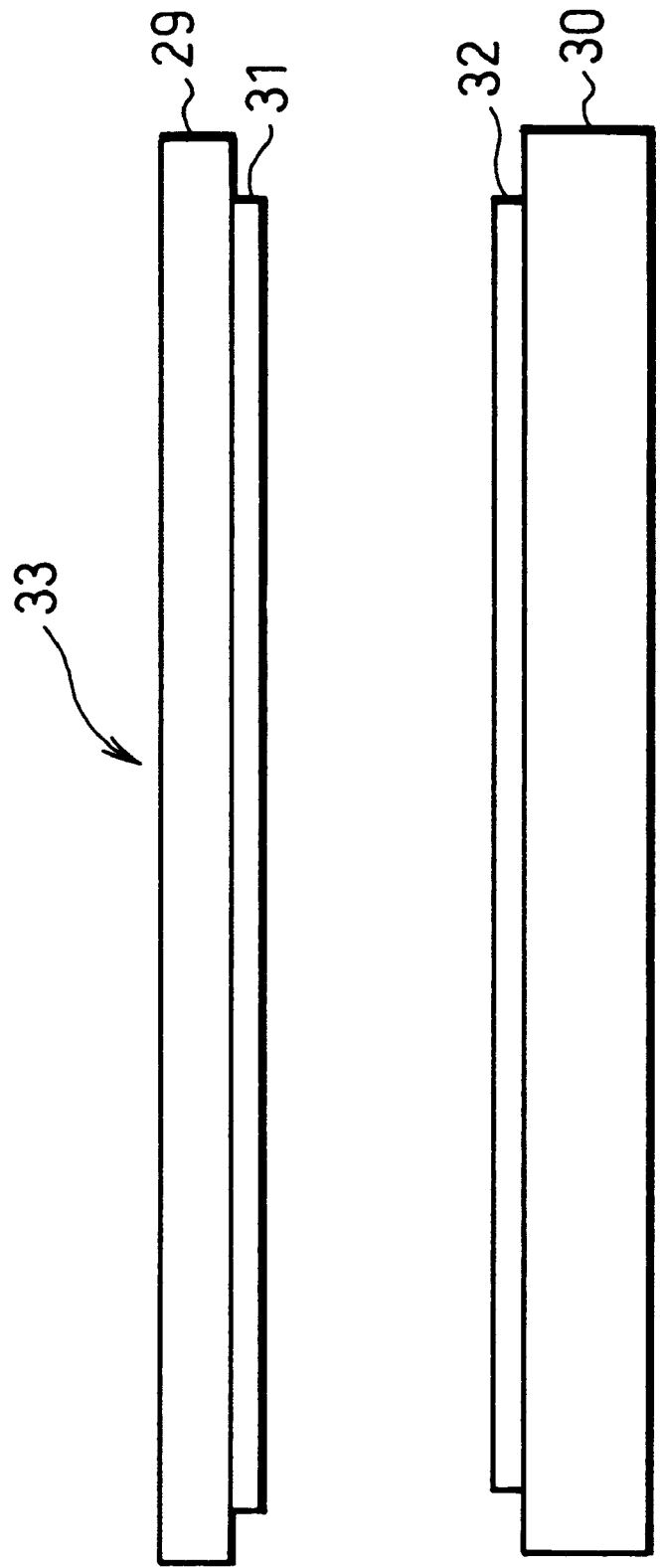
FIG. 17 is a cross-sectional view showing the structure of a touch panel used with the reflective-type liquid crystal display device of Embodiment 6.

These specific settings were realized by preparing the liquid crystal display device as shown in FIG. 10. In other words, an angle θ3 formed by a polarizer plate transmission axis direction 12 and a first optical retardation compensation plate slow axis direction 13 is 75°, and an angle θ4 formed by the polarizer plate transmission axis direction 12 and a second optical retardation compensation plate slow axis direction 14 is 15°. In FIG. 10, 16 and 17 indicate rubbing directions of the upper substrate 4 and the lower substrate 5, respectively, i.e., the respective inclination directions of the liquid crystal molecules on the vertical alignment films 2 and 3 disposed on the upper and lower substrates 4 and 5, respectively, with respect to the normal direction of the alignment film surface. Incidentally, FIG. 10 shows the case when viewing from the direction of incident light entering the liquid crystal display device. Further, in the present Embodiment, an angle formed by the alignment direction 16 of the liquid crystal molecules on the upper substrate 4 and the polarizer plate transmission axis direction 12 was set to 30°, but since circularly polarized light enters the liquid crystal layer, this angle is not limited to any particular angle.

In the present Embodiment, the value of |d/p|, which is a ratio of the liquid crystal layer thickness d to the natural pitch p of the liquid crystal, was set to 0.30. In the initial state, the liquid crystal molecules are aligned vertically, with no substantial twisting.

The optical retardation compensation plates 8 and 9 were made of stretched films of polycarbonate. For light of 550 nm wavelength transmitted in the normal direction of the surface, the optical retardation compensation plate 8 had a retardation controlled to 130 nm to 140 nm, and the optical retardation compensation plate 9 had a retardation controlled to 265 nm to 275 nm. The polarizer plate 10 was a polarizer plate with an internal transmittance of 45% when measured in a single piece, and had an AR (Anti-Reflective) layer made of a dielectric multi-layer film.

The present arrangement of the optical retardation compensation plates 8 and 9 is one designed to obtain optimum optical characteristics in the normal direction of the completed liquid crystal display device, but this design, and the liquid crystal layer used, may be changed in consideration of characteristics when viewing from an inclined direction.

For instance, one way to change design by changing the phase difference of the optical retardation compensation plates for light transmitted in inclined directions is to replace at least one of the optical retardation compensation plates 8 and 9 with a biaxial optical retardation compensation plate while their configuration is kept to be one described in FIG. 10. Further, the angle settings may of course be changed within the range of Equation (2) above.

Figure 11:
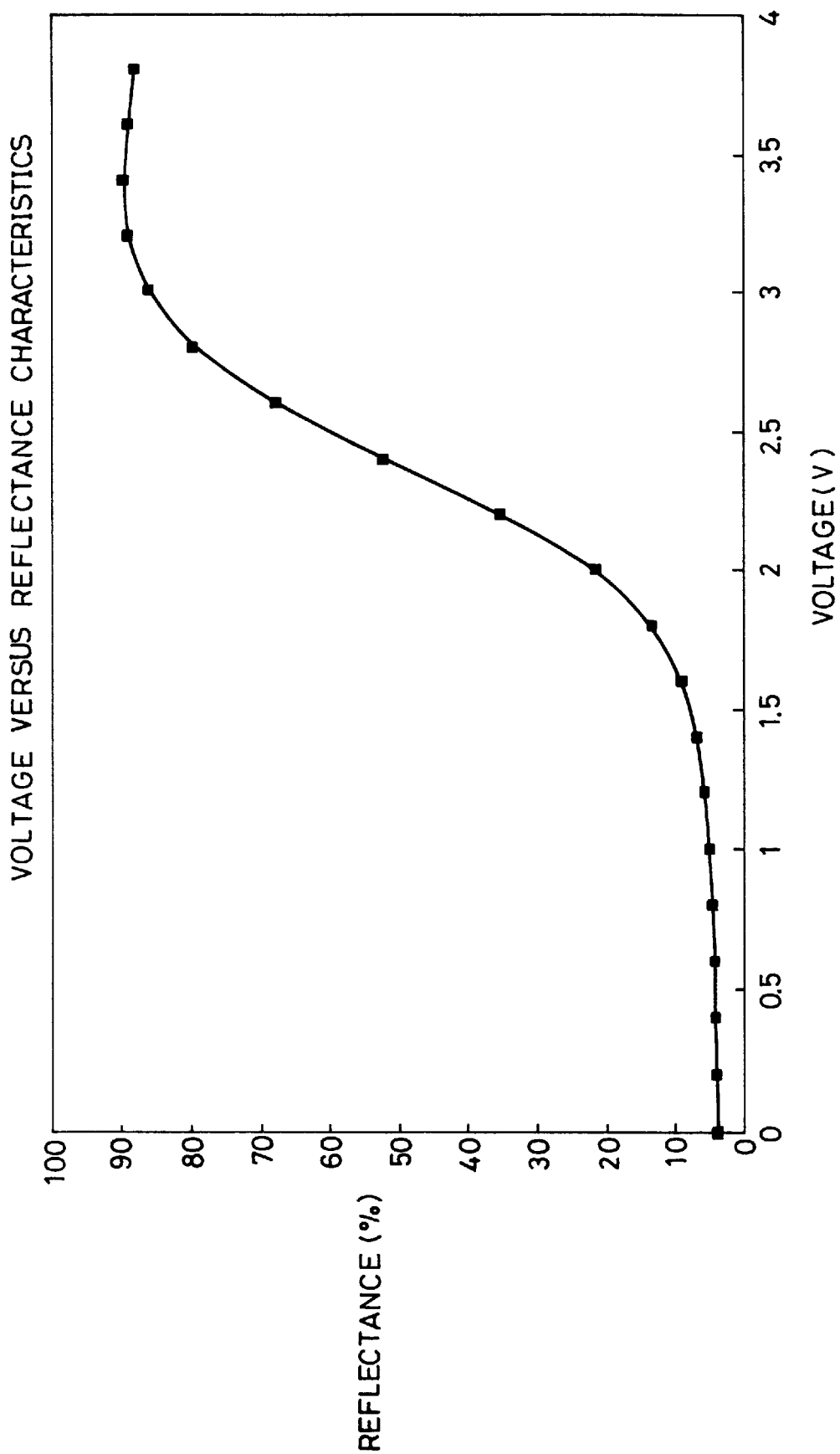
FIG. 11 is a graph showing correlation between the reflectance and the applied voltage of a reflective-type liquid crystal display device of Embodiment 1.
Figure 12:
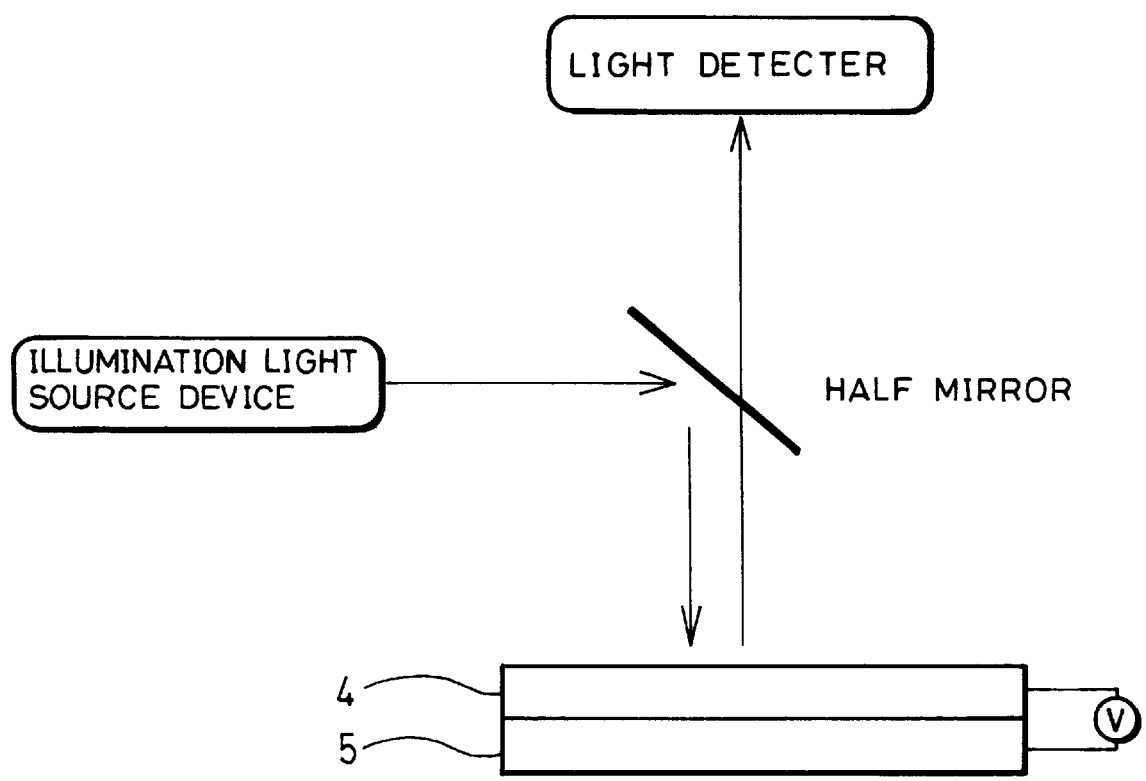
FIG. 12 is an explanatory view showing an arrangement of an optical system for measuring the reflectance of the reflective-type liquid crystal display device.

FIG. 11 is a graph showing dependence of reflectance on voltage in the liquid crystal display device prepared in accordance with the foregoing conditions. In order to measure reflectance, as shown in FIG. 12, while driving the reflective-type liquid crystal display device with means for applying a voltage across the reflective-type liquid crystal display device, light was projected from an illumination light source, via a half-mirror, from the upper substrate 4 to liquid crystal layer, and an optical detector detected light reflected from the light-reflective film on the reflective layer of lower substrate 5. Further, for reflectance, luminous reflectance (Y value) was used. In FIG. 11, reflectance of 100% was the value of the reflectance of a comparative cell, measured according to the arrangement shown in FIG. 12 with no voltage being applied, in which optical retardation compensation plates 8 and 9 were omitted, a polarizer plate 10 equivalent to that of the measured device was attached directly onto a substrate 4, and no liquid crystal is injected.

As the results in FIG. 11 show, it was found that with an applied voltage of 3V or less, reflectance of 90% was obtained, and good display characteristics, with a contrast of 20, were obtained. Incidentally, contrast was defined as the quotient in a bright state divided by the reflectance in a dark state. Here, the contrast ratio is defined as the reflectance during bright state divided by the reflectance during dark state. Further, upon measuring dependence of reflectance on wavelength, substantially flat reflectance characteristics were obtained in the visible region of the spectrum, yielding good black and white characteristics free of coloring.

In the present Embodiment, the alignment of the liquid crystal molecules was determined by rubbing processing. However, even in the case of vertical alignment without rubbing processing, although uniformity of display was somewhat inferior, equivalent display characteristics were found.

EMBODIMENT 2

Embodiment 2 discusses a reflective-type liquid crystal display device in which 360×|d/p|, i.e., the setting of the natural pitch p of the liquid crystal and the thickness d of the liquid crystal layer, is 120°, Δn×d of the liquid crystal layer is 300 nm, and three polycarbonate optical retardation compensation films prepared so as to have respective retardations of 135 nm, 270 nm, and 270 nm with respect to light transmitted in the normal direction of the surface are used as optical retardation compensation plates 8, 9, and 11.

In the present Embodiment, a reflective-type liquid crystal display device structured as shown in FIG. 3 was prepared by a typical manufacturing process. The electrode 7 disposed on the lower substrate 5 was made of aluminum as a light-reflective electrode. The liquid crystal display device was adjusted so that, after filling with liquid crystal, the liquid crystal layer thickness was 4.5 μm. The liquid crystal used had liquid crystal properties (dielectric anisotropy, elasticity, viscosity, temperature characteristics, voltage maintaining characteristics) equivalent to those of liquid crystal used in typical TFT transmission-type liquid crystal displays, except that Δn was adjusted to 0.0667. Further, (Δn×d), a product of Δn and the liquid crystal layer thickness d, was set to 300 nm.

The three optical retardation compensation plates were made of uniaxial stretched films of polycarbonate. For light of 550 nm wavelength transmitted in the normal direction of the surface, the optical retardation compensation plate 8 had a retardation controlled to 130 nm to 140 nm, and the optical retardation compensation plates 9 and 11 had a retardation controlled to 265 nm to 275 nm. The polarizer plate 10 was a polarizer plate with a unitary internal transmittance of 45%, which has an internal transmittance of 45% when measured in a single piece, and had an AR layer made of a dielectric multi-layer film.

Reflectance of the foregoing liquid crystal display device was measured, in the same way as in Embodiment 1, using the arrangement shown in FIG. 12. Reflectance of 100% was also defined as in Embodiment 1.

Voltage dependence of reflectance of the liquid crystal display device prepared as above was brightness of 95% during bright state, and a contrast ratio of 25. Thus, good display characteristics were obtained, and a viewing test also yielded good results. Bright state was achieved by applying a voltage able to obtain the greatest reflectance, and dark state was defined as the state when no voltage was applied.

It was confirmed that, a s no ted above, contrast could be improved in comparison with Embodiment 1 by preparing circularly polarized light using three optical retardation compensation plates, as in the present Embodiment 2.

EMBODIMENT 3

Embodiment 3 discusses a reflective-type liquid crystal display device in which rubbing processing is performed such that 360×|d/p| is 150°, Δn×d of the liquid crystal layer is 940 nm, and two optical retardation compensation plates having retardations of 135 nm and 270 nm, respectively, with respect to light passing in the normal direction of the surface are used.

For the liquid crystal, ZLI-4850 (Δn: 0.208; a Merck Japan Co. product), a nematic liquid crystal with negative dielectric anisotropy, was used, to which CN (cholesteryl nanoate) was added as a chiral agent, thus adjusting chiral pitch to 10.8 μm. This liquid crystal was sandwiched as a liquid crystal layer with a cell thickness of 4.5 μm and Δn×d of 1000 onm.

A liquid crystal display device according to the present Embodiment was prepared by disposing on the upper substrate 4 the two optical retardation compensation plates and polarizer plate used in Embodiment 1, in the arrangement shown in FIG. 10. When this liquid crystal display device was driven by a simple matrix at 1/480 duty ratio, good display, with a contrast of 10, was obtained.

It was confirmed, not only in the present Embodiment, that, when Δn×d of the liquid crystal was 500 nm to 1200 nm, and 360×|d/p| was 80° to 170°, electro-optical characteristics were steep, and simple matrix driving was possible.

EMBODIMENT 4

Figure 13:
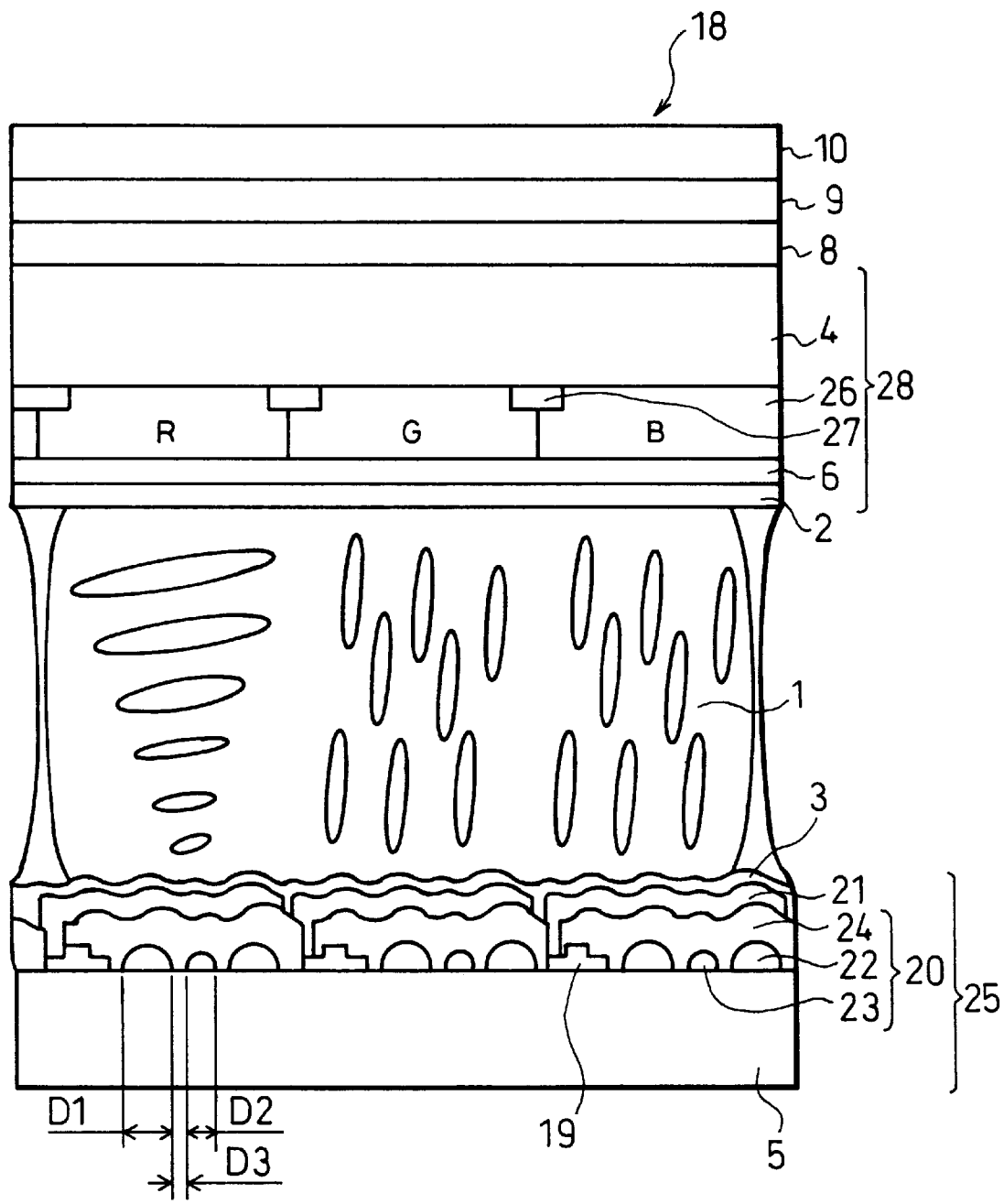
FIG. 13 is a cross-sectional view showing the structure of a reflective-type liquid crystal display device of Embodiment 4 incorporating an active element.

Embodiment 4 discusses driving using the active matrix method, and use of a micro-meter-scale undulation reflective plate. FIG. 13 is a cross-sectional view of the structure of a liquid crystal display device according to the present Embodiment.

A liquid crystal display device 18 includes a first substrate 5 and a second substrate 4 made of transparent glass, and on the first substrate 5, in each pixel, are disposed TFT elements 19 as active elements. On the TFT elements 19 and driving lines (not shown) are disposed an inter-layer insulating film 20. A drain electrode (not shown) of each TFT element 19 is electrically connected to a reflective pixel electrode 21 at the via-hole. On the reflective pixel electrodes 21 is disposed an alignment film 3 with a thickness of 100 nm.

A metal material, such as aluminum, nickel, chrome, silver, or alloys thereof, is used for the reflective pixel electrodes 21, which thus act as reflective metal films having light reflectivity. The shape of the reflective pixel electrodes 21, other than the via-holes, has micro-meter-scale undulation, which prevent the metal reflective surface from becoming a mirror surface. Vertical alignment of liquid crystal molecules on the micro-meter-scale undulation could be realized, thus confirming that influence of the micro-meter-scale undulation on alignment is not a problem.

Next, a method of forming the micro-meter-scale undulation will be explained in detail. First, on the substrate 5, after formation of the TFT elements 19 and the driving lines (not shown), a plurality of large projections 22 and small projections 23, made of a photosensitive resin material, are formed. The large projections 22 and small projections 23 are formed using photolithography to form a plurality of hemispherical patterns having diameters at the base of D1 and D2, respectively. D1 a nd D2 are set to 5 µm and 3 µm, respectively. Further, intervals therebetween are set to at least 2 µm. The height of these projections can be controlled according to the thickness with which the photosensitive resin material films are formed on the substrate, and is set to, for example, 1.5 µm. Thereafter, by means of exposure and baking steps, the photosensitive resin films are formed into projections of hemispherical shape.

Next, in such a way as to cover the large and small projections 22 and 23 and fill the flat intervals therebetween, a smoothing layer 24 is formed of the same kind of photosensitive resin material. Due to the influence of the large and small projections 22 and 23, the surface of the smoothing layer 24 has micro-meter-scale undulation of smoothed surface, thus achieving the desired shape. Incidentally, neither the large and small projections 22 and 23 nor the smoothing layer 24 are formed in the via-hole areas.

On a TFT element substrate 25 having the foregoing structure, the reflective pixel electrodes 21 are formed close to the liquid crystal layer, so as to also act as a reflective plate. By means of the foregoing structure, it is possible to realize a bright reflective-type liquid crystal display device which is free of doubled images, and which has a high so-called aperture ratio, because the TFT elements 19 and the element driving lines (not shown) cause no loss of the light transmitted through the liquid crystal layer and reflected by the reflective pixel electrodes 21.

On the other substrate, used opposite the TFT element substrate 25, is disposed a color filter 26 which has been given high brightness in order to accord with the reflection method. On the color filter 26 is disposed a black matrix 27, which prevents contamination of colors between adjacent pixels, and prevents leakage of reflected light from the interval between the reflective pixel electrodes 21 where desired voltage cannot be applied, and leakage of reflected light during dark display due to disturbance from the electric field for TFT driving. Since light incident on the black matrix 27 is already for the most part circularly polarized light, light reflected from the black matrix 27 is subject to the effects of the optical retardation compensation plates 8 and 9, and is absorbed by the polarizer plate 10. Thus, even if the black matrix 27 is made of an inexpensive metal film, etc., it does not give rise to reflected light which might impair visibility. However, it goes without saying that low reflectivity finish of the black matrix 27 contributes to display of even higher contrast.

By sputtering of ITO (Indium Tin Oxide), a transparent electrode 6, with a thickness of 140 nm and having a desired pattern, was formed on the color filter 26 as counter electrode to the reflective pixel electrodes 21, and an alignment film 2 was then formed on the transparent electrode 6. In this way, a color filter substrate 28 was processed. Incidentally, even if the thickness of the transparent electrode 6 is other than 140 nm, light which, due to the interference effect of the film thickness of the transparent electrode 6, is reflected before reaching the liquid crystal layer 1, is absorbed by the optical retardation compensation plates 8 and 9 and the polarizer plate 10, and thus there is no influence on dark display, and no impairment of visibility.

Further, the color filter 26 is optimally designed to attain a brightness suitable to a high-contrast display mode which uses a polarizer plate. With a black matrix 27 having an aperture ratio of 90%, the transmittance of the color filter substrate 28 was designed and measured to be 50% in Y scale.

The alignment films 3 and 2, disposed on the TFT array substrate 25 and the color filter substrate 28 prepared as above, were coated with a vertical alignment agent from which a vertical alignment film is formed and then rubbing processed. Then, after steps for spraying of plastic spacers (not shown), for supporting liquid crystal layer thickness, and placement of a seal around the periphery, the substrates 25 and 28 were placed opposite one another, accurately positioned each other, and cured under application of pressure, thus preparing a liquid crystal cell for introduction of liquid crystal. Then a liquid crystal material having negative dielectric anisotropy $\Delta\epsilon$ was introduced into the liquid crystal layer 1 by vacuum injection.

Next, the definition of directions of the present liquid crystal display device will be explained in detail. In what follows, these directions will be expressed in terms of above, below, and to the right and left with respect to the viewer directly in front of the liquid crystal display device. On the opposite side of the color filter substrate 28 from the liquid crystal layer 1 are disposed optical retardation compensation plates 8 and 9, made of stretched films of polycarbonate, and a polarizer plate 10 is further disposed thereon. In other words, a liquid crystal display device according to the present Embodiment was prepared by setting the respective optical retardation compensation plate slow axis directions 13 and 14 and the polarizer plate transmission axis direction 12 as shown in FIG. 10.

The rubbing processing direction 16 of the alignment film 2 of the color filter substrate 28 was set to the right direction of the liquid crystal display device. The liquid crystal layer was adjusted to have a layer thickness of 4.0 µm to 5.0 µm after introduction of the liquid crystal, and $\Delta n$ was approximately 0.07. Further, $\Delta n \times d$ was set to be approximately 350 nm. Due to the micro-meter-scale undulation of the reflective pixel electrodes 21, the value of the liquid crystal layer thickness varied by position. Further, a driving circuit was connected around the liquid crystal display panel, thus yielding a liquid crystal display device according to the present Embodiment.

In the liquid crystal display device according to the present Embodiment, the reflective pixel electrodes 21 are disposed close to the liquid crystal layer 1, and thus high resolution display, which was free of doubled images, could be realized. Because of the micro-meter-scale undulation of the reflective pixel electrodes 21, reflected light is scattered, and thus the viewer's face, etc. was not observed in the display screen, and good white display was realized. Further, since no member having a light scattering property is disposed on the front of the liquid crystal display device, a good dark state was attained, and display with a high contrast ratio was obtained. In addition, the reflectance of the bright state was 30% when compared to a perfect reflecting diffuser, and a contrast ratio of 15 was confirmed. Moreover, the present liquid crystal display device had superior viewing angle characteristics, and no gray scale inversion of display was observed.

In addition, since a color filter of high transmittance was used, sufficient reflectance was secured in a bright state even with display using a polarizer plate. Moreover, since reflectance during the dark state was low, there was no impairment of color purity due to reflected light from color elements selected for dark display influencing the reflected light from color elements selected for bright display. Further, in spite of the poor saturation of elementary colors of the high-brightness color filter 26, good color reproduction was obtained, without impairment of the color reproduction range of the color filter 26.

Further, when voltages set to a state intermediate between dark state and bright state were applied to the pixels, there were no problems with reproduction of gray-scale shades. Accordingly there were no problems with expressing intermediate hues and saturation of each color element of the color filter 26. Further, it was confirmed in actual driving that response speed was fast enough that there were no problems with playing moving images. In addition, reflectance of the dark state was not changed by fluctuations in ambient temperature, showing little change of display quality.

As discussed above, using practical methods, a reflective-type liquid crystal display device was prepared which was capable of gray-scale reproduction and display of moving images, and with which a good color reproduction range could be obtained.

The present Embodiment discussed driving using the thin-film transistor (TFT) method, but the present invention is not limited to this method, and, for example, an active matrix method using the MIM (Metal-Insulator-Metal) method may also be used. Further, the TFTs used may be amorphous silicon TFTs, polycrystalline silicon TFTs, or single-crystalline silicon TFTs.

In addition, when Δn×d of the liquid crystal was set to a large value, as in Embodiment 3 above, it was possible to use simple matrix driving with the present liquid crystal display device provided with a reflective surface having micro-meter-scale undulation.

As mentioned above, it was confirmed that vertical alignment was good even on the surface having micro-meter-scale undulation, and that uniform alignment could be obtained by rubbing. Further, it was confirmed that good alignment could be obtained even without rubbing processing of the substrate with the surface having micro-meter-scale undulation.

EMBODIMENT 5

Embodiment 5 discusses improvement of brightness by using a reflective surface with micro-meter-scale undulation which has in-plane anisotropy, and setting a viewing angle direction in a direction in which brightness is improved thereby.

In the present Embodiment, the micro-meter-scale undulation were formed in a pattern differing from that of the liquid crystal display device of Embodiment 4, and so as to vary its shape by direction in the plane of the reflective pixel electrodes. For example, the micro-meter-scale undulation are provided, as shown in FIG. 14, with an elliptical instead of circular shape.

Figure 15:
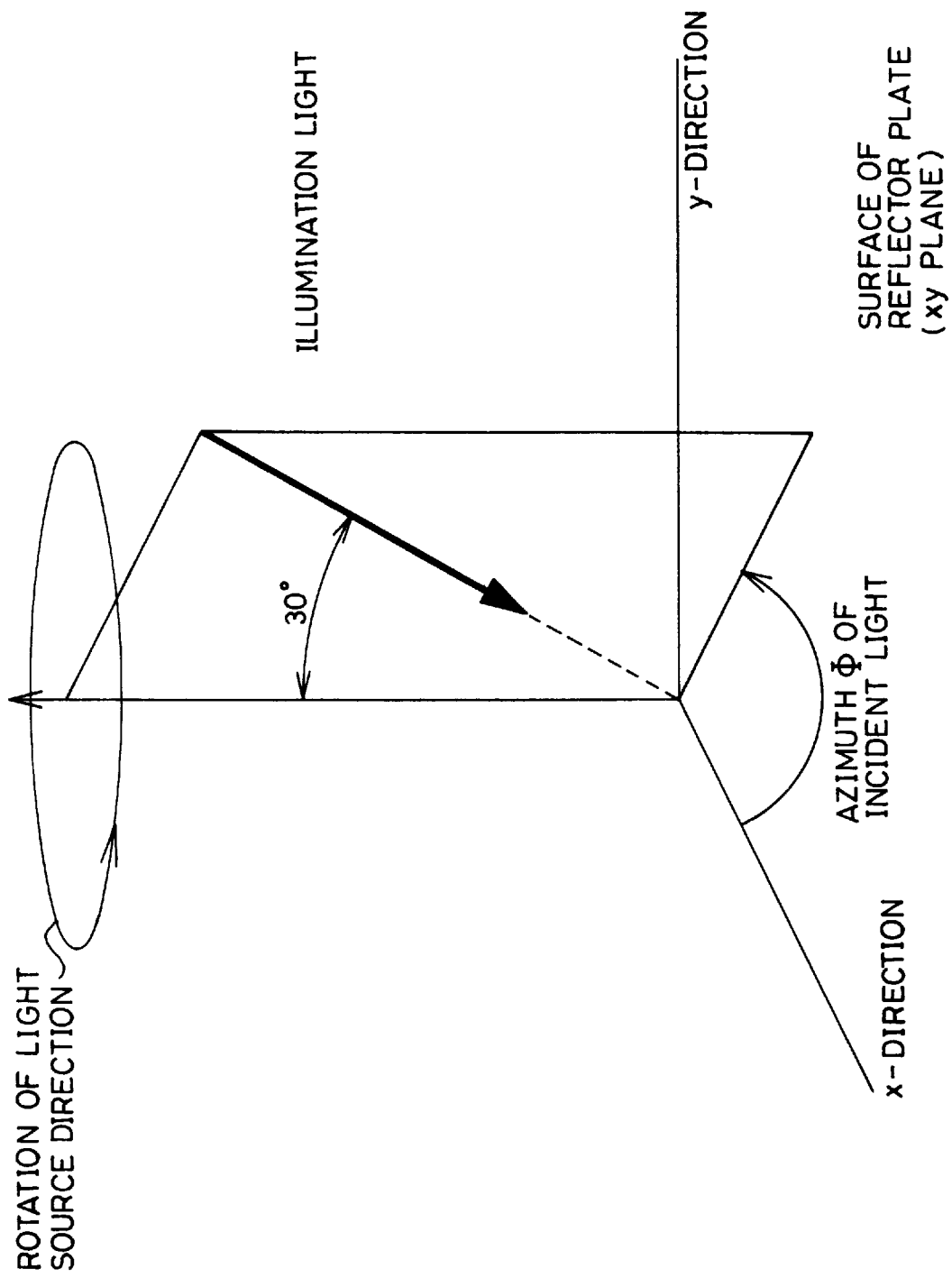
FIG. 15 is an explanatory view showing an arrangement of an optical system for measuring the reflection characteristics of an anisotropic micro-meter-scale undulation reflective plate of Embodiment 5.

The reflective characteristics of the reflective surface with micro-meter-scale undulation were investigated, using the optical measuring arrangement shown in FIG. 15. In other words, illuminating light was projected from a direction inclined 30° with respect to the normal direction of the reflective plate, and the intensity of light reflected into the normal direction of the reflective plate was measured while rotating the direction from which the illuminating light was projected, thus measuring the anisotropy of reflectivity.

As a result, the reflective characteristics shown in FIG. 16 were obtained. In the Figure, the curved line 16-1 shows converted measured values for the anisotropic scattering reflective plate of the present Embodiment, and the curved line 16-2 shows converted measured values for the scattering reflective plate of Embodiment 4 above. In other words, it was found that in the present Embodiment, light projected from certain directions is efficiently reflected into the front direction of the liquid crystal display device by the reflective plate. However, in view of the fact that the refractive index of liquid crystal material differs greatly from that of air, in making the foregoing measurement, the reflective surface was coated with an immersion oil (matching oil) with a refractive index of 1.53, over which a transparent glass plate was affixed. Further, the measured values were converted to values on a scale in which 100% is a value obtained when a perfect reflecting diffuser of MgO was measured in the same way as above.

Figure 14:
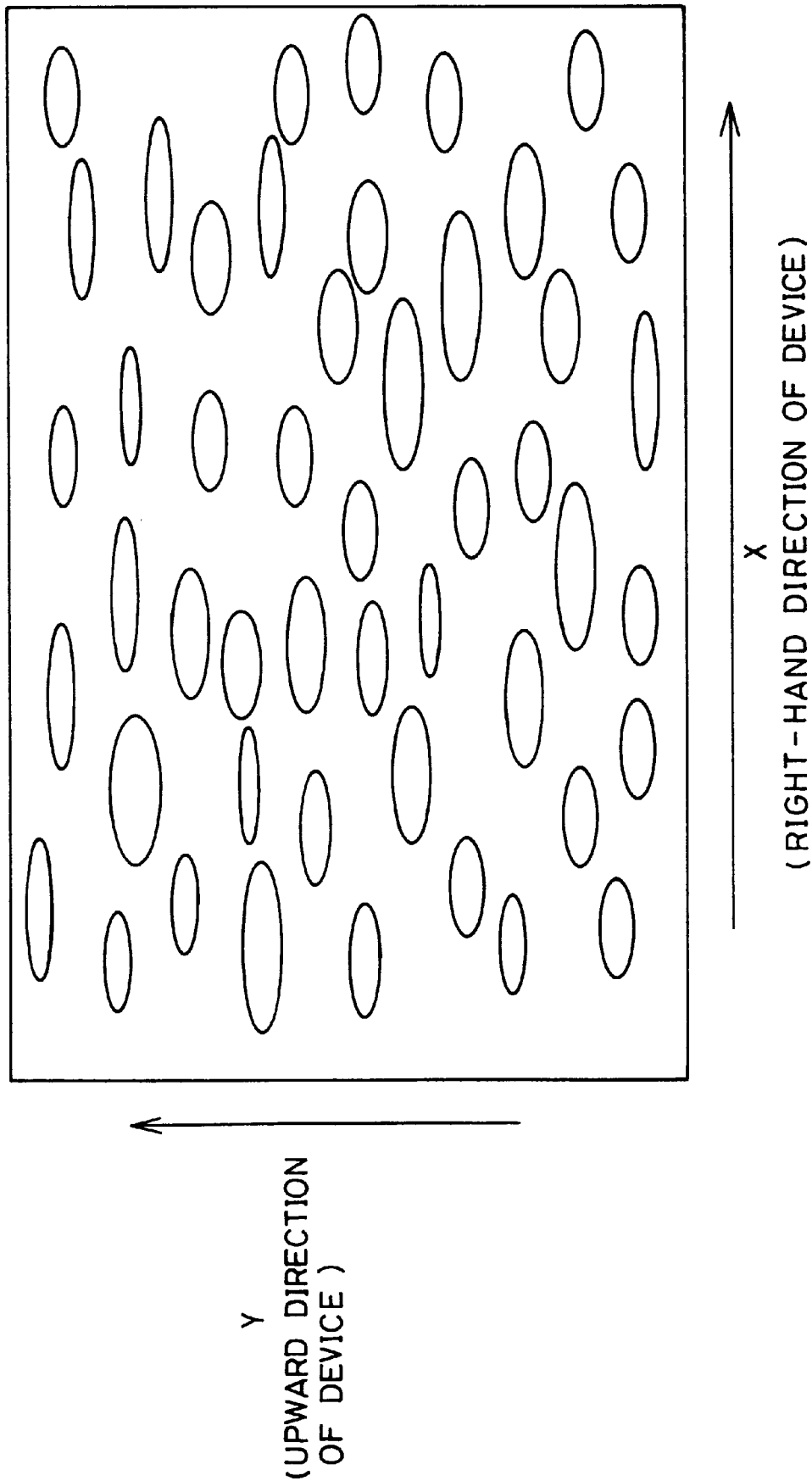
FIG. 14 is a plan view showing a structure of an anisotropic micro-meter-scale undulation reflective plate of Embodiment 5.

As a result, it was found that the intensity of reflected light when light was projected from the X direction in FIG. 14 (a direction of longer average period of micro-meter-scale undulation) differed from the intensity of reflected light when light was projected from the Y direction in FIG. 14 (a direction of shorter average period of micro-meter-scale undulation). Upon investigating shapes other than elliptical, similar results were found, i.e. reflected light was brighter when light was projected from a direction of shorter average period of micro-meter-scale undulation of the reflective surface.

The present liquid crystal display device was prepared such that the direction of alignment processing and the directions of attachment of the polarizer plate and optical retardation compensation plates were as shown in FIG. 10. The reflective-type liquid crystal display device provided with the foregoing reflective surface having micro-meter-scale undulation was prepared by the same method as in Embodiment 3 above, except for the steps for forming the pattern of micro-meter-scale undulation in the reflective plate. In a viewing test of the present liquid crystal display device, a viewer positioned directly in front of the display screen observed a bright display, thus confirming the brightness-enhancement effect of the anisotropic micro-meter-scale undulation. Here, brightness of reflected light was high when illumination light was projected from a direction above or below the viewer. Further, when illumination light was projected from directly in front of the display screen, viewing tests from inclined viewing directions showed high brightness in viewing directions inclined upwards and downwards with respect to the normal direction of the display screen.

Incidentally, the preferred direction of the period of micro-meter-scale undulation used in the present Embodiment can be set to a different direction in keeping with the chief environment in which the liquid crystal display device according to the present invention is to be used.

EMBODIMENT 6

Embodiment 6 discusses an example provided with a touch panel (a pressure detecting input device), a data input means for the portable devices which are a major field in which the liquid crystal display device according to the present invention is to be used.

Figure 18:
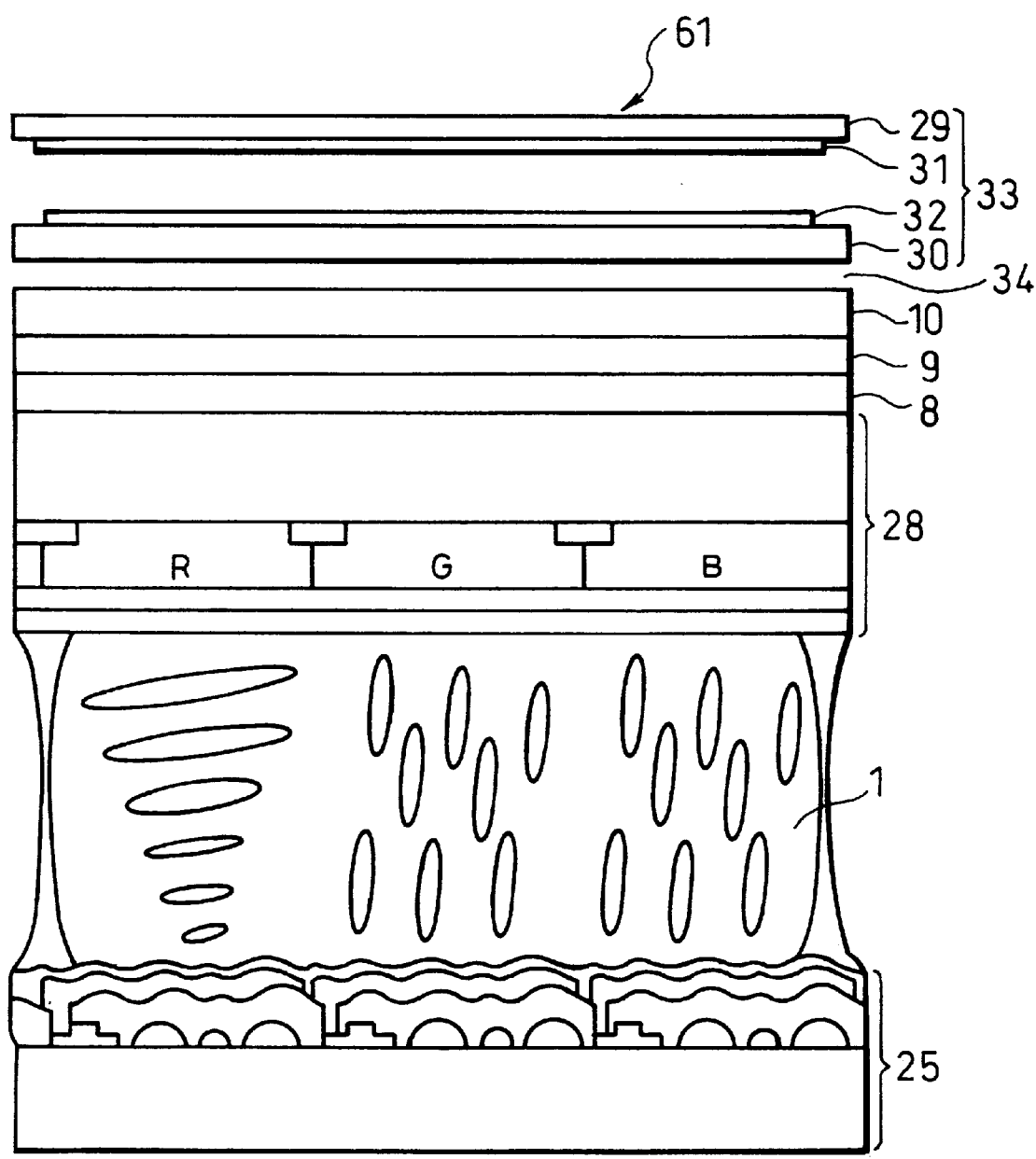
FIG. 18 is a cross-sectional view showing one example of a structure for a touch panel disposed before the reflective-type liquid crystal display device of Embodiment 6.

FIG. 17 is a schematic structural drawing of a touch panel 33. In the touch panel 33, materials with no optical anisotropy are used for a flexible substrate 29 and a supporting substrate 30. In the FIG., 31 and 32 are touch position detecting transparent electrodes. FIG. 18 shows a first example of a structure provided with a touch panel (hereinafter referred to as "structural example 61"), in which the touch panel 33, having the structure shown in cross-section in FIG. 17, is disposed on the front of the liquid crystal display device discussed in Embodiment 4 above.

Figure 19:
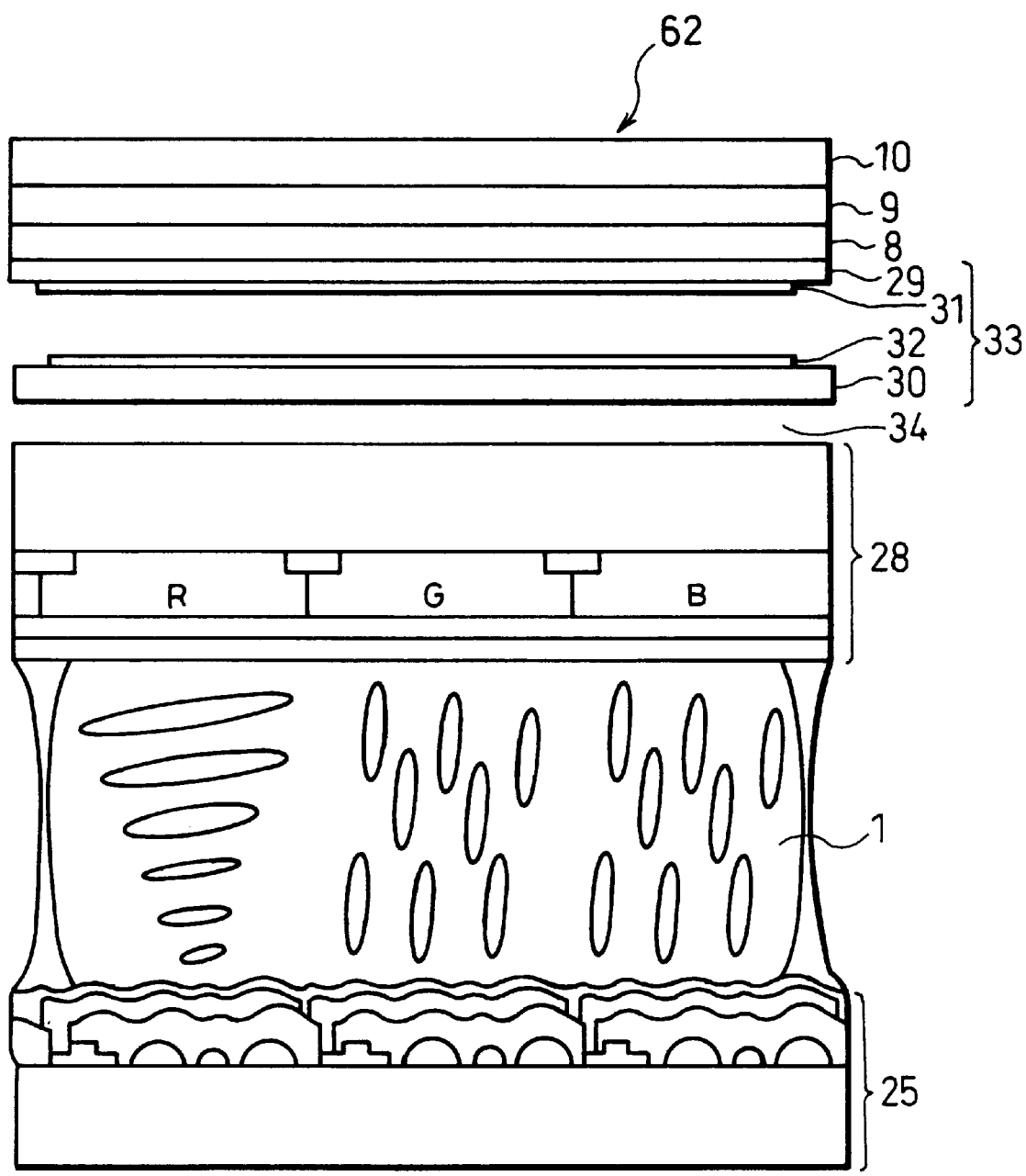
FIG. 19 is a cross-sectional view showing one example of a structure for a touch panel internally incorporated by the reflective-type liquid crystal display device of Embodiment 6.

Further, FIG. 19 shows a second example of a structure provided with a touch panel (hereinafter referred to as "structural example 62"), in which optical retardation compensation plates 8 and 9 and a polarizer plate 10 are affixed to the front of the touch panel 33, having the structure shown in cross-section in FIG. 17, which is disposed on the front of a liquid crystal display device which is equivalent to that of Embodiment 4 above except that optical retardation compensation plates and polarizer plate are not provided.

In both structural examples 61 and 62, the alignment of the liquid crystal molecules and the configuration of a polarizer plate and optical retardation compensation plates was as shown in FIG. 10, and the respective structures other than the touch panel 33 were the same as in Embodiment 4 above. Further, in structural example 62, in order to provide a pressure insulation effect by maintaining a fixed interval between the supporting substrate 30 of the touch panel 33 and the substrate 4, an empty space 34 is provided therebetween. In this way, structural examples 61 and 62 is structured such that pressure applied to the touch panel 33 is not transmitted to the substrate 4, without using a pressure insulation member, thus reducing weight.

As a result of comparison of the structural examples 61 and 62, it was found that in structural example 61, since light components reflected from the touch panel 33 were directly observed by the viewer, visibility was greatly impaired. This reflected light resulted not only from the surfaces of the electrodes 31 and 32 facing a space between the said electrodes, but also from an empty space 34 for pressure insulation between the supporting substrate 30 of the touch panel 33 and the polarizer plate 10.

In structural example 62, on the other hand, no such reflected light components were observed, and the same excellent display was found as when no touch panel was used. No reflected light from the empty space between the touch position detecting transparent electrodes 31 and 32 of the touch panel 33 was observed, nor was any observed from the respective interfaces between the pressure insulation empty space 34 and the supporting substrate 30 of the touch panel 33 or the substrate 4 of the liquid crystal display device. Thus, a reflective-type liquid crystal display device with integral input device could be prepared without using a pressure insulation member, thus reducing weight, in which the display device can effectively use for display with circularly polarized light produced by the reflection preventing means for the input device.

Further, although not shown in the Figures, an alternative structure which was even simpler and of lighter weight was one in which, in structural example 62, the flexible substrate 29 of the touch panel 33 was omitted, and the touch position detecting transparent electrode 31 was disposed directly on the side of the optical retardation compensation plate 8 toward the liquid crystal layer.

In the foregoing Embodiments, uniaxially stretched films were used for the optical retardation compensation plates, but it is also possible to use biaxial optical retardation films, i.e., films capable of controlling the refractive index three-dimensionally, optical retardation films made of liquid crystalline polymer, etc. In this case, it was confirmed that viewing angle characteristics could be improved.

The foregoing Embodiments 1 through 6 explained conditions for improving contrast ratio in a reflective-type liquid crystal display device including a liquid crystal layer having vertical alignment, and application of the present invention to simple matrix and active matrix driving and to a liquid crystal display device with an integrated pressure sensitive input device, provided with a touch panel.

The following description will explain conditions for further improving display quality with the same liquid crystal layer as in the previous Embodiments, i.e. the reflective-type liquid crystal display device having a vertically aligned liquid crystal layer.

The Embodiments 7 through 12 presented in the following in accordance with the conditions of the present invention, are only meant to be illustrative, and by no means restrictive, to the scope of the present invention.

EMBODIMENT 7

Referring to FIG. 1, the following description will explain a reflective-type liquid crystal display device of Embodiment 7 where only one of the two substrates sandwiching the liquid crystal layer is subjected to rubbing processing. The reflective-type liquid crystal display device included two optical retardation compensation plates having retardations of 135 nm and 270 nm respectively with respect to light transmitted in the normal direction of the surface. After, after the rubbing processing, the natural pitch and the layer thickness d of liquid crystal were arranged to satisfy $|d/p|=0.33$, and $\Delta n \times d$ of a liquid crystal layer was set to 350 nm.

A liquid crystal layer 1 was sandwiched by a vertical alignment film 2, which had undergone tilted alignment processing, disposed on an upper substrate 4, and a vertical alignment film 3, which had undergone no alignment processing, disposed on a lower substrate 5. The upper and lower substrates 4 and 5 had electrodes 6 and 7 respectively for applying a voltage across the liquid crystal layer 1. The electrode 7 might have doubled as a reflective plate. The electrode 7 might have also had the shape having micrometer-scale undulation to such an extent that the polarization of reflected light could be preserved when the electrode 7 was to be equipped with reflection characteristics. Here a reflective electrode 7, having micro-meter-scale undulation (not shown), capable of preserving the polarization of light in the foregoing manner was used. The micro-meter-scale undulation surface might have had a period of micro-meter-scale undulation, variable depending upon direction on the reflective plate. An active element and other components might have been used as voltage application means for applying a voltage across the pair of electrodes thus formed. It goes without saying that in the present invention the drive method was not limited in any particular manner.

Moreover, an optical retardation compensation plate 8 and an optical retardation compensation plate 9 were disposed on a side of the upper substrate 4 closer to the viewer, and a polarizer plate 10 was disposed further thereon to prepare a reflective-type liquid crystal display device having the structure shown in FIG. 1. Here, aluminum film was used for an electrode 7 on the lower substrate 5 to act as a light-reflective electrode. The electrode 7 hence doubled as a reflective film and an electrode.

The reflective-type liquid crystal display device of the present Embodiment was adjusted to have a liquid crystal layer thickness of 4.7 μm, used a polyimide vertical alignment film for the alignment films, and underwent rubbing processing to be provided with a tilt angle. The tilt angle was 2° with respect to the normal direction. Although in the present Embodiment only one of the substrates underwent rubbing processing, it was confirmed that this gave a uniform alignment to liquid crystal therebetween.

In the present Embodiment, ZLI-2857 (available from Merck Japan Co.) having negative dielectric anisotropy was used as a liquid crystal material, and S-811 (available from Merck Japan Co.) was added as a chiral agent. Since $\Delta n \times d$ of ZLI-2857 was 0.074 and the thickness of the liquid crystal layer was set to 4.7 $\mu$m in the present Embodiment, the $\Delta n \times d$ was set to 350 nm.

Figure 20:
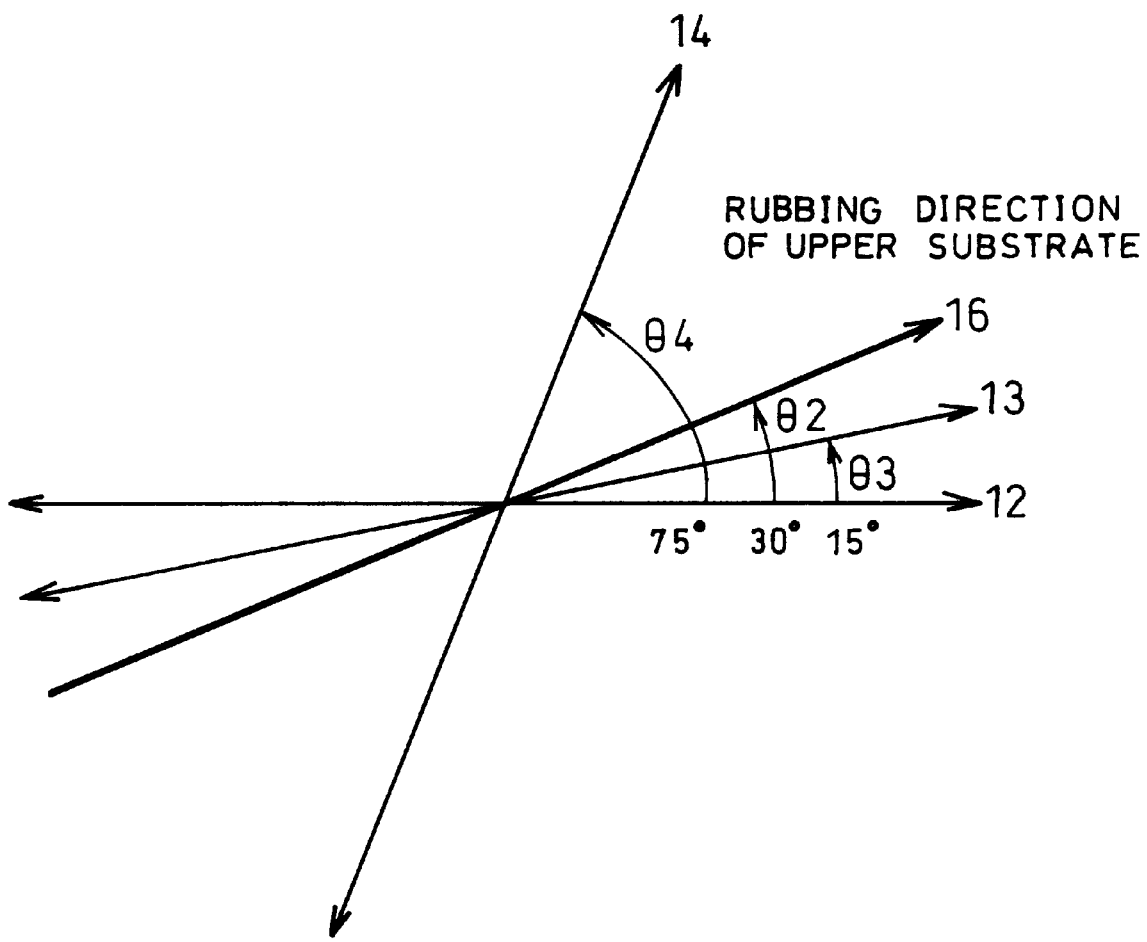
FIG. 20 is a plan view showing directions of arrangement of a polarizer plate and optical retardation compensation plates of a reflective-type liquid crystal display device.

These specific settings are shown in FIG. 20: $\theta 3$ and $\theta 4$ were set to 15° and 75° respectively. $\theta 3$ was the angle formed by a polarizer plate transmission axis direction 12 and a slow axis direction 13 of the first optical retardation compensation plate 8, and $\theta 4$ was the angle formed by a polarizer plate transmission axis direction 12 and a slow axis direction 14 of the second optical retardation compensation plate 9. The direction 16 represented the rubbing direction for the upper substrate 4 when viewed in the direction of incident light entering the liquid crystal display device, i.e. the alignment of the liquid crystal molecules on the vertical alignment film 2 formed on the upper substrate 4.

The angle $\theta 2$, defined as the angle formed by the polarizer plate transmission axis direction 12 and the rubbing direction for one of the two substrates having undergone rubbing processing (in this case, the upper substrate 4), i.e. the alignment 16 of the liquid crystal molecules on the light-entering side of that substrate, was set to 30°; however, since circularly polarized light entered the liquid crystal layer, general characteristics of the present Embodiment did not depend on the angle $\theta 2$. In addition, since the value of $|d/p|$, which is an absolute value of a ratio of the natural pitch and the layer thickness d, was set to 0.33, the liquid crystal molecules had vertical alignment without being twisted at an initial state.

The optical retardation compensation plates 8 and 9 were made of polycarbonate stretched films. The optical retardation compensation plate 8 had a retardation controlled to 130 nm to 140 nm with respect to light, having a wavelength of 550 nm, transmitted in the normal direction of a surface thereto. The optical retardation compensation plate 9 had a retardation controlled to 265 nm to 275 nm with respect to light of the same characteristics. Although the optical retardation compensation plates 8 and 9 were placed so as to produce good optical characteristics in the normal direction of the prepared liquid crystal display device, a change in design could be made taking into consideration characteristics by observation in an oblique direction as well as the liquid crystal layer.

A design to change the phase difference of the optical retardation compensation plates with respect to light travelling in an oblique direction became possible by replacing at least one of the optical retardation compensation plates 8 and 9 with a biaxial optical retardation compensation plate, while satisfying the angle setting conditions of the present Embodiment shown in FIG. 20.

Figure 21:
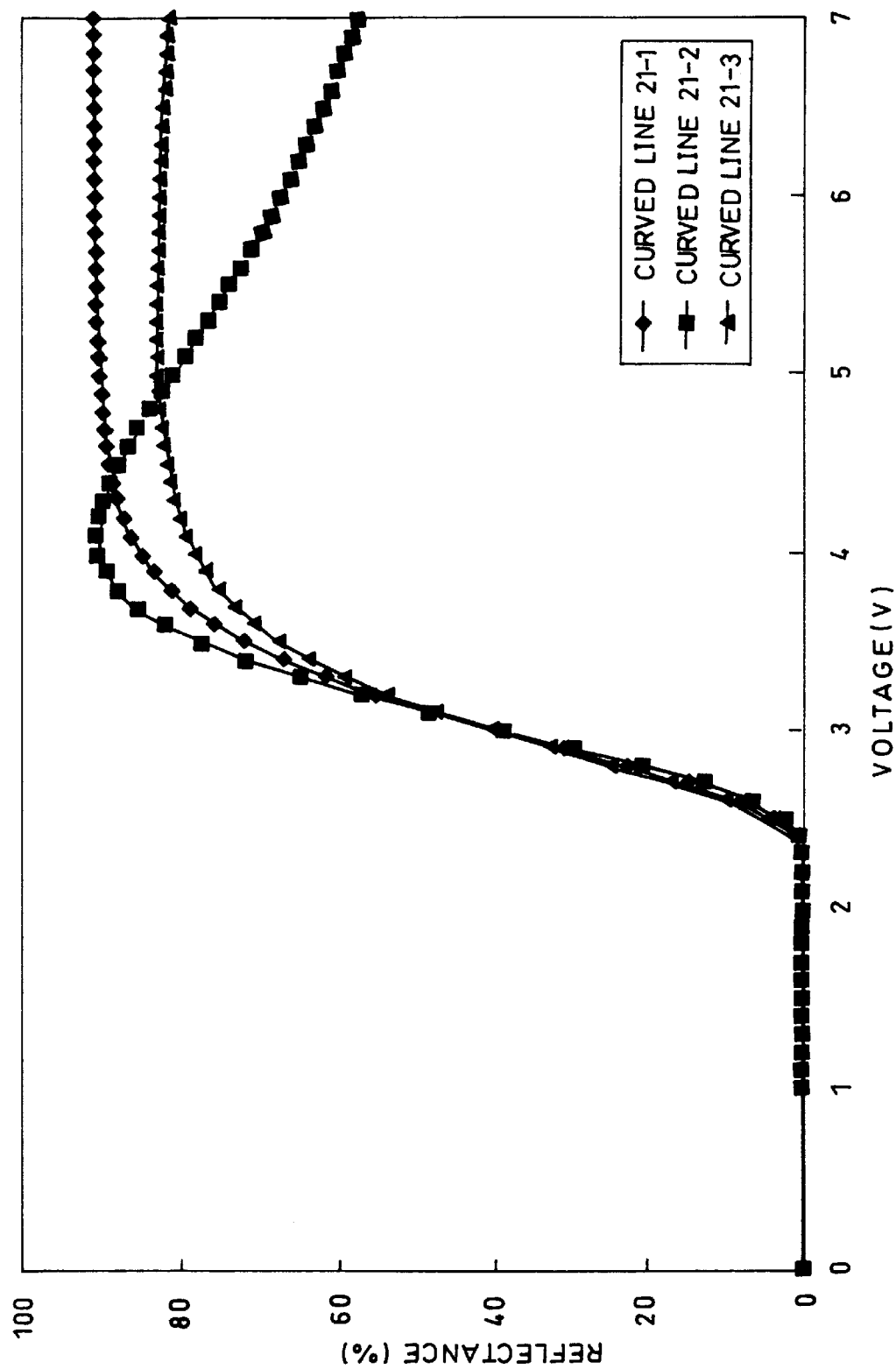
FIG. 21 is a graph showing correlation between the reflectance and the applied voltage of a reflective-type liquid crystal display device of Embodiment 7.

FIG. 21 is a graph showing the dependence of the reflectance on the applied voltage of the reflective-type liquid crystal display device thus prepared. The reflectance was measured with the method shown in FIG. 12.

It was found from the results shown in FIG. 21 that a driving voltage of 3V or lower could successfully produce good display having a brightness of 90% and a contrast of 40. The curved lines in FIG. 21 represented the dependence of the voltage versus reflectance characteristics on the amount of the chiral agent added, i.e. twist amount dependence. The curved lines 21-1, 2-12, and 21-3 had $|d/p|$ of 0.33, 0, and 0.5 respectively. It was found from the curved line 21-1 that flat voltage versus reflectance characteristics was obtained where the reflectance does not decrease even if a higher voltage than a voltage at which sufficient bright state was effected was applied. The curved line 21-2 shows the voltage versus reflectance characteristics of liquid crystal of the same settings as those of the liquid crystal for the curved line 21-1, except that a chiral agent was not added to the liquid crystal for the curved line 21-2.

From these graphs, it was found that addition of a chiral agent produced such voltage versus reflectance characteristics that the reflectance does not decrease even if a higher voltage than a voltage at which sufficient bright state was effected was applied that the setting margin of the applied voltage could be made wider for a voltage at which sufficient bright state was effected. Also, it was possible to alleviate the phenomenon of the voltage at which sufficient bright state was effected shifting when the observation direction was changed along the azimuthal direction without changing the inclination angle with respect to the normal direction of the substrate. Also, it was found from measurement of dependence of the reflectance on the wavelength that substantially flat characteristics were obtained and that good black and white display characteristics free of coloring were obtained.

Figure 22:
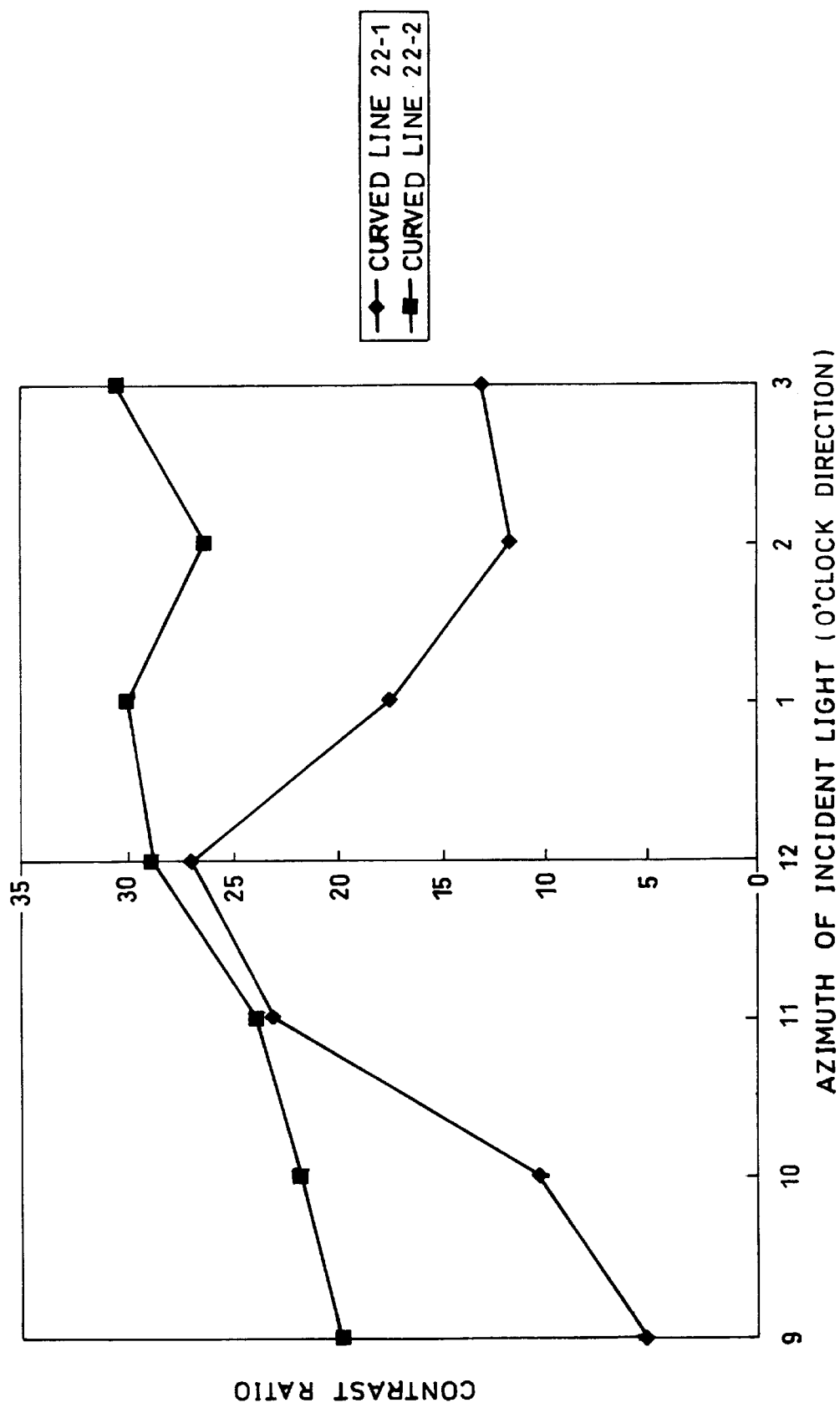
FIG. 22 is a graph showing dependence of the contrast of a reflective-type liquid crystal display device of Embodiment 7 on the azimuth of incident light.

Measurement was also made on the viewing angle dependence for a case where $|d/p|$ was set to 0.33 and 0.22 and $\Delta n \times d$ of the liquid crystal layer was set to 350 nm and 230 nm by changing only the thickness of the cell to 4.7 $\mu$m and 3.1 $\mu$m in a liquid crystal cell of otherwise the same arrangement as the foregoing example. FIG. 22 shows the results of measurement of a ratio of two values of reflectance of white display and black display, i.e. contrast ratio, from the 3 o'clock direction passing the 12 o'clock direction to the 9 o'clock direction when incident light enters 30° with respect to the normal direction of the display surface and light was received in the normal direction. The curved line 22-1 shows the case when $\Delta n \times d$ of the liquid crystal layer was 350 nm, and the curved line 22-2 shows the case when $\Delta n \times d$ of the liquid crystal layer was 230 nm. Contrast was measured for all the azimuths with respect to incident light, and an arrangement was made such that the incident direction at which contrast is smallest was the 6 o'clock direction.

As clearly seen in FIG. 22, the setting of $\Delta n \times d$ to 230 nm ensured a contrast ratio of 20 or larger in substantially all directions, effecting excellent black and white display.

Here, regarding $\Delta n \times d$ of a liquid crystal layer, the inventors confirmed that a liquid crystal display device arranged so as to satisfy the following conditions could reduce the voltage and optimize the hue of bright display when only one of the substrates undergoes rubbing processing.

Specifically, FIGS. 23(*a*) and 23(*b*) show the results of plotting of values of FOM, from 0 through 1 in increments of 0.1, in a coordinate space defined by the applied d voltage (axis of ordinates) and the parameter $|d/p|$ (×360: axis of abscissas) denoting a kind of measure to the twist angle between the upper and lower substrates of the liquid crystal. FIG. 23(*a*) and FIG. 23(*b*) show results of the case where the liquid crystal had $\Delta n \times d$ of 350 nm and 200 nm respectively.

The hatched regions in FIGS. 23(*a*) and 23(*b*) show cell arranging conditions producing a bright state; good white display was effected in the hatched region. It was found that driving at a low voltage was possible in the vertically elongated part in FIG. 23 (a), since the vertically elongated hatched part was longer in FIG. 23(b) where the retardation was 200 nm, and the vertically elongated hatched part was located toward the lower voltage in FIG. 23(a) than in FIG. 23(b). A vertically elongated hatched region means that the setting margin could be made wider for a voltage at which reflectance effected a sufficient bright state and that it was possible to alleviate the phenomenon of the voltage at which sufficient bright state was effected shifting when the observation direction was changed along azimuthal direction with respect to the normal direction of the substrate. In other words, a vertically elongated hatched region means that viewing angle characteristics improved.

In FIG. 23(a), 360×|d/p| ranged from 80 to 150 in the vertically elongated hatched part mentioned above, and therefore the range of |d/p| for providing good white display was:

$$0.22 \leq |d/p| \leq 0.42 \tag{5}$$

As for Δn×d, a graph was drawn that had Δn×d instead of |d/p| for the axis of abscissas and was otherwise the same as FIGS. 23(a) and 23(b), and it was confirmed from considering the graph that good white display was obtained when the range of Δn×d was:

$$200 \text{ nm} \leq \Delta n \times d \leq 650 \text{ nm} \tag{6}$$

From the foregoing description, the voltage could be reduced and good viewing angle characteristics were realized when the twist angle and Δn×d of the liquid crystal satisfied conditions expressed by Equations (5) and (6).

Full color display became possible by using a color filter substrate as the upper substrate 4. It was confirmed that better viewing angle characteristics could be obtained by using both a biaxial optical retardation compensation plate and negative dielectric anisotropy.

Moreover, the viewing angle dependence of the contrast of the reflective-type liquid crystal display device was calculated, regarding the angle θ2 formed by the transmission axis of the polarizer plate 10 and the direction of liquid crystal molecules on the upper substrate 4, with the same arrangement as in Embodiment 7 including a liquid crystal layer having the same arrangement, while maintaining the arrangement of the optical retardation compensation plates and the polarizer plate with respect to each other. FIGS. 24 through 29 show the results of calculations when the angle θ2 formed by the transmission axis of the polarizer plate and the alignment of the liquid crystal molecules on the upper substrate 4 was 0°, 45°, 90°, 135°, 150°, and 165°. Increasing or decreasing θ2 corresponds to rotating the polarizer plate and the optical retardation compensation plate fixed relative to the polarizer plate with respect to the liquid crystal layer. Further, the polarizer plate and the optical retardation compensation plate are completely equivalent in terms of a rotation of 180°. For these reasons, FIG. 24 also shows a case where θ2 is 180°. Here, calculations were done for the case where the contrast was specular reflection, i.e. such an arrangement that the projected light axis and the received light axis had the same inclination angles and azimuths mutually displaced by 180°. The radius of a concentric circle refers to the inclination angle, of the observation direction, measured with respect to the normal direction of the display surface, and the direction of the concentric circle refers to the azimuth of the observation direction with respect to the display surface.

Figure 24:
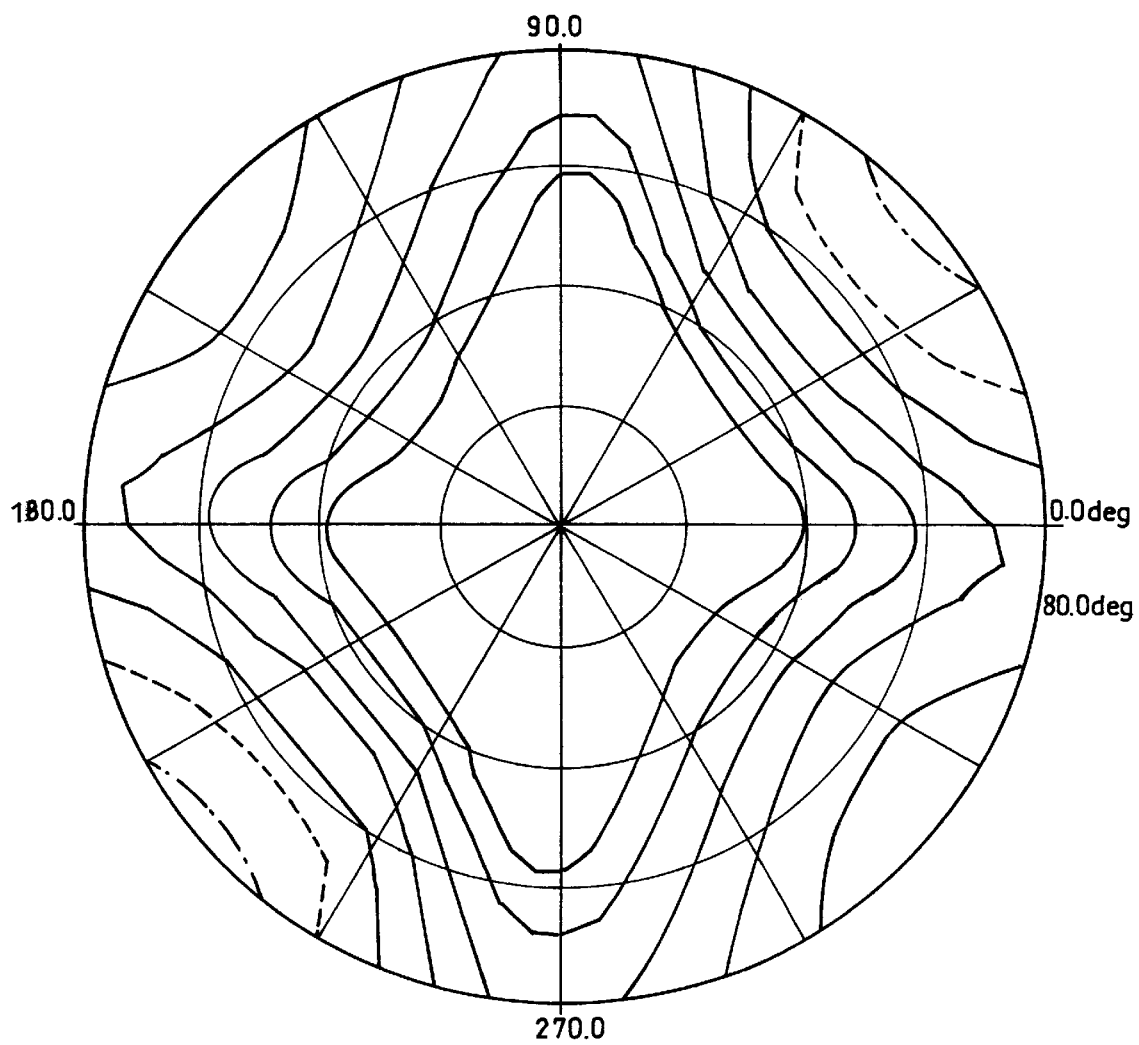
FIG. 24 is a contour map of the reflection brightness of the reflective-type liquid crystal display device of Embodiment 7 when an angle θ2 formed by a transmission axis of a polarizer plate and the alignment of liquid crystal molecules on an upper substrate is 0°.
Figure 25:
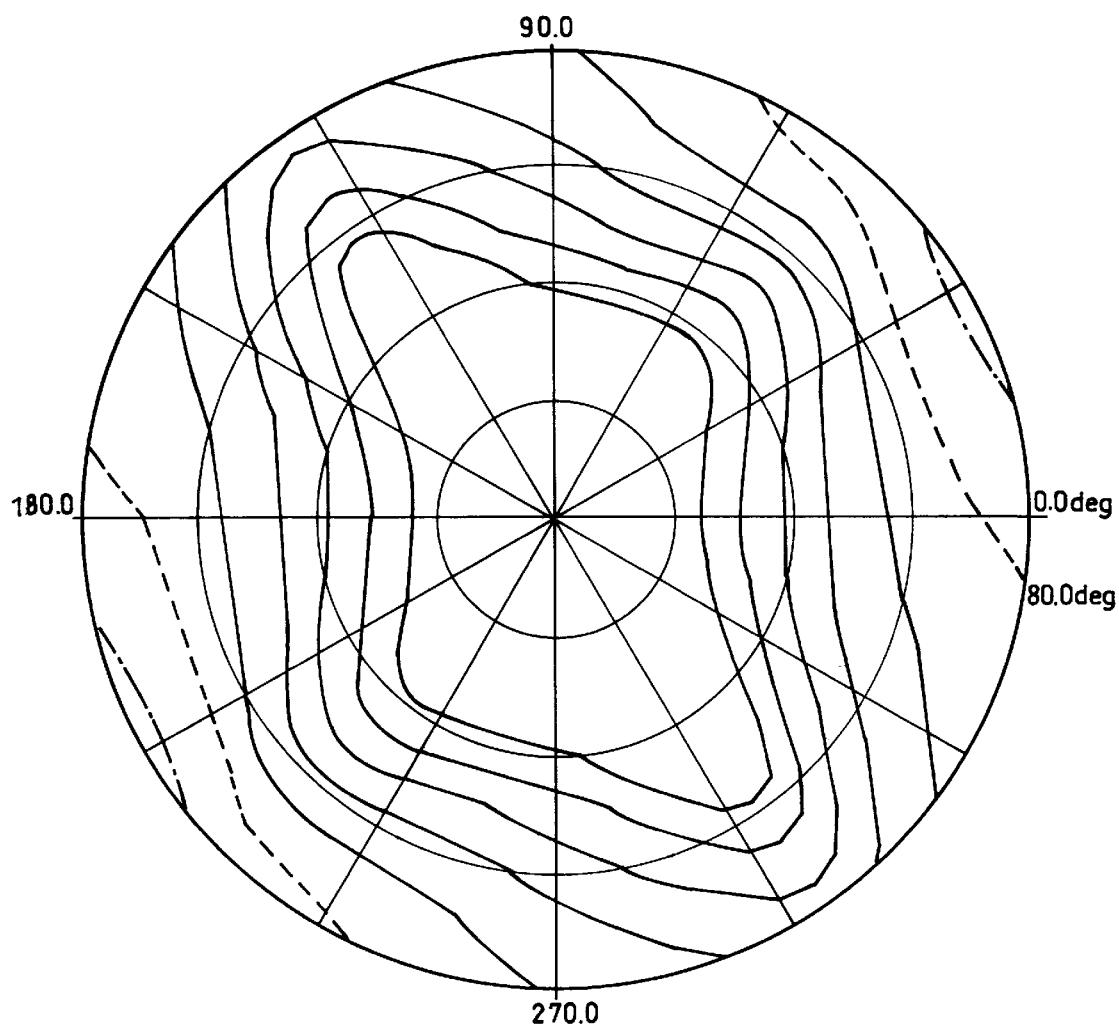
FIG. 25 is a characteristics drawing showing, as a contour map, a contrast defined as the quotient of a luminous reflectance of a bright state (3.2V) divided by a luminous reflectance of a dark state (2.2V) of the reflective-type liquid crystal display device of Embodiment 7 in various directions when the viewing direction is changed from 0° to 80°, measured with the inclination angle from the normal direction of the liquid crystal panel, and 0° to 360° measured with the direction angle.
Figure 26:
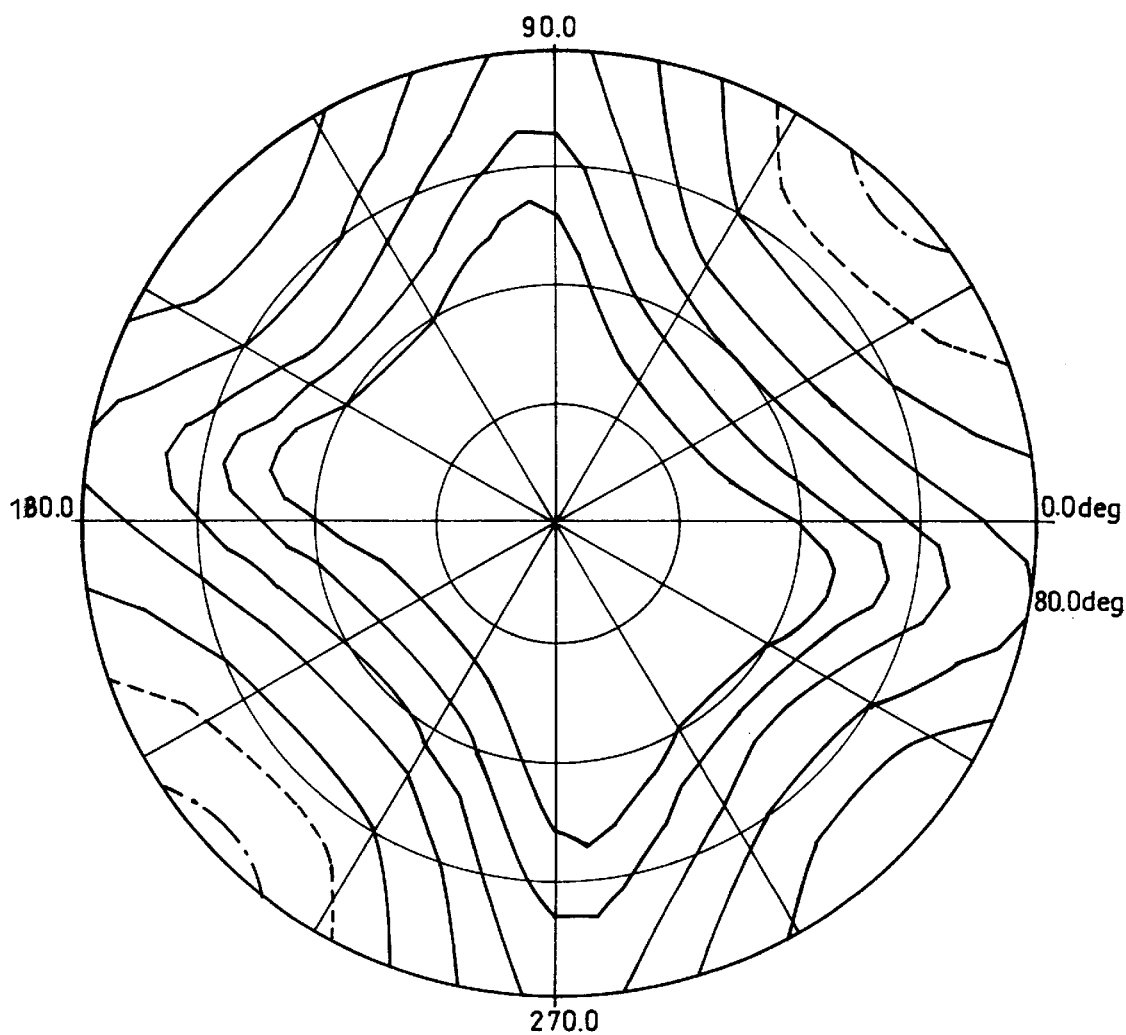
FIG. 26 is a characteristics drawing showing, as a contour map, a contrast defined as the quotient of a luminous reflectance of a bright state (3.2V) divided by a luminous reflectance of a dark state (2.2V) of the reflective-type liquid crystal display device of Embodiment 7 in various directions when the viewing direction is changed from 0° to 80°, measured with the inclination angle from the normal direction of the liquid crystal panel, and 0° to 360° measured with the direction angle.

FIGS. 24 and 25 show that when θ2 was 0° or 45°, the resulting contrast was excellent in one particular direction.

Figure 27:
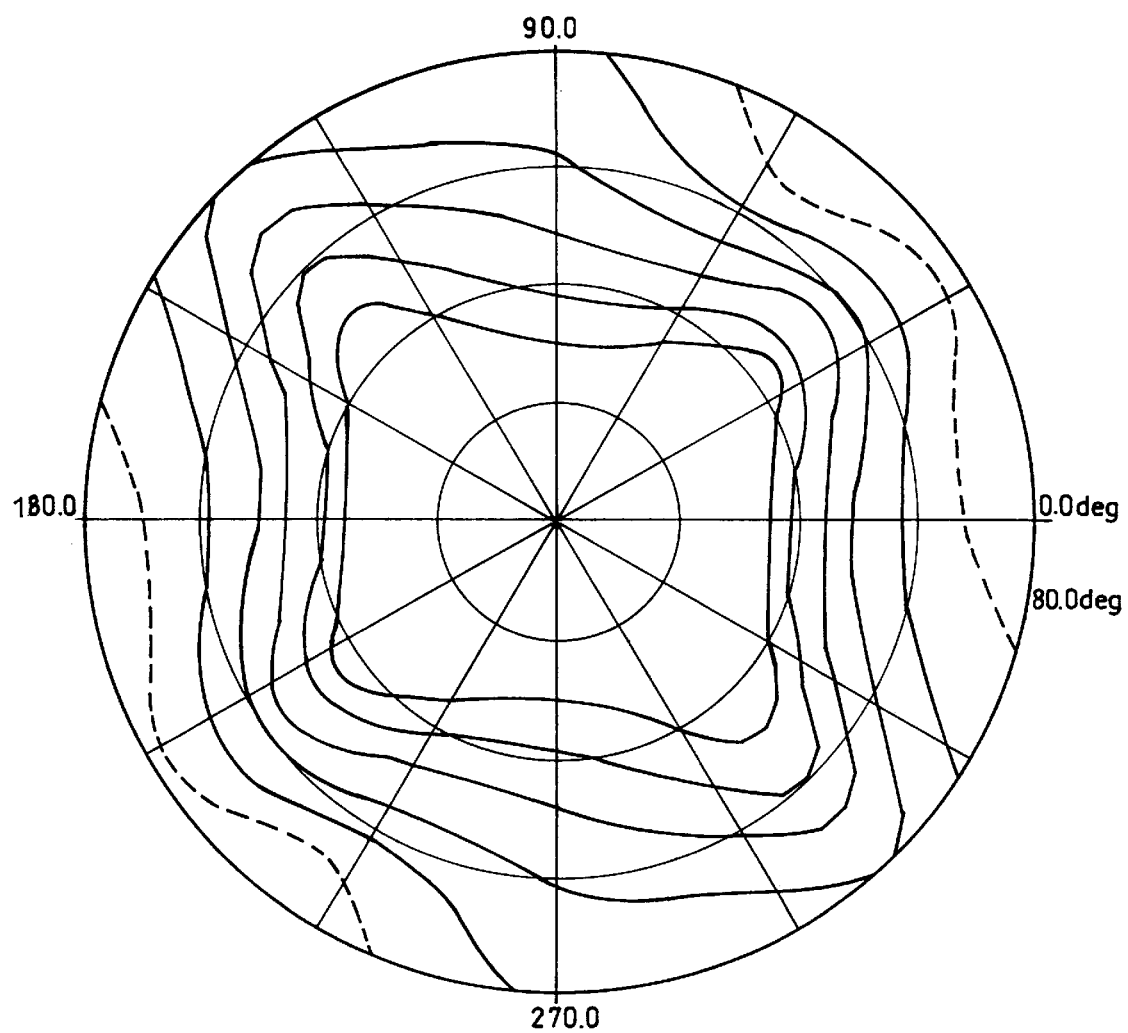
FIG. 27 is a characteristics drawing showing, as a contour map, a contrast defined as the quotient of a luminous reflectance of a bright state (3.2V) divided by a luminous reflectance of a dark state (2.2V) of the reflective-type liquid crystal display device of Embodiment 7 in various directions when the viewing direction is changed from 0° to 80°, measured with the inclination angle from the normal direction of the liquid crystal panel, and 0° to 360° measured with the direction angle.
Figure 28:
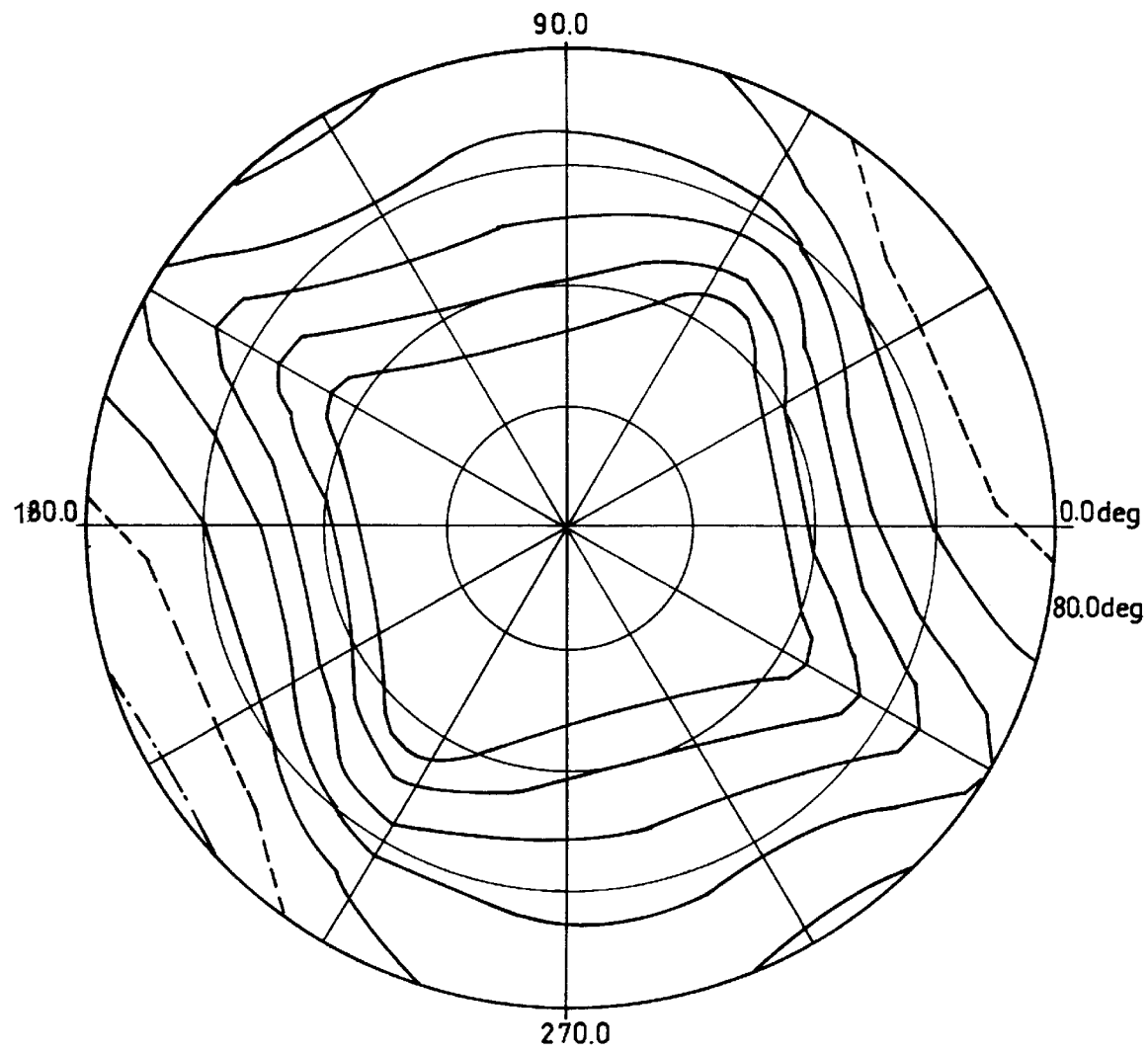
FIG. 28 is a characteristics drawing showing, as a contour map, a contrast defined as the quotient of a luminous reflectance of a bright state (3.2V) divided by a luminous reflectance of a dark state (2.2V) of the reflective-type liquid crystal display device of Embodiment 7 in various directions when the viewing direction is changed from 0° to 80', measured with the inclination angle from the normal direction of the liquid crystal panel, and 0° to 360° measured with the direction angle.
Figure 29:
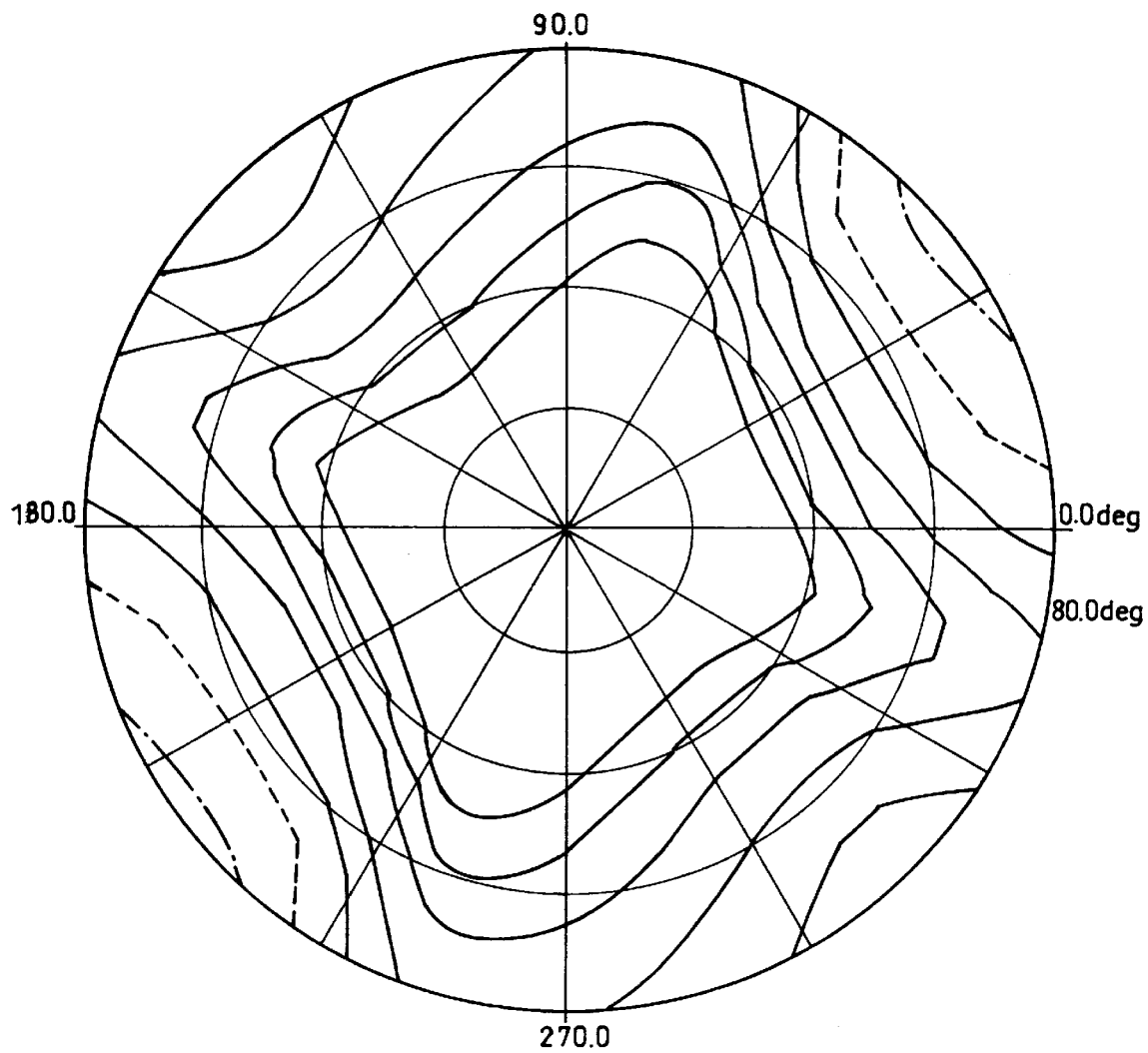
FIG. 29 is a characteristics drawing showing, as a contour map, a contrast defined as the quotient of a luminous reflectance of a bright state (3.2V) divided by a luminous reflectance of a dark state (2.2V) of the reflective-type liquid crystal display device of Embodiment 7 in various directions when the viewing direction is changed from 0° to 80°, measured in the inclination angle from the normal direction of the liquid crystal panel, and 0° to 360° measured in an azimuth.

Meanwhile, FIGS. 27 and 28 show that when θ2 was 135° or 150°, the resulting contrast was excellent in all directions. Further, the case where θ2 is 180° is the same as the case where θ2 is 0° shown in FIG. 24. Hereinafter, in the same manner, even when θ2 increases, since the same characteristics as in FIGS. 24 through 29 are realized with a cycle of 180°, θ2 only needs be considered not less than 0° and not more than 180°. In such a range, there are a range of θ2 giving excellent contrast in a particular direction and a range of θ2 giving isotropic contrast. These two kinds of viewing angle characteristics could be estimated to have a boundary in terms of θ2 at 90° and 165°. Therefore it could be found that conditions for obtaining excellent contrast in all directions were:

$$90° \leq \theta 2 \leq 165°$$

and that conditions for obtaining excellent contrast in one particular direction were:

$$0° \leq \theta 2 \leq 90° \text{ or } 165° \leq \theta 2 \leq 180°$$

Especially, the latter equation can be rewritten as $$-15° \leq \theta 2 \leq 90°$$

since a 180° change in θ2 does not make any change in optical characteristics.

Figure 30:
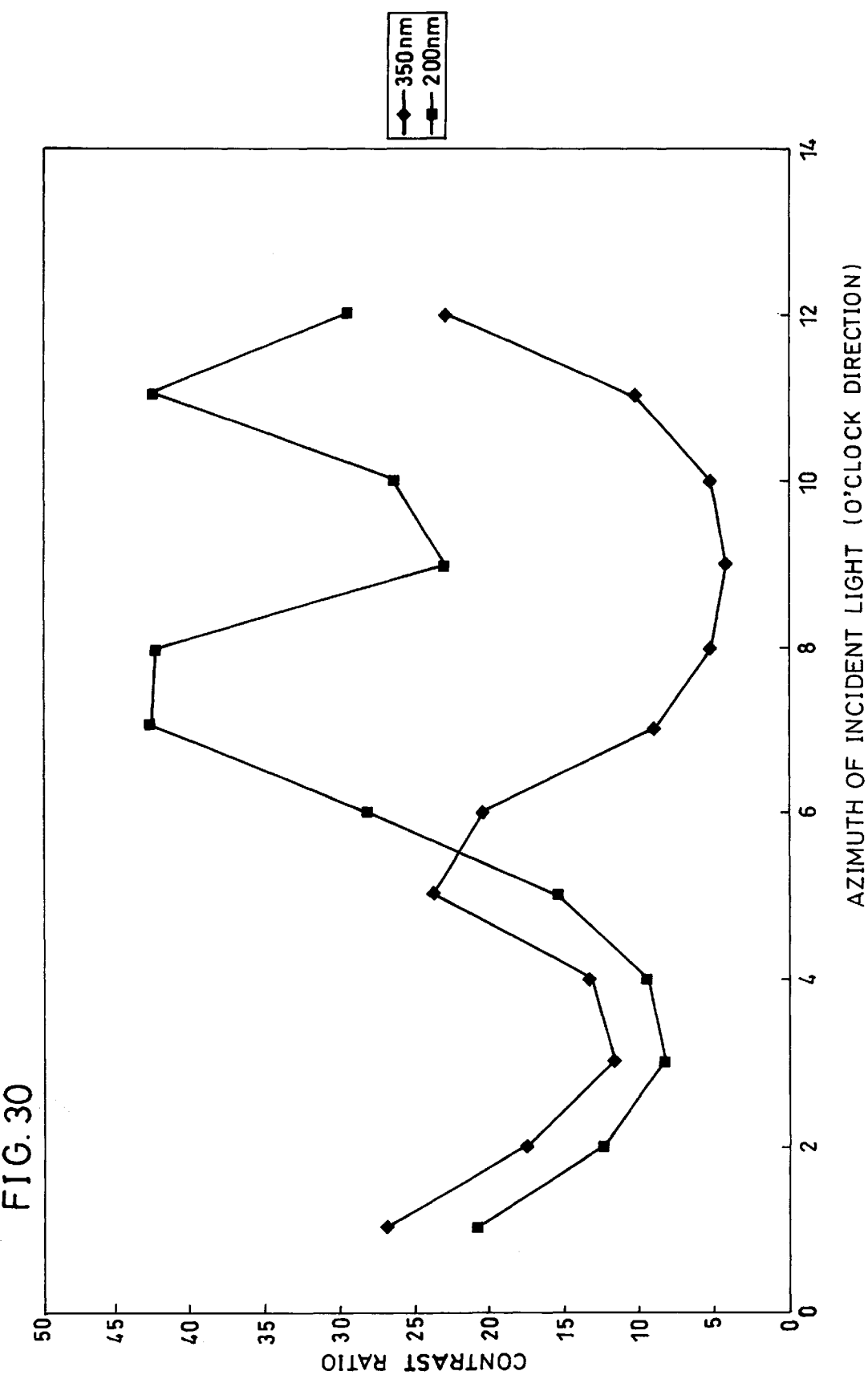
FIG. 30 is a graph showing correlation between the contrast and the azimuth of the display surface of the reflective-type liquid crystal display device of Embodiment 7, where the azimuth of the incident light on the axis of abscissas (inclination angle 30°) is expressed in terms of a clock panel with the downward direction to the liquid crystal panel as the 6 o'clock direction.

Illumination light was guided to enter 30° with respect to the normal direction of the display surface, and the ratio of values of reflectance of white and black displays, i.e. contrast, when reflected light was detected in the normal direction of the surface was measured in various azimuths. The azimuthal direction of incident light on the axis of abscissas is expressed in terms of a clock panel in the same manner as in FIG. 22. FIG. 30 shows results of the measurement when Δn×d of liquid crystal was 350 nm and 200 nm.

From the results shown in FIG. 30, the mean value of contrast for all the azimuthal directions was 25 when Δn×d was 200 nm, and was 14 when Δn×d was 350 nm. Conditions for obtaining a good bright state when Δn×d was 200 nm could be found in the manner discussed below. In the foregoing FIG. 23(b), 360×|d/p| ranged from 50 to 120 in the vertically elongated hatched part mentioned above, and therefore the range of |d/p| for providing good white display was:

$$0.14 \leq |d/p| \leq 0.34 \tag{7}$$

As for Δn×d, a graph was drawn that had Δn×d instead of |d/p| for the axis of abscissas and was otherwise the same as FIGS. 23(a) and 23(b), and it was confirmed from considering the graph that good white display was obtained when the range of Δn×d was:

$$135 \text{ nm} \leq \Delta n \times d \leq 350 \text{ nm} \tag{8}$$

From the foregoing description, images of high contrast could be realized in a wider range of viewing angle when the twist angle and Δn×d of the liquid crystal satisfied conditions expressed by Equations (7) and (8).

EMBODIMENT 8

Referring to drawings, the following description will explain a reflective-type liquid crystal display device of Embodiment 8 where both upper and lower substrates sandwiching the liquid crystal layer were subjected to rubbing processing. The reflective-type liquid crystal display device included, as optical retardation compensation plates 8, 9, and 11, three polycarbonate optical retardation compensation films prepared so as to have respective retardations of 135 nm, 270 nm, and 270 nm with respect to light transmitted in the normal direction of the surface, and was arranged after the rubbing processing of the upper and lower substrates so that the direction of the rubbing processing of the substrates was 270° and that the retardation of a liquid crystal layer was set to 300 nm. The reflective-type liquid crystal display device was shown in FIG. 3.

Aluminum film was used for an electrode 7 on the lower substrate 5 to act as a light-reflective electrode. The reflective-type liquid crystal display device was adjusted to have a liquid crystal layer thickness of 4.5 $\mu$m after introduction of liquid crystal, and set so that the direction of the rubbing processing of the upper substrate formes an angle $\theta 1$ (see FIG. 31) of 270° with that of the lower substrate. The liquid crystal included a liquid crystal material having a dielectric anisotropy, elasticity, viscosity, temperature characteristics, and voltage maintaining characteristics equivalent to those of liquid crystal used for a normal TFT transparent liquid crystal display device, except that $\Delta\epsilon$ was adjusted to −3.0. Furthermore, $\Delta n \times d$ was set to 300 nm, a chiral agent was added to the liquid crystal, and $|d/p|$ was made 0.5. Here, in the present Embodiment, a chiral agent prompting counter-clockwise twisting was used, and the real value of d/p was selected so as to be negative.

Figure 31:
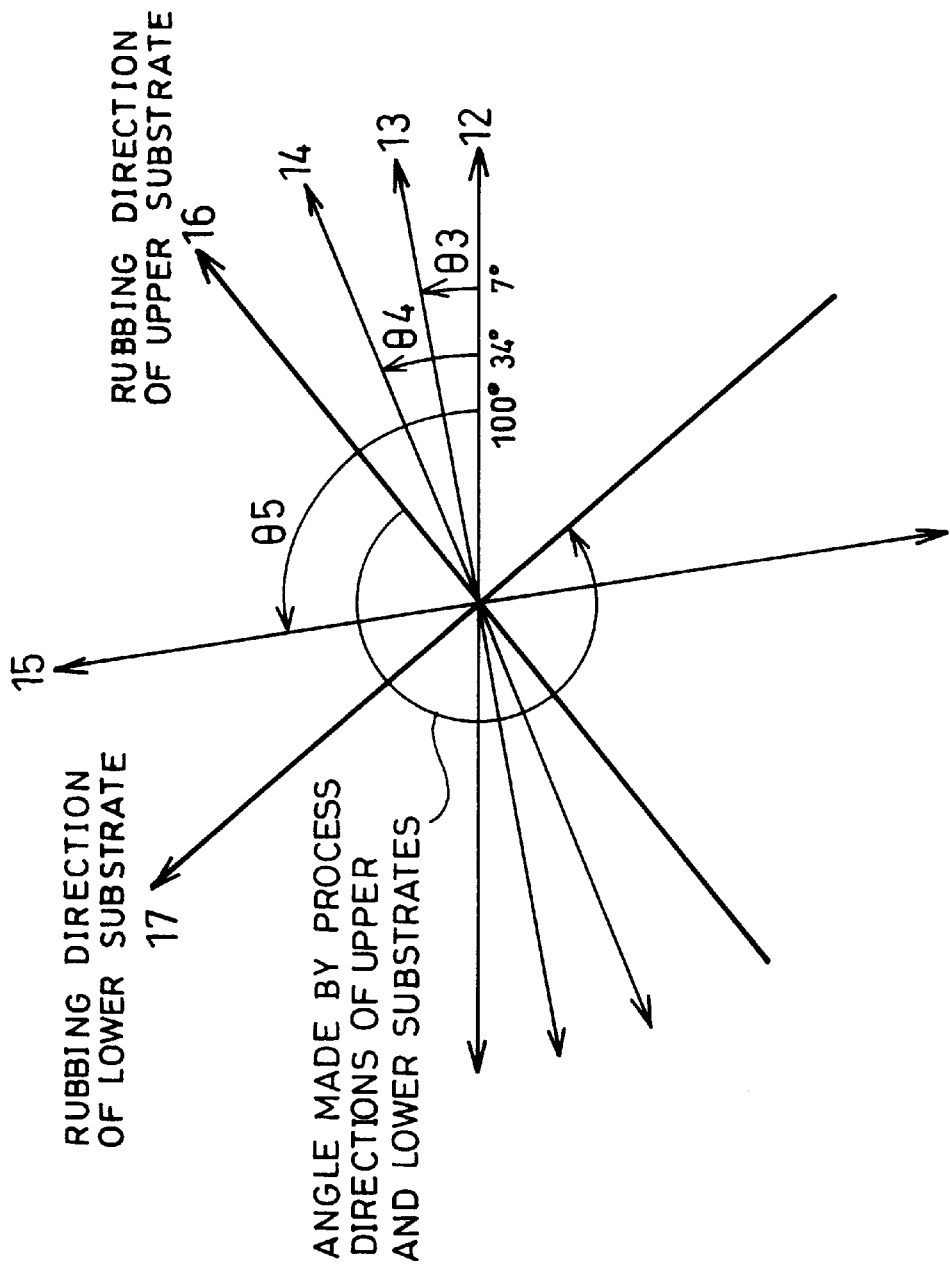
FIG. 31 is a plan view showing directions of arrangement of a polarizer plate and the optical retardation compensation plates and the definition of rubbing directions of an upper substrate and a lower substrate, when three optical retardation compensation plates are incorporated.

The specific setting of the angles of the optical retardation compensation plates is shown in FIG. 31: $\theta 3$, $\theta 4$, and $\theta 5$ were set to 7°, 34° and 100° respectively. $\theta 3$ was the angle formed by a polarizer plate transmission axis direction 12 and a slow axis direction 13 of the first optical retardation compensation plate 8, $\theta 4$ was the angle formed by a polarizer plate transmission axis direction 12 and a slow axis direction 14 of the second optical retardation compensation plate 9, and $\theta 5$ was the angle formed by a polarizer plate transmission axis direction 12 and a slow axis direction 15 of the third optical retardation compensation plate 11. The directions 16 and 17 represented the rubbing directions for the upper substrate 4 and the lower substrate 5, i.e. the inclination direction of the alignments of the liquid crystal molecules on the vertical alignment film 2 and the vertical alignment film 3 formed on the upper substrated 4 and the lower substrate 5 respectively.

The three optical retardation compensation plates 8, 9 and 11 were made of uniaxial polycarbonate stretched films. The optical retardation compensation plate 8 had a retardation controlled to 130 nm to 140 nm with respect to light having a wavelength of 550 nm transmitted in the normal direction of the display surface. The optical retardation compensation plates 9 and 11 had a retardation controlled to 265 nm to 275 nm with respect to light of the same characteristics. The polarizer plate 10 was a polarizer plate with an internal transmittance of 45% when measured in a single piece, and had an AR layer made of a dielectric multi-layer film.

The reflectance of the reflective-type liquid crystal display device thus prepared was measured in the same arrangement shown in FIG. 12 as with Embodiment 7.

Figure 32:
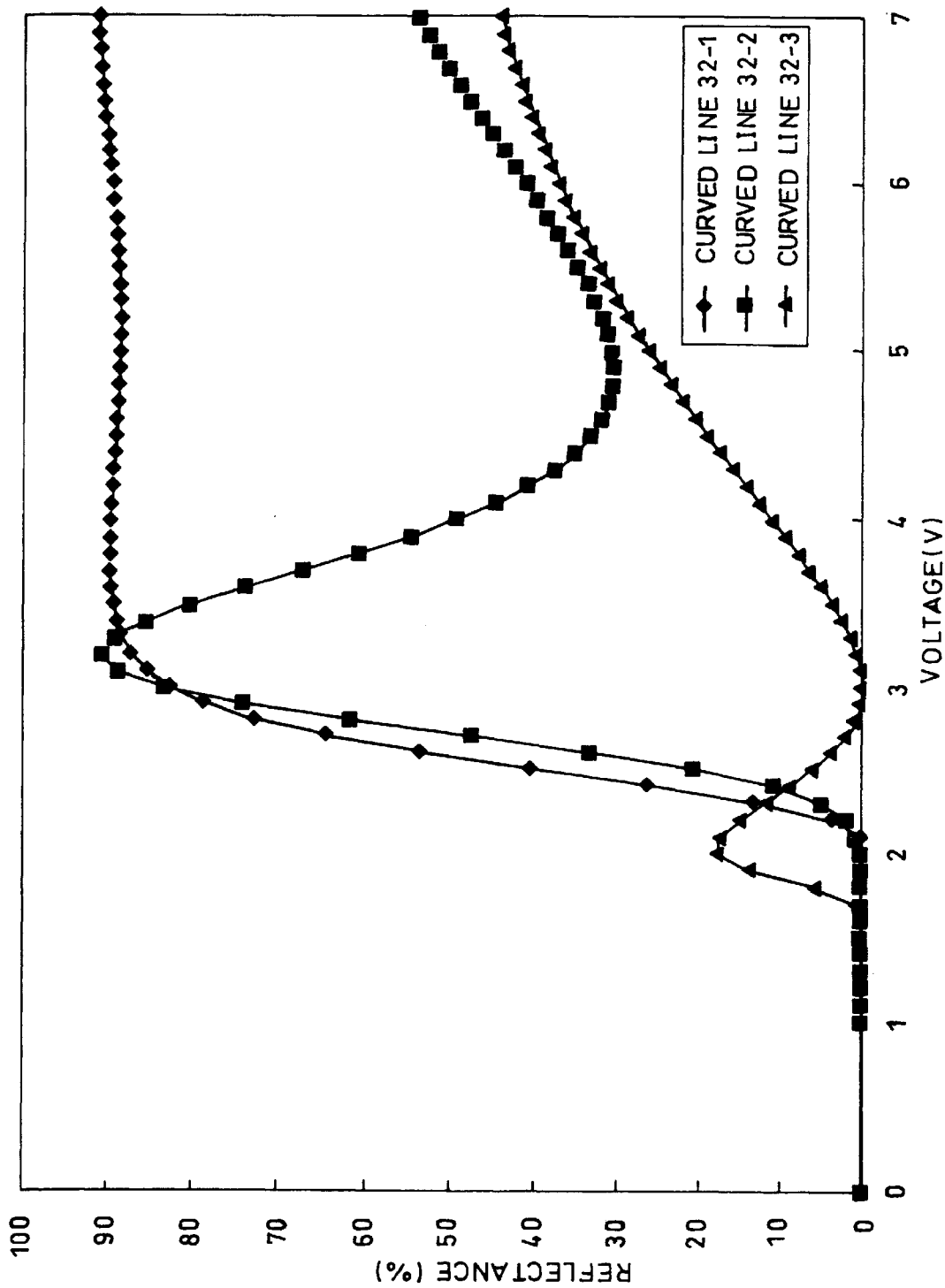
FIG. 32 is a graph showing correlation between the reflectance and the applied voltage of a reflective-type liquid crystal display device of Embodiment 8.

FIG. 32 shows the voltage versus reflectance characteristics of the reflective-type liquid crystal display device thus prepared of Embodiment 8 as the curved line 32-1 and also shows comparative examples of the voltage versus reflectance characteristics when $|d/p|$ was 0 and 0.67 as the curved lines 32-2 and 32-3. It was found from comparing the curved line 32-1 to the curved line 32-2 that the reflectance represented by the curved line 32-1, where a chiral agent was added, did not decrease at voltages higher than the peak voltage. It was confirmed from this that the voltage range in which a bright state was effected was wider and that driving was easy.

Also, the characteristics that the reflectance does not decrease even if a higher voltage than a voltage at which sufficient bright state was effected was applied could alleviate the phenomenon of the voltage at which sufficient bright state was effected shifting when the observation direction was inclined with respect to the normal direction and changed to various inclined azimuths while maintaining the inclination angle of the observation direction. It was found that the amount of a chiral agent added had optimum conditions to provide good voltage versus reflectance characteristics and that if too large an amount was added, good voltage versus reflectance characteristics could not obtained, as is exemplified in the curved lines 32-3. Also, it was found from measurement of dependence of the reflectance on the wavelength that the aforementioned optimum conditions on the amount of a chiral agent added coincided with the conditions to obtain substantially flat reflectance dependance to applied voltage.

A brightness of 95% and a contrast ratio of 20 were obtained. This realized a reflectance and a contrast ratio to give satisfactory good bright state and a visual observation confirmed the reflective-type liquid crystal display device of the present Embodiment had good quality. Note that the contrast ratio was defined as the quotient of the reflectance of a bright state divided by the reflectance of a dark state. In each of the foregoing examples, the voltage of the highest reflectance was used as the applied voltage of a bright state. The dark state was effected when no voltage was applied. Furthermore, from comparison of the reflective type liquid crystal display device using three optical retardation compensation plates to a reflective type liquid crystal display device having a liquid crystal layer of the same design as that of the present Embodiment, except that only two optical retardation compensation plates were used, it was confirmed that the reflective-type liquid crystal display device having three optical retardation compensation plates to produce circularly polarized light exhibited better contrast.

Furthermore, in the present Embodiment, a chiral agent was added in such an amount to make $|d/|$ of the liquid crystal layer 0.5. Consequently from addition of the chiral agent, as a rough approximation value of the twist angle of a liquid crystal composition as such, determined by the liquid crystal layer thickness and the natural pitch that the liquid crystal composition had independently from an interface processing direction, $|d/p|$. multiplied by 360° was 180°. Meanwhile, the twist angle to be provided to the liquid crystal alignment by alignment processing conducted onto the alignment film surfaces sandwiching the liquid crystal layer was 270°. In this manner, the rough approximation value of the twist angle, calculated from the liquid crystal layer thickness and the natural pitch of the liquid crystal composition, did not match the twist angle provided by the alignment processing direction.

However, the inventors of the present invention found in the following manner that display performance became better than the conditions for matching of the liquid crystal layer and the interface by making evaluation by widely changing the combination of $|d/p|$ and the rubbing processing directions on the upper and lower substrates.

Figure 33:
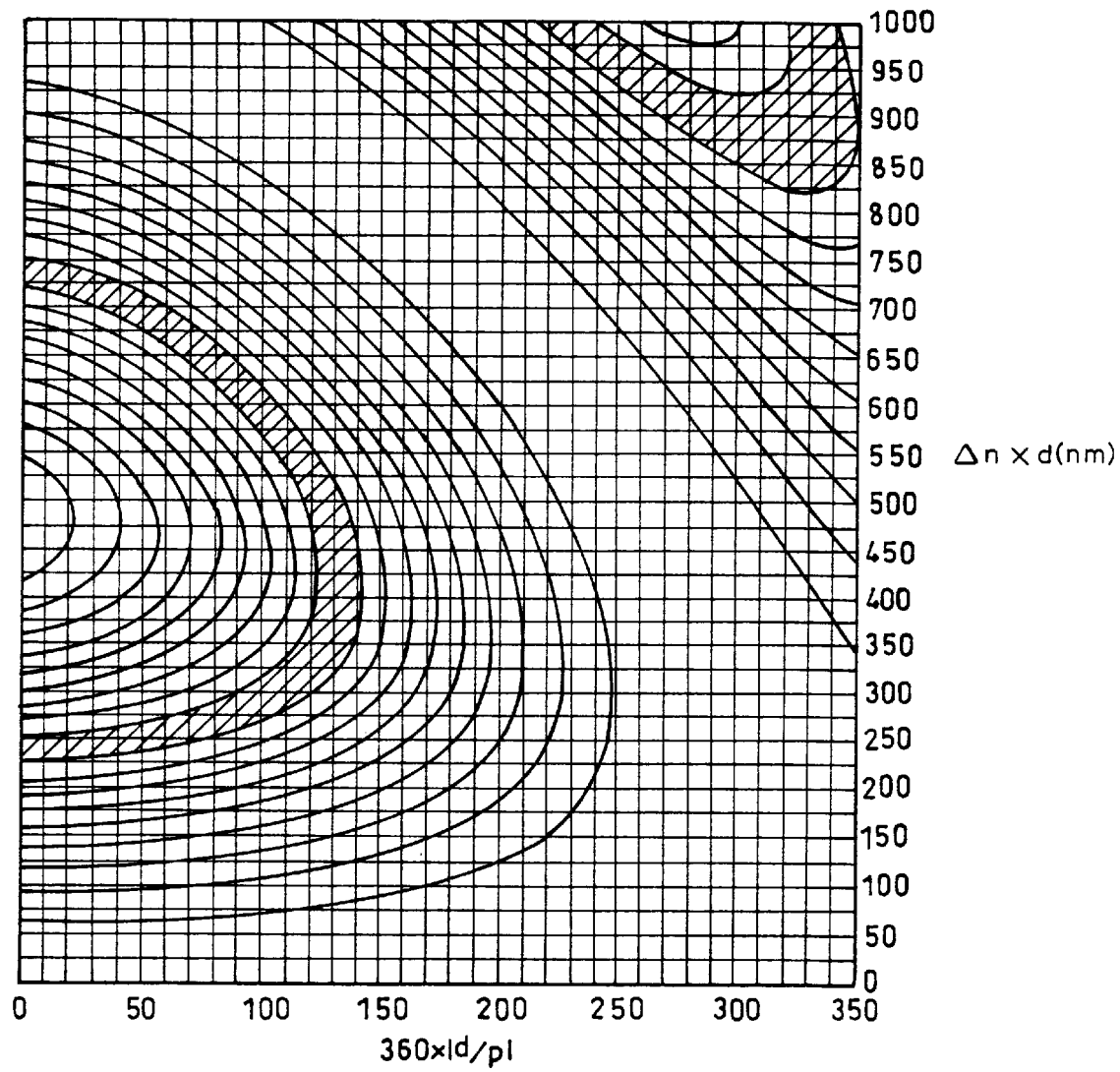
FIG. 33 is a drawing showing an evaluative function (figure of merit [FOM]) with a rubbing direction of 45° as a contour map in a space defined by Δn×d that is a design parameter of a liquid crystal layer and 360×|d/p| that shows the degree of twist of liquid crystal when a voltage of 4V is being applied the liquid crystal layer.
Figure 34:
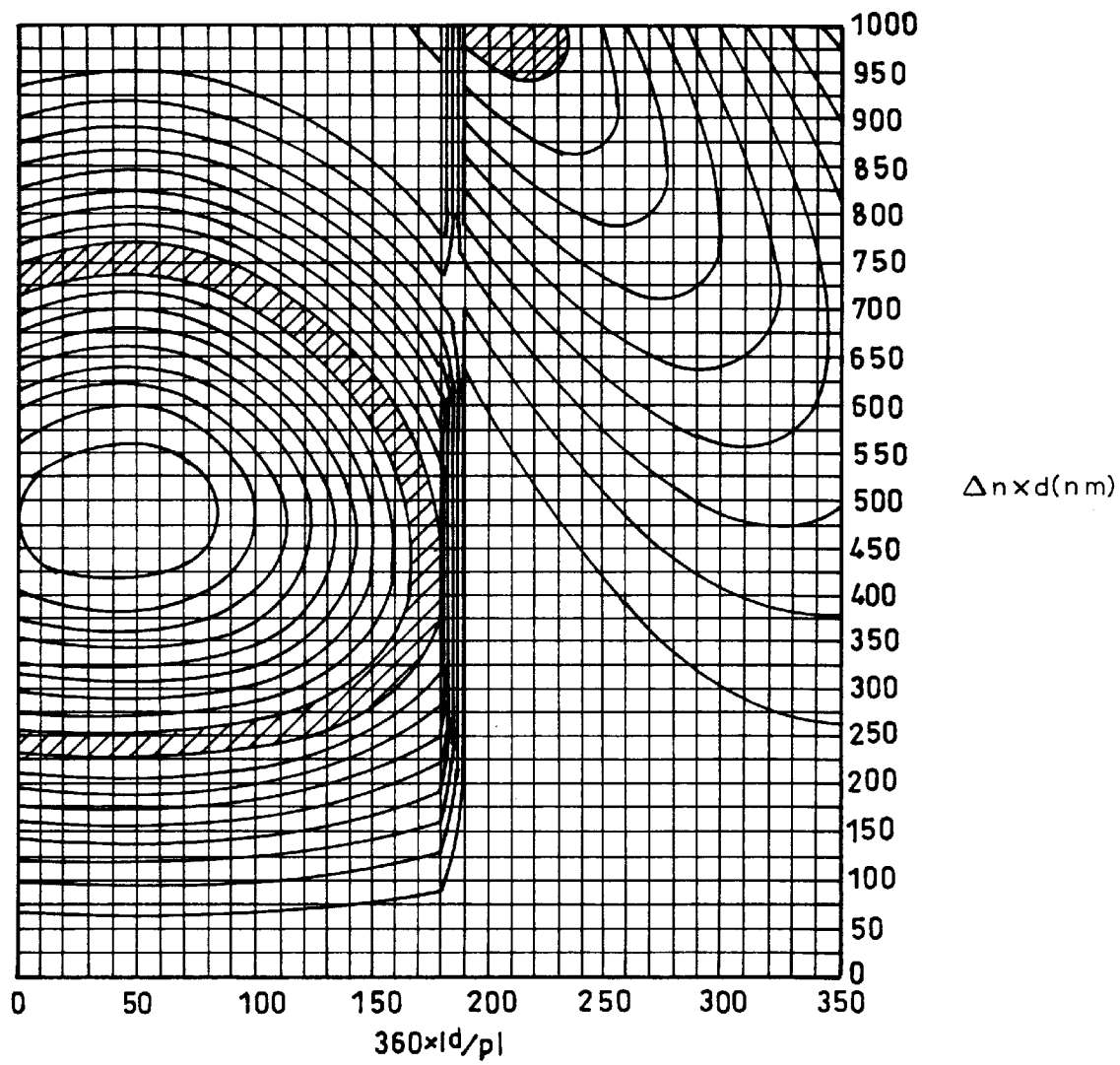
FIG. 34 is a drawing showing an evaluative function (figure of merit [FOM]) with a rubbing direction of 270° as a contour map in a space defined by Δn×d that is a design parameter of a liquid crystal layer and 360×|d/p| that shows the degree of twist of liquid crystal when a voltage of 4V is being applied the liquid crystal layer.

Specifically, in an arrangement where the alignment films on both sides were rubbing processed, there existed a parameter like the angle $\theta 1$ formed by a component, of the alignment vector of liquid crystal molecules on the upper and lower substrates, projected onto a substrate surface. Taking the angle θ1 of 45° and 270° as examples, FIGS. 33 and 34 show the results of drawing a contour map from values of FOM defined in Equation (4), from 0 through 1 in increments of 0.1, in a coordinate space defined by Δn×d (axis of ordinates) and the parameter |d/p| (×360: axis of abscissas) denoting a kind of measure to the twist angle between the upper and lower substrates of the liquid crystal composition as such. Incidentally, the voltage that was applied across the liquid crystal layer was 4.0V.

FIGS. 33 and 34 show that incident circularly polarized light became linearly polarized light after passing through the liquid crystal layer at FOM ranging from 0.9 to 1.0 (denoted by hatching in FIGS. 33 and 34). The vertically longer the hatched part, the better the bright state the liquid crystal display device could produce. The relationship of the optimum conditions of θ1 and |d/p| could be found from reading FIGS. 33 and 34 for the range of |d/p| in the vertically elongated hatched part.

Figure 35:
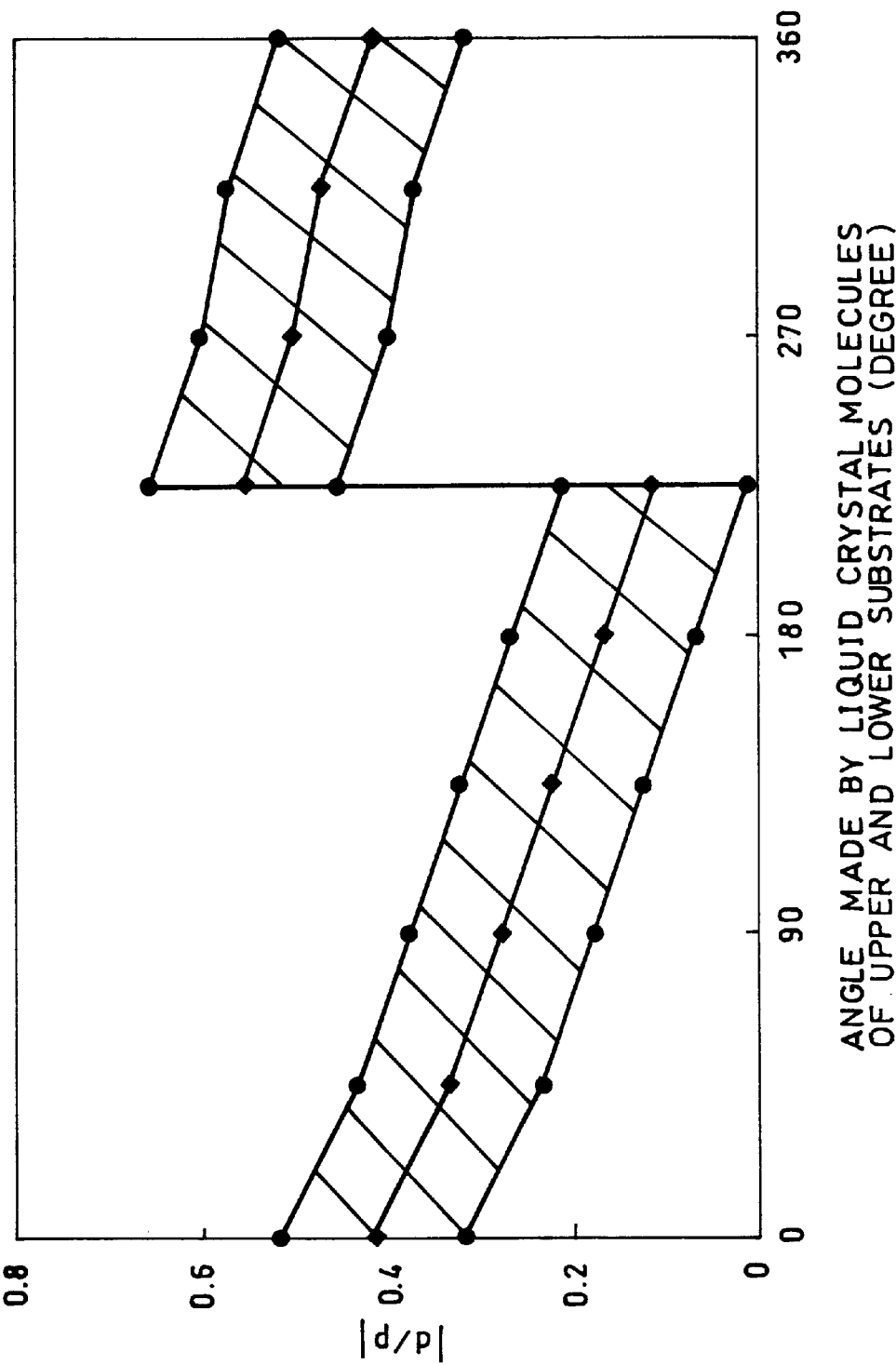
FIG. 35 is a graph showing optimum conditions of |d/p| and the angle formed by the alignment of liquid crystal molecules on an upper substrate and the alignment of liquid crystal molecules on a lower substrate of a reflective-type liquid crystal display device of Embodiment 8.

Here, graphs were drawn in the same manner for θ1 of 0°, 90°, 135°, 180°, 225°, and 315° in addition to 45° and 270°, so as to obtain an optimum range for |d/p|. for each value of θ1. FIG. 35 shows a graph plotted by the procedure mentioned above.

FIG. 35 shows |d/p| having an upper limit of approximately 0.7 and a lower limit of approximately 0. Hence it was found that good display was obtained when $$0 < |d/p| \leq 0.7$$

The most suitable range for Δn×d could be read from the a×θs of ordinates of the graphs of θ1 ranging from 0 degrees to 315 degrees. Hence, it was found that good display was obtained when $$200 \text{ nm} \leq \Delta n \times d \leq 1200 \text{ nm}$$

Note that in the above equation, the lower limit of 200 nm was read from the graph, whereas the upper limit of 1200 nm was obtained by the product of a general upper limit of the refractive index difference Δn of the liquid crystal mixtures and a general upper limit of the liquid crystal thickness as previously mentioned. This has another object of making more practical judgement, since, according to the judging standards used here, the upper limit for Δn×d becomes unlimitedly higher by lowering the voltage applied across the liquid crystal layer.

The area represented by hatching in FIG. 35 shows the range of optimum conditions for the amount of a chiral agent providing good voltage versus reflectance characteristics. The mean line of the area could be expressed with the following equations depending on whether θ1 was smaller or larger than 225° respectively:

$$|d/p| = -\theta 1/1000 + 0.40 \pm 0.1 \text{ and}$$

$$|d/p| = -\theta 1/1000 + 0.76 \pm 0.1$$

As mentioned here, the inventors of the present invention confirmed through both experiment and computer simulation that good display could be obtained d under the optimum conditions specified by FIG. 35. It was found in the present Embodiment that since the angle formed by the liquid crystal molecules on the upper substrate and those on the lower substrate was 270°, optimum |d/p| was not smaller than 0.4 and not larger than 0.6. Incidentally it goes without saying that the combination of the counter-clockwise chiral agent and the rubbing direction used in the present Embodiment is applicable also to a combination of a clockwise e chiral agent and an opposite rubbing direction.

EMBODIMENT 9

A reflective-type liquid crystal display device of Embodiment 9 including optical retardation compensation plates having retardations of 135 nm and 270 nm respectively with respect to light transmitted in the normal direction of the surface was prepared according to the arrangement shown in FIG. 1, by subjecting the upper and lower substrates to rubbing processing so that the angle formed by the directions for the alignment processing of the upper and lower substrates was 225° and making Δn×d of the liquid crystal layer 940 nm. Used as the liquid crystal was a nematic liquid crystal having negative dielectric anisotropy, namely ZLI-4850 (available from Merck Japan Co.), to which CN (cholesteryl nanoate) was added as a chiral agent. The liquid crystal was adjusted so that the chiral pitch was 13.5 μm and that the liquid crystal thickness was 4.5 μm. Here, |d/p| of the liquid crystal was adjusted to 0.33. Since the angle formed by the directions for the alignment processing of the upper and lower substrates was 225°, the twist angle of the liquid crystal composition as such did not match the twist angle provided by the alignment processing direction in this case either.

A reflective-type liquid crystal display device of Embodiment 9 was prepared by placing, on a substrate 4 prepared in the foregoing, the same two optical retardation compensation plates and polarizer plate which are the same as those shown in FIG. 20.

The reflective-type liquid crystal display device, being driven by a simple matrix driving at a duty ratio of 1/240, produced good display with a contrast ratio of 10.

Figure 36:
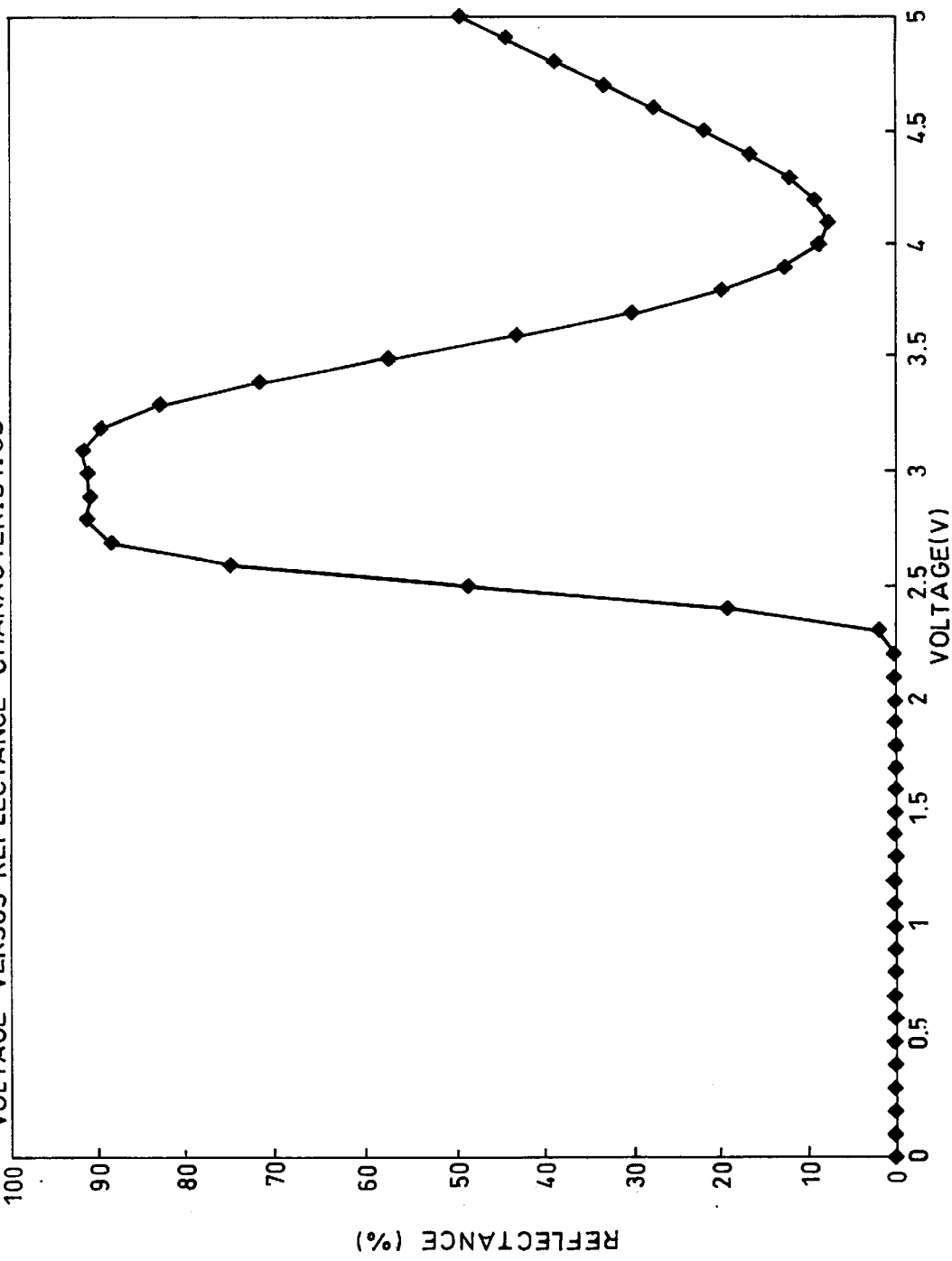
FIG. 36 is a graph showing correlation between the reflectance and the applied voltage of a reflective-type liquid crystal display device of Embodiment 9.
Figure 37:
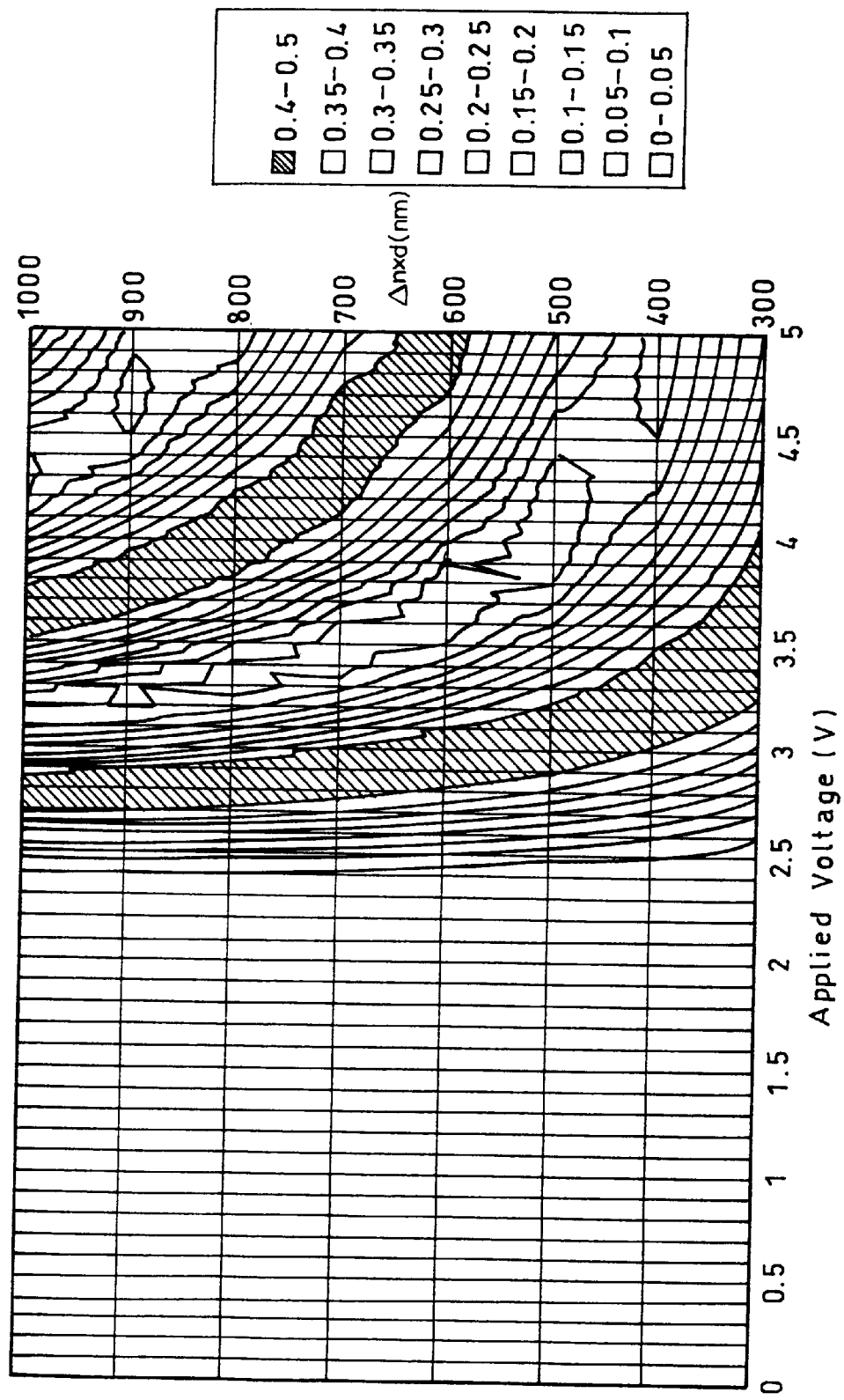
FIG. 37 is a characteristics drawing showing reflectance as a contour map in a space defined by Δn×d and the applied voltage when |d/p|=0.1.
Figure 38:
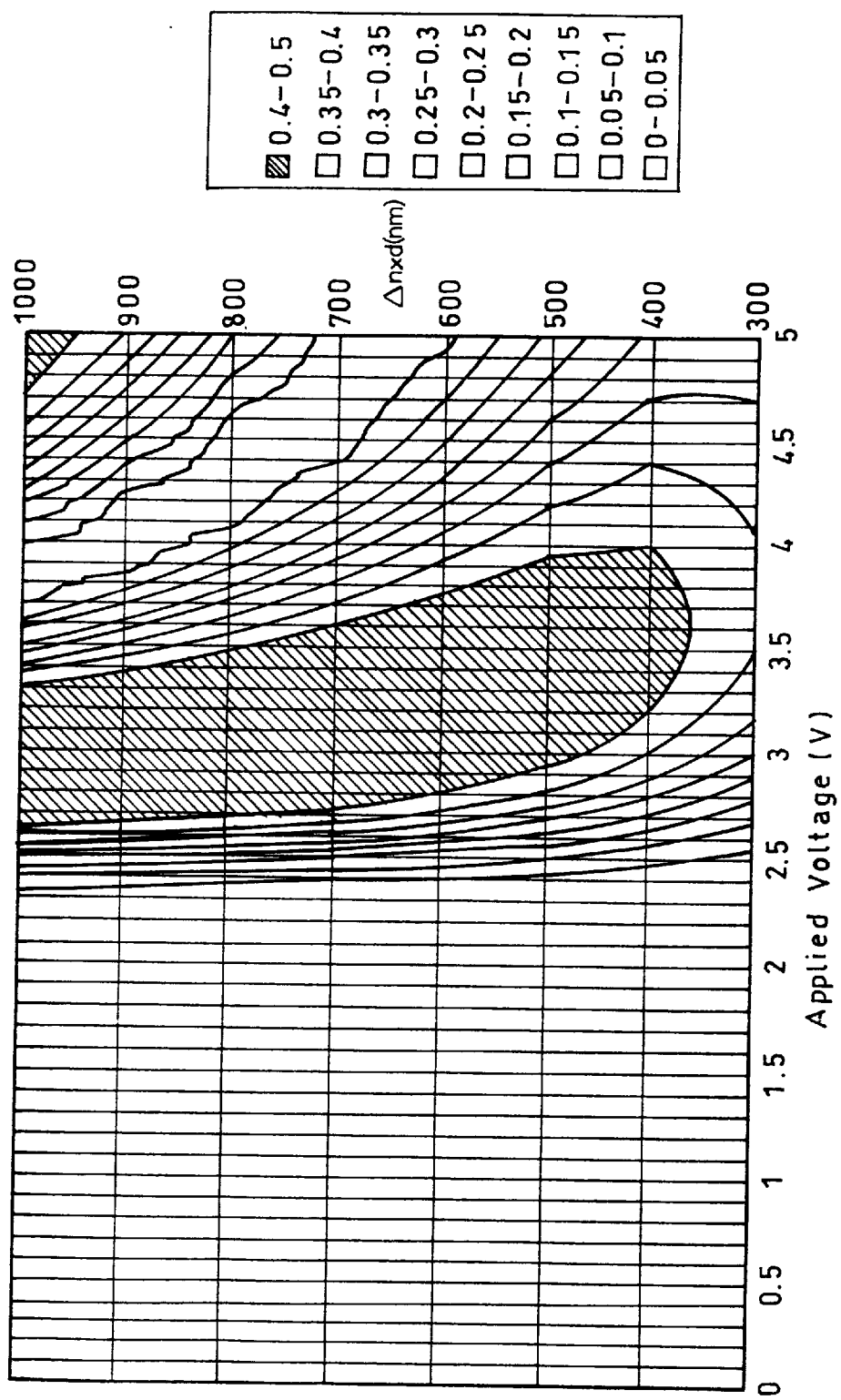
FIG. 38 is a characteristics drawing showing reflectance as a contour map in a space defined by Δn×d and the applied voltage when |d/p|=0.3.
Figure 39:
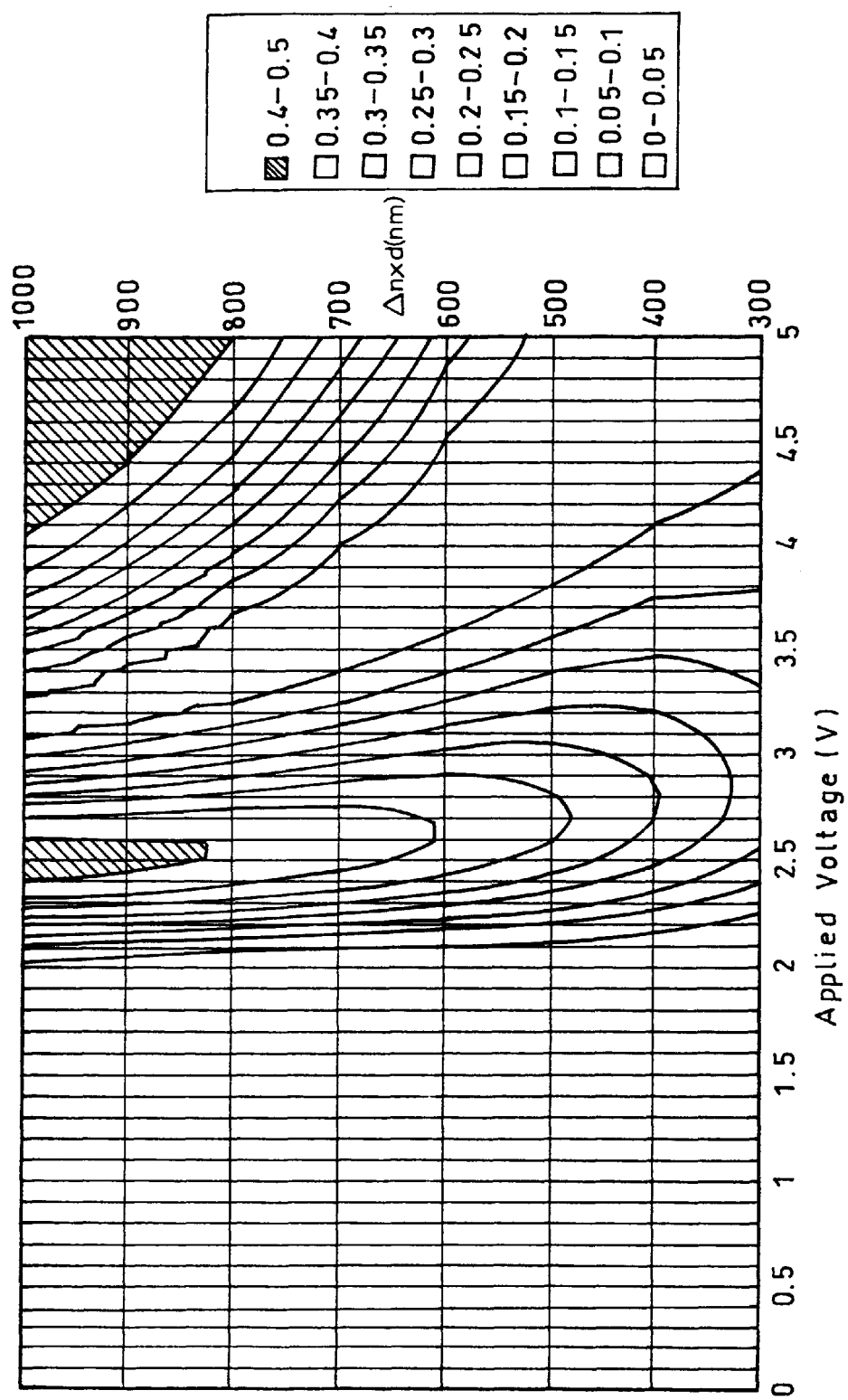
FIG. 39 is a characteristics drawing showing reflectance as a contour map in a space defined by Δn×d and the applied voltage when |d/p|=0.5.
Figure 40:
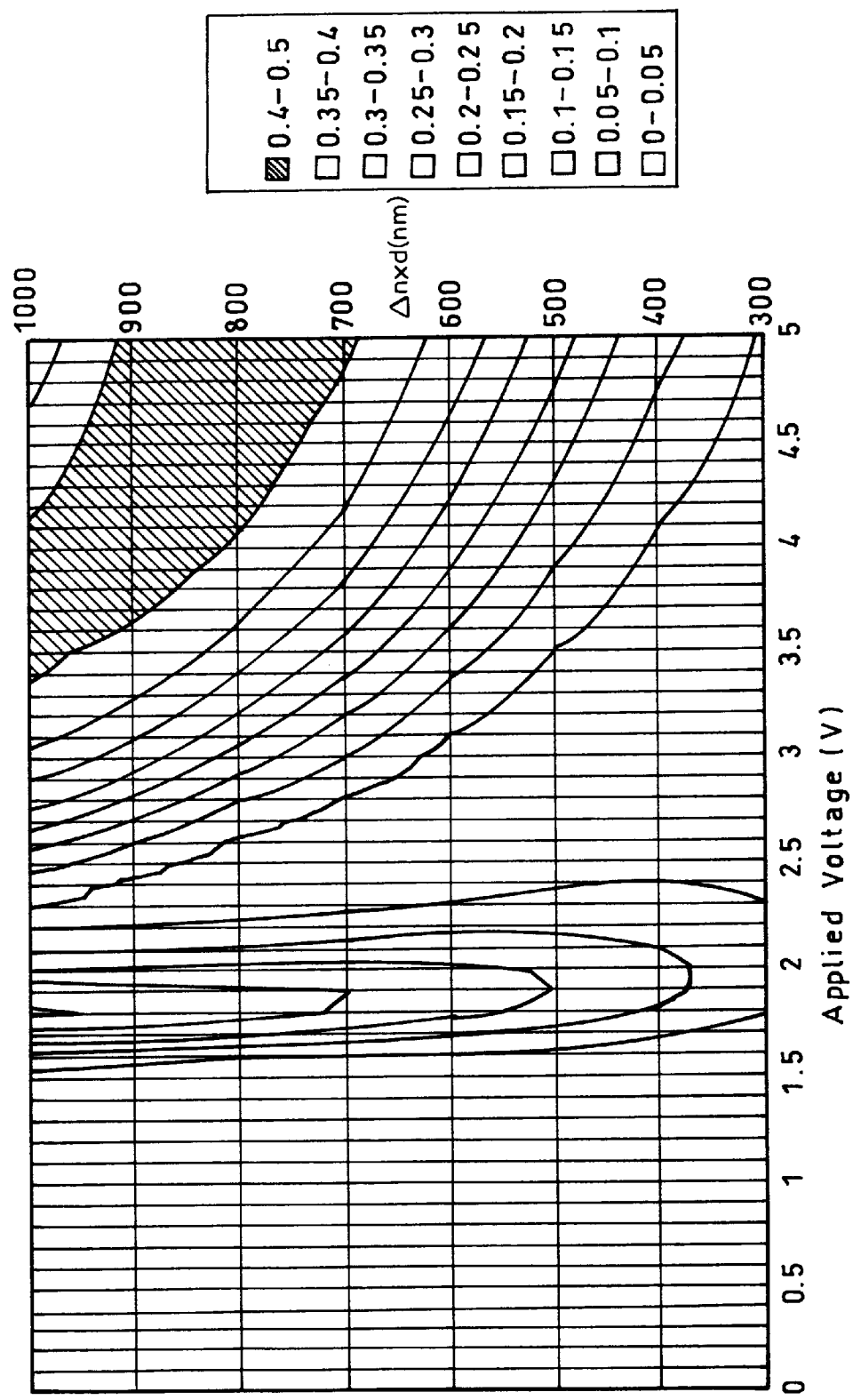
FIG. 40 is a characteristics drawing showing reflectance as a contour map in a space defined by Δn×d and the applied voltage when |d/p|=0.7.

FIG. 36 shows results of measurement of the voltage versus reflectance characteristics of a polarity-reversed rectangle of the reflective-type liquid crystal display device of the present Embodiment. The reflectances shown in FIG. 36 were measured according to the arrangement shown in FIG. 12 in the same manner as in Embodiment 7.

A liquid crystal display device equivalent to that of the present Embodiment needed such characteristics that reflectance steeply varying to voltage applied. Taking the angle θ1 of 225° as an example, FIGS. 37 through 40 show results of plotting values of reflectances for every 0.05 from 0 to 0.5 (every 0.1 from 0.4 to 0.5) in a coordinate space formed by Δn×d (axis of ordinates) and the applied voltage (axis of abscissas). Incidentally, FIGS. 37 through 40 show cases where |d/p| was 0.1, 0.3, 0.5, and 0.7 respectively. Here, in the present Embodiment, a chiral agent prompting counter-clockwise twisting was used, and the real value of d/p was selected so as to be negative.

FIGS. 37 through 40 show that when θ1 was 225°, |d/p| satisfied 0.1≤|d/p|≤0.5 and that when Δn×d was 600 nm or larger, satisfactory steepness was obtained. It was found as a result of drawing graphs in the same manner for θ1 other than 225° that satisfactory steepness was obtained in the range of 200°≤θ1≤250°.

In other words, it was confirmed that the liquid crystal layer had steep electro-optical properties and a simple matrix driving was possible in a region of Δn×d of $$600 \text{ nm} \leq \Delta n \times d \leq 1200 \text{ nm,}$$

an angle θ1 formed by the alignments of the upper and lower substrates of

200°≦θ1<250°, and 0.1≦|d/p|≦0.5.

Incidentally it goes without saying that the combination of the counter-clockwise chiral agent and the rubbing direction used in the present Embodiment is applicable also to a combination of a clockwise chiral agent and an opposite rubbing direction.

EMBODIMENT 10

Figure 41:
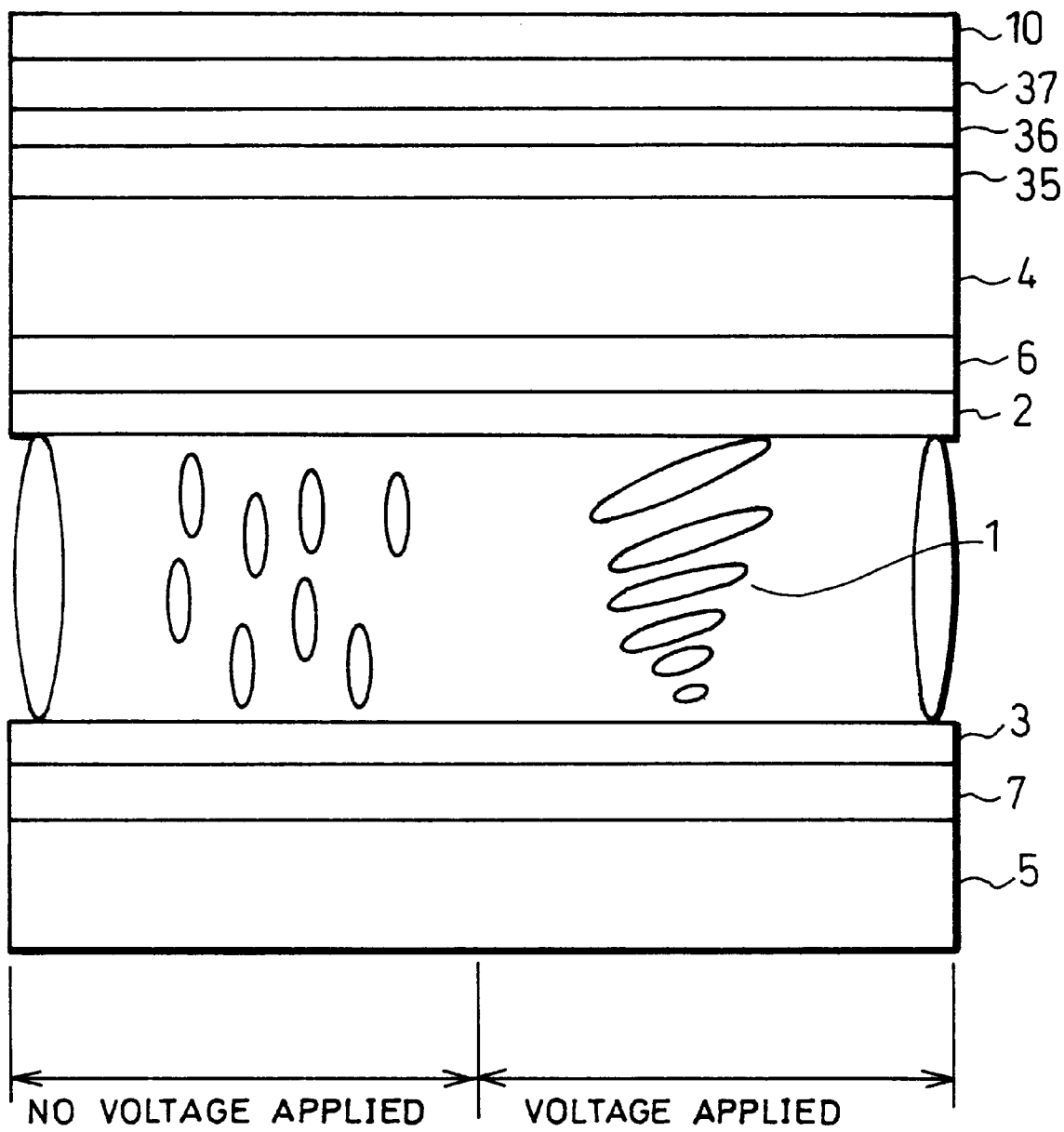
FIG. 41 is a cross-sectional view showing a structure of a reflective-type liquid crystal display device of Embodiment 10.

In the forgoing Embodiment, a uniaxial stretched film was used as optical retardation compensation plates. FIG. 41 shows a structure of a reflective-type liquid crystal display device of Embodiment 10 that included an optical retardation compensation plate having negative dielectric anisotropy and adopted a biaxial optical retardation compensation plate prepared primarily from a liquid crystalline polymer and a biaxial optical retardation compensation plate, i.e., a film made with controlling the refractive index three-dimensionally. Here, FIG. 41 shows a reflective-type liquid crystal display device having the structure shown in FIG. 1 with an optical retardation compensation plate 29 having negative dielectric anisotropy inserted between the second upper substrate 4 and the optical retardation compensation plate 8 placed on the second upper substrate 4 and the optical retardation compensation plates 8 and 9 in FIG. 1 being replaced with biaxial optical retardation compensation plates 36 and 37 disposed in the same manner in terms of the slow axes as the optical retardation compensation plates 8 and 9. Here, the negative dielectric anisotropy of the optical retardation compensation plate 35 refers to such properties that a refractive index ellipsoid is a spheroid around the z axis, and the size, nz, of the major axis of the ellipsoid parallel to the z axis is smaller than the sizes, nx and ny (nx=ny), of the major axes of the ellipsoid parallel to the x- and y-axes respectively, where the x- and y-directions are directions mutually vertical and parallel to the substrate surface, and the z-direction is the direction vertical to the substrate surface. The retardation of the optical retardation compensation plate 35 with respect to light transmitted in the normal direction of the substrate surface was set to have substantially the same absolute value, but of opposite sign, as Δn×d of the liquid crystal layer 1, and the electrode 7 formed on the first lower substrate 5 was of a shape having micro-meter-scale undulation (not shown) having dielectric anisotropy in the plane thereof.

The biaxial optical retardation compensation plate 36 and 37 had refractive indices nx>nz>ny, where x and y were directions parallel to the substrate plane and mutually perpendicular, z was a direction perpendicular to the substrate plane, and nx, ny, and nz were refractive indices of the electric field of light directed in x-, y-, and z-directions respectively. In the same manner, the optical retardation compensation plate 35 having negative refractive index anisotropy had refractive indices nx=ny<nz. Here, the x-direction was selected along the slow axis direction of the polarizer plates 8 and 9.

Figure 42A:
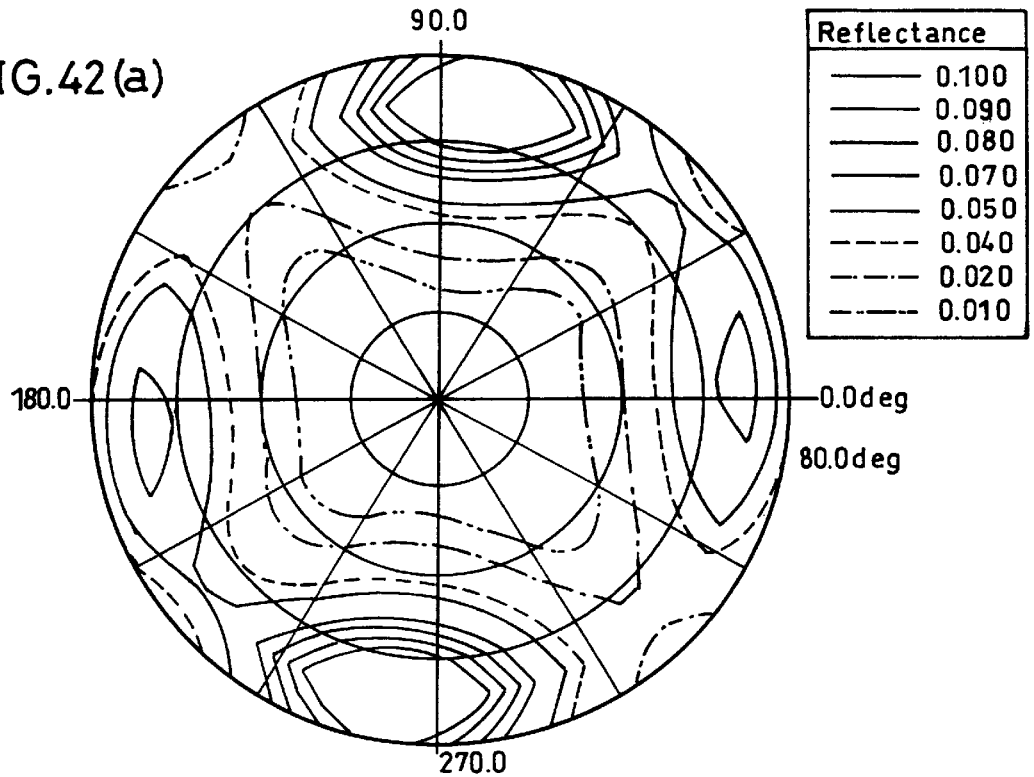
FIGS. 42(a) and 42(b) are characteristics drawings each showing, as a contour map, a luminance reflectance at a display surface in various directions when the viewing direction is changed from 0° to 80°, measured in the inclination angle from the normal direction of the liquid crystal panel, and 0° to 360° measured in an azimuth, using a uniaxial optical retardation compensation plate and a biaxial optical retardation compensation plate respectively.
Figure 42B:
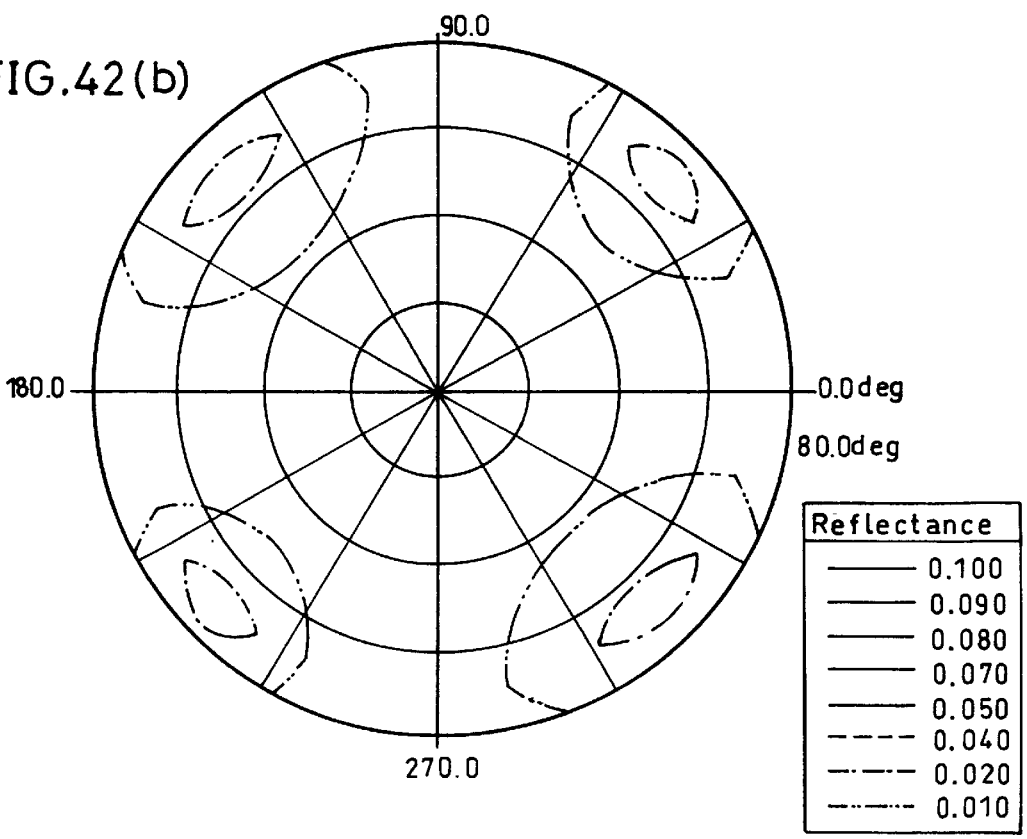

FIGS. 42(*a*) and 42(*b*) show viewing angle dependence of reflectance on a display surface of the reflective-type liquid crystal display device thus prepared when no voltage was applied, i.e., in a dark state. Here, the luminous reflectance was calculated with specular reflection, i.e. such an arrangement that the incident light axis and the received light axis had the same inclination angles and azimuths mutually displaced by 180°. The radius of a concentric circle refers to the inclination angle with respect to the normal direction of the display surface, and the direction of the concentric circle refers to the azimuth of a vector in the light receiving direction projected onto the display surface. Here the reflectance was luminous reflectance having a value divided by the reflectance of a liquid crystal display device from which the polarizer plate 10 was omitted.

FIG. 42(*a*) shows a reflective-type liquid crystal display device using uniaxial optical retardation compensation plates 8 and 9 and FIG. 42(*b*) shows a reflective-type liquid crystal display device using biaxial optical retardation compensation plates 36 and 37 and. It was found from these results that a good dark state having a reflectance of 0.04 or lower was produced by a region having an inclination angle of approximately not less than 0° and not more than 40° when a uniaxial optical retardation compensation plate was used, and by a region encompassing almost the entire viewing angle, i.e., a region having an inclination angle of not less than 0° and not more than 80° when a biaxial optical retardation compensation plate was used, and hence that the use of a biaxial optical retardation compensation plate greatly improved the viewing angle characteristics.

EMBODIMENT 11

Figure 43:
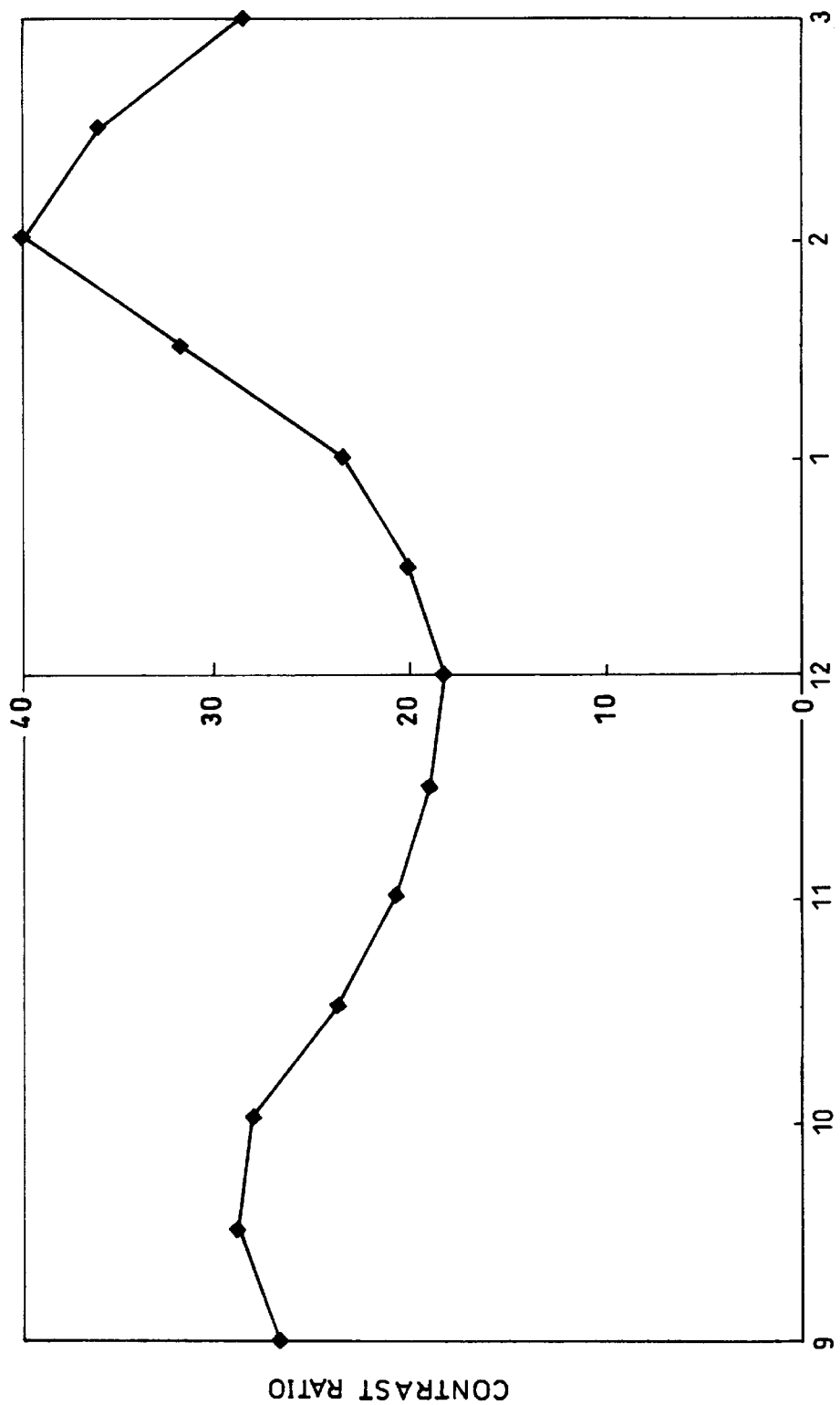
FIG. 43 is a graph showing correlation between the contrast and the azimuth of a display surface of a reflective-type liquid crystal display device of Embodiment 11.

Embodiment 11 had the same arrangement as in Embodiment 10; however, illumination light was projected 30° with respect to the normal direction of the display surface. The ratio of values of reflectance of white and black displays, i.e. contrast, observed in the normal direction was measured moving from the right-hand direction through the upward direction to the left-hand direction. FIG. 43 shows results of the measurement.

As clearly seen in FIG. 43, a contrast ratio of 20 or higher was confirmed in almost all directions, effecting black and white display having a high contrast ratio. If a color filter substrate was used as the upper substrate 4, full color display was possible.

In the present Embodiment, both the biaxial optical retardation compensation plates 36 and 37 and the optical retardation compensation plate 35 having negative dielectric anisotropy were used. It was confirmed, however, that the solo use of the biaxial optical retardation compensation plates 35 and 37, without the optical retardation compensation plate 35 having negative dielectric anisotropy, provided better display characteristics than the solo use of the uniaxial optical retardation compensation plates 8 and 9.

EMBODIMENT 12

Figure 44:
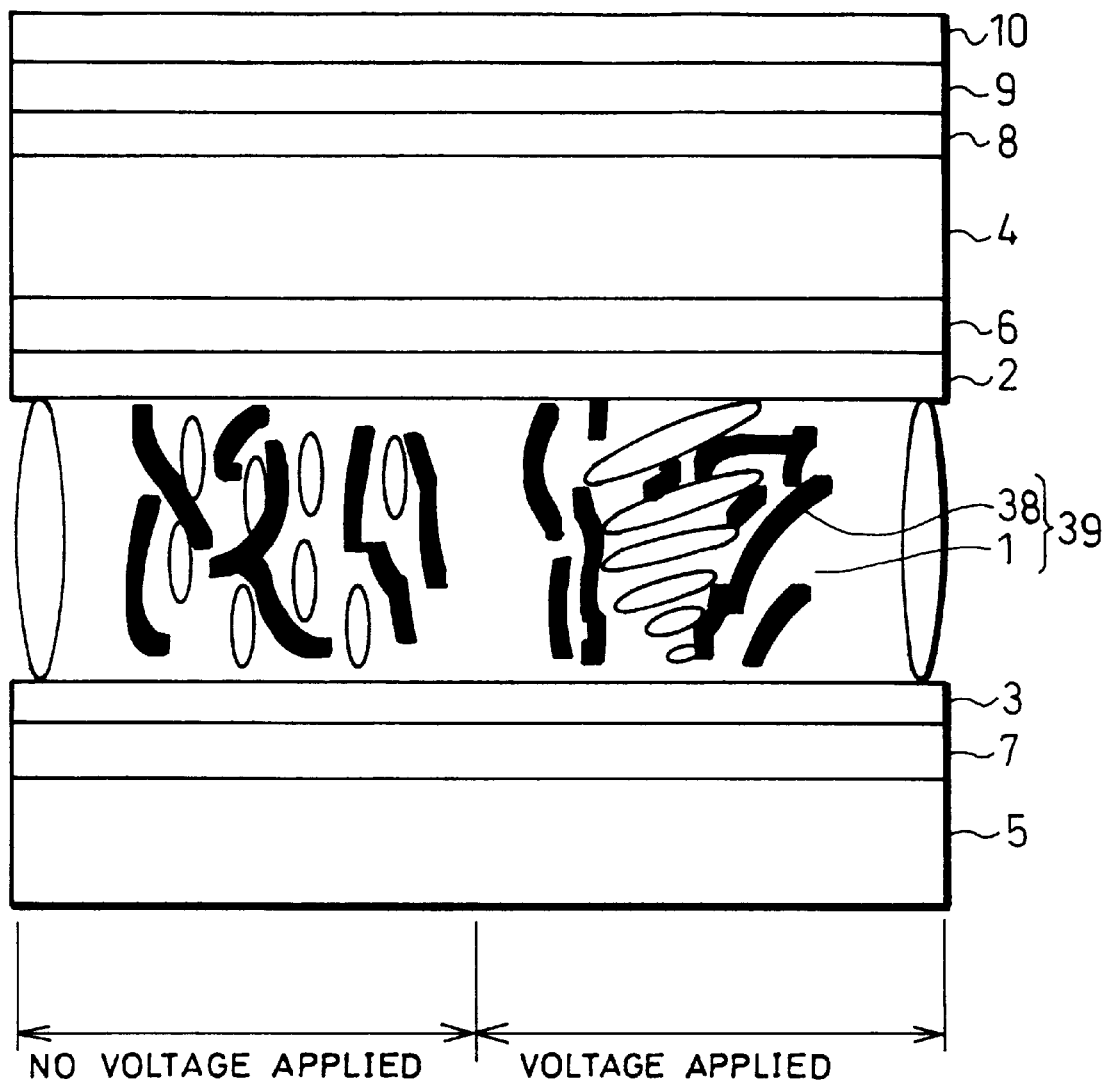
FIG. 44 is a cross-sectional view showing a structure of a reflective-type liquid crystal display device of Embodiment 12.

The following description will discuss Embodiment 12 that is the same as Embodiment 7, except that a polymer precursor was added. As shown in FIG. 44, the reflective-type liquid crystal display device of the present Embodiment, sharing substantially the same arrangement as that of Embodiment 7, included a liquid crystal and polymer compound layer 39 sandwiched between two transparent substrates 4 and 5. The liquid crystal and polymer compound layer 39 was in a state where liquid crystal 1 was dispersed due to phase-separation in a matrix of a cured polymer 38.

The polymer used here needed become phase-separated with liquid crystal 1 if mixed as a polymer precursor with liquid crystal and a polymer initiator and then radiated with an ultraviolet ray (hereinafter, will be referred to as UV light) so as to cure and polymerize. A liquid crystal composition having negative dielectric anisotropy was used as the liquid crystal 1. Hereinafter, the polymer after the UV-irradiation will be referred to as cured polymer. The two upper and lower substrates 4 and 5 included, respectively, a transparent electrode 6 and an electrode 7 on the insides thereof, and vertical alignment films 2 and 3 were formed thereon. A flat thin metal film having mirror properties of high light reflectance was used as the reflective electrode 7.

The vertical alignment films 2 and 3 have properties to align the liquid crystal 1 having negative dielectric anisotropy y sandwich ed by the two substrates vertical to the upper and lower substrates 4 and 5. The liquid crystal 1, being nematic liquid crystal having ordinary electric field responsiveness, effects vertical alignment in the normal direction of the display surface when the electric field is weak, and inclines the alignment with respect to the normal direction of the display surface when the voltage is increased. Meanwhile, the cured polymer 38 is cured as a result of photo-initiated polymerization reaction. The polymer precursor that will be the cured polymer 38 may be a monomer such as acrylate or diacrylate, a dimer thereof, or an oligomer thereof. Further, the polymer precursor is not necessarily optically isotropic in a polymer precursor state, and may be, for example, a liquid crystal monomer having a liquid crystal structure and a functional group. The cured polymer 38, prepared therefrom, may be an optically isotropic polymer or an optically anisotropic polymer having birefringence; however, only in a case where the cured polymer 38 is an optically anisotropic polymer having birefringence, only such a cured polymer that has vertical alignment can be used in the same manner as in a case of a low voltage where alignment is caused by properties of an alignment film. Since the cured polymer 38 cured as a result of photo-initiated polymerization reaction, the cured polymer 38 was solidified and could not respond to electric field. Since the director configuration of the liquid crystal layer 1 was not solidified, when the liquid crystal layer 1 placed in an electric field, the liquid crystal layer 1 aligned parallel to the direction of the electric field.

In the foregoing, when no voltage was applied, the alignments of the liquid crystal layer 1 aligned vertically to the upper and lower substrates 4 and 5. In this state, the liquid crystal cell became transparent by conforming the refractive index of the liquid crystal to that of the polymer. Therefore, good black display could be effected in the same manner as in Embodiment 7.

As an electric field was applied across the liquid crystal and polymer mixture layer 39 by connecting a power supply between the transparent electrode 6 and the electrode 7, the alignment of the liquid crystal layer 1 inclined with respect to the normal direction of the substrate due to the effect of the chiral material added to the liquid crystal. Therefore, a predetermined twist was created, light is scattered due to mismatching of the refractive indices at the interface of the liquid crystal layer 1 and the cured polymer 38, and the liquid crystal cell showed haze. In the foregoing, since a mirror surface was used as the reflective electrode, the hazy liquid crystal layer produced bright display.

In the present Embodiment, a reflective electrode having mirror properties was used; however, the use of a micrometer-scale undulation reflective electrode also effected good display free from specular images of reflected external objects by enhancing scattering of light.

The above descriptions in Embodiments 1 through 12, referring to a reflective-type liquid crystal display device having a vertically aligned liquid crystal layer, explained, among other things, the conditions for improving the contrast, the application to simple matrix drive and active matrix drive methods, and the application to a liquid crystal display device with an integral pressure sensitive input device, provided with a touch panel.

However, as presented in the description on the background art, it was difficult to obtain stable vertical alignment with a vertically aligned liquid crystal layer. In addition, there were still problems to be solved: e.g., when the tilt angle was small, a liquid crystal alignment disturbance due to the application of an external stimulus, such as pressure, to the substrate results in a persistent alignment disturbance or in an alignment defect such as a domain wall. The following description, referring to a reflective-type liquid crystal display device having a vertically aligned liquid crystal layer, will present conditions to solve those problems.

Embodiments 13 through 16, presented in the following in accordance with the conditions of the present invention, are only meant to be illustrative, and by no means restrictive, to the scope of the present invention.

EMBODIMENT 13

The structure of a reflective-type liquid crystal display device of Embodiment 13 in accordance with the present invention is shown in the cross-sectional view of FIG. 1. The reflective-type liquid crystal display device included a pair of flat substrates 4 and 5, the upper substrate 4 being closer to a viewer than the lower substrate 5. An ITO film was formed on the upper substrate 4 by sputtering method to act as a display-purpose transparent electrode 6, whereas an aluminum film was formed on the lower substrate 5 by vacuum deposition method to act as a reflective electrode 7. In the arrangement, an active element could be used as voltage application means for applying a voltage across the electrodes: it goes without saying that the scope of the present invention is not limited to a certain kind of voltage application means.

A polyimide vertical alignment film was formed on the electrodes by spin coating method and baking. Specifically, JALS274 (available from JSR Co., Ltd.) was used, but this was not the only choice available. The method of forming an alignment film was not limited to spin coating method; any conventional method could be used such as dip coating method and screen printing method. Even another alternative was to apply and cure a polymer precursor solution.

In the present Embodiment, tilt angle was provided only to the vertical alignment film 3 of the lower substrate 5 by rubbing processing; however, the alignment films of both the substrate could receive rubbing processing to form even more uniform alignment.

Figure 45:
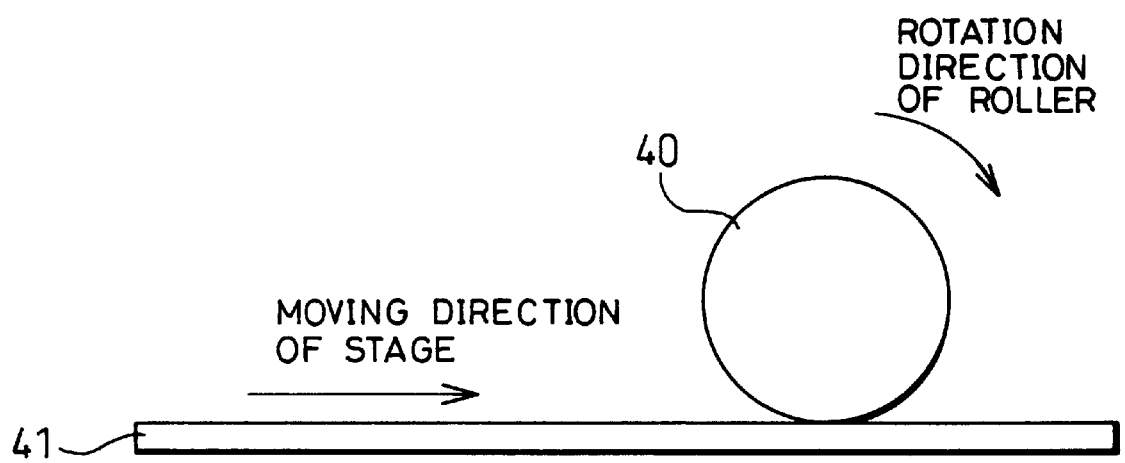
FIG. 45 is an explanatory view schematically showing the structure of a rubbing device used in accordance with the present invention for rubbing processing of a vertical alignment film of a reflective-type liquid crystal display device.

The rubbing device shown in FIG. 45 was used to conduct the rubbing processing during which the stage height was adjusted so that the rubbing cloth came in contact with the substrate appropriately, using various combinations of the roller revolution speed and stage speed. The tilt angles resulting from various conditions were measured with crystal rotation method. An examination on the relationship between the tilt angle and the rubbing density parameter, that was a phenomenal parameter given as a product of the relative speed between the roller revolution speed and the stage speed and the contact time of the substrate and the cloth, revealed that a larger rubbing density parameter resulted in a larger tilt angle. This preliminary analysis clearly determined the manufacturing conditions for arbitrarily controlling the tilt angle in the above range. The following description will explain examples to elucidate the correlation between the tilt angle and the display by preparing liquid crystal display devices with varying tilt angles based in this preliminary experiment.

A nematic liquid crystal layer 1 having negative dielectric anisotropy was sandwiched between the upper and lower substrates 4 and 5. ZLI-2857 (available from Merck Japan Co.) was used as the liquid crystal here; however, this was not the only choice.

A polarizer plate 10 and optical retardation compensation plates 8 and 9 were disposed on the surfaces of the upper substrate 4, on the light-entering side, so that the prepared liquid crystal display device would have good optical characteristics in the vertical direction thereof.

An experiment was conducted regarding recovery for alignment disturbance by prompting alignment disturbance by application of an uneven pressure, as an external stimulus, onto the polarizer plate 10 disposed on the upper substrate 4 and observing the recovery process for the alignment disturbance, so as to examine the correlation between the recovery time and the tilt angle. Applied as an applied voltage in the experiment was a rectangular wave having constant amplitudes of 3V and 5V and a polarity changing at 60 Hz.

Specifically in Embodiment 13, an alignment disturbance was prompted by drawing about five circles of different sizes, each having a diameter not exceeding 2 cm, with a pen head on the upper substrate 4 for a few seconds. Thus such an alignment disturbance that the recovery process therefor could be observed was integrated into the initial state. Although the alignment disturbance could be possibly prompted in a different manner, the above method was effective enough to prompt alignment disturbance of which the recovery process was observable.

Figure 46:
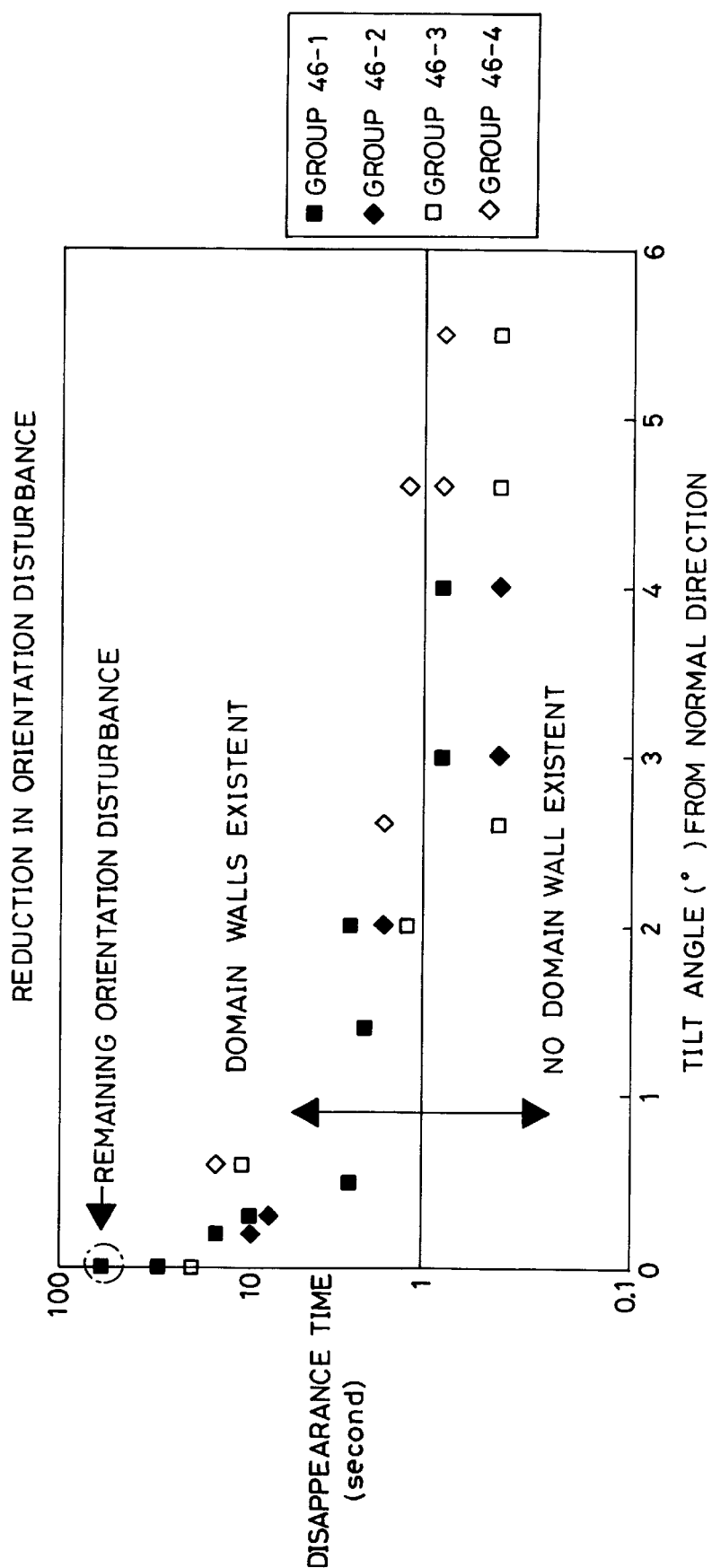
FIG. 46 is a graph showing correlation between the tilt angle and the recovery time for an alignment disturbance of a liquid crystal display device of the thirteenth and fourteenth Embodiments.

The results are shown as the groups 46-1 and 46-2, corresponding to the application voltages of 3V and 5V respectively, in the graph in FIG. 46 having the recovery time (disappearance time) plotted along the axis of ordinates and the tilt angle plotted along the axis of abscissas. Note that an alignment disturbance and a resulting domain wall remaining unrecovered or eliminated for more than 60 seconds were regarded as being persistent, and that since the observation was made visually with human eyes, the alignment disturbances and resulting domain walls annihilated within 0.5 seconds could not be measured. Therefore all the recovery times within 0.5 seconds were regarded as 0.5 seconds.

The groups 46-1 and 46-2 clearly show that if the tilt angle of the liquid crystal molecules on the lower substrate 5 with respect to the normal direction thereof was 2.5° or larger, or preferably 3° or larger taking irregularity in manufacture into account, the alignment disturbance and the resulting domain wall attenuated quickly with no alignment defect remaining unrecovered, and uniform display was stably realized.

Figure 47:
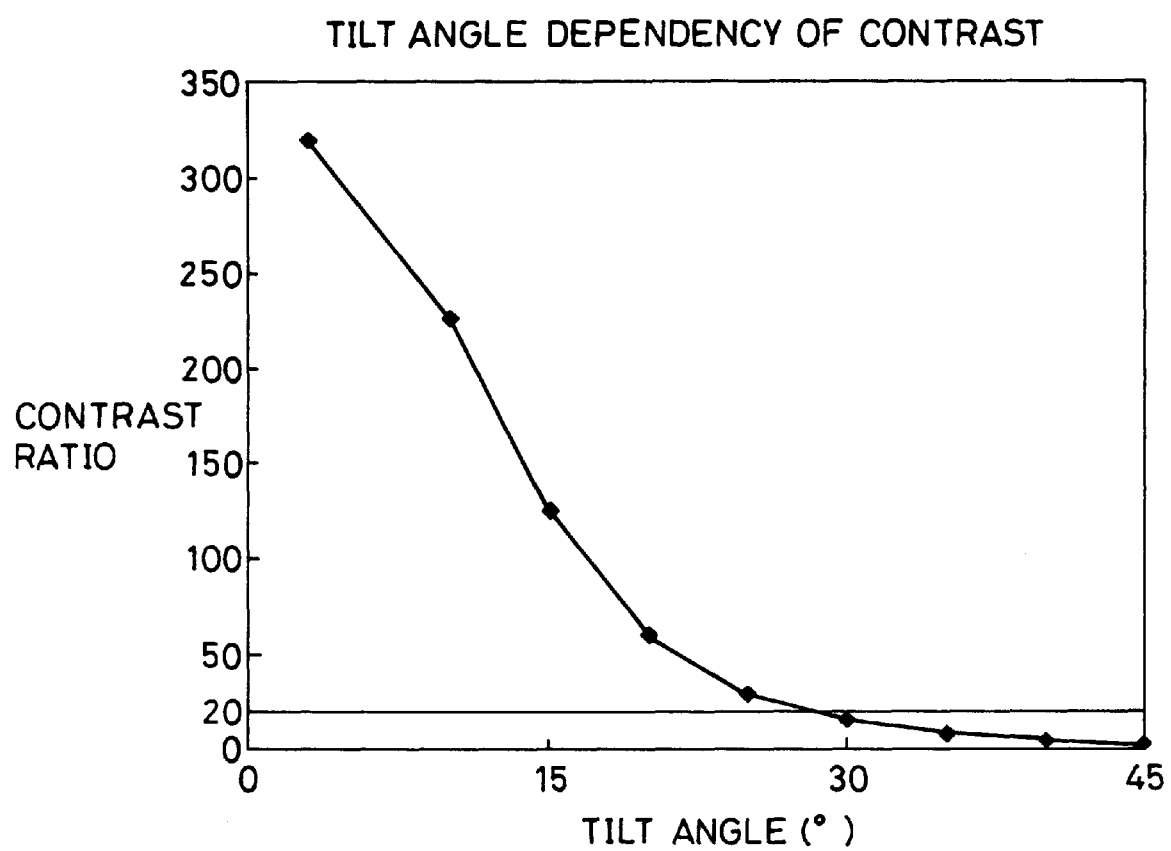
FIG. 47 is a graph showing, for Embodiment 13, characteristics of dependence of the contrast on the tilt angle.

An upper limit of the tilt angle was calculated from the contrast ratio with the liquid crystal display device arranged as above. The upper and lower substrates 4 and 5 were arranged so that the liquid crystal molecules on the upper substrate 4 closer to the viewer were aligned vertical to the upper substrate 4 and that the liquid crystal molecules on the lower substrate 5 were tilted with respect to the normal direction of the lower substrate 5. The contrast was calculated with the tilt angle changing from 0° to 45°. FIG. 47 shows the results. The upper limit of the tilt angle to ensure contrast of not less than 20, that was a commercial standard, was 30° under the vertical light-projecting and vertical light-receiving conditions.

EMBODIMENT 14

Figure 48:
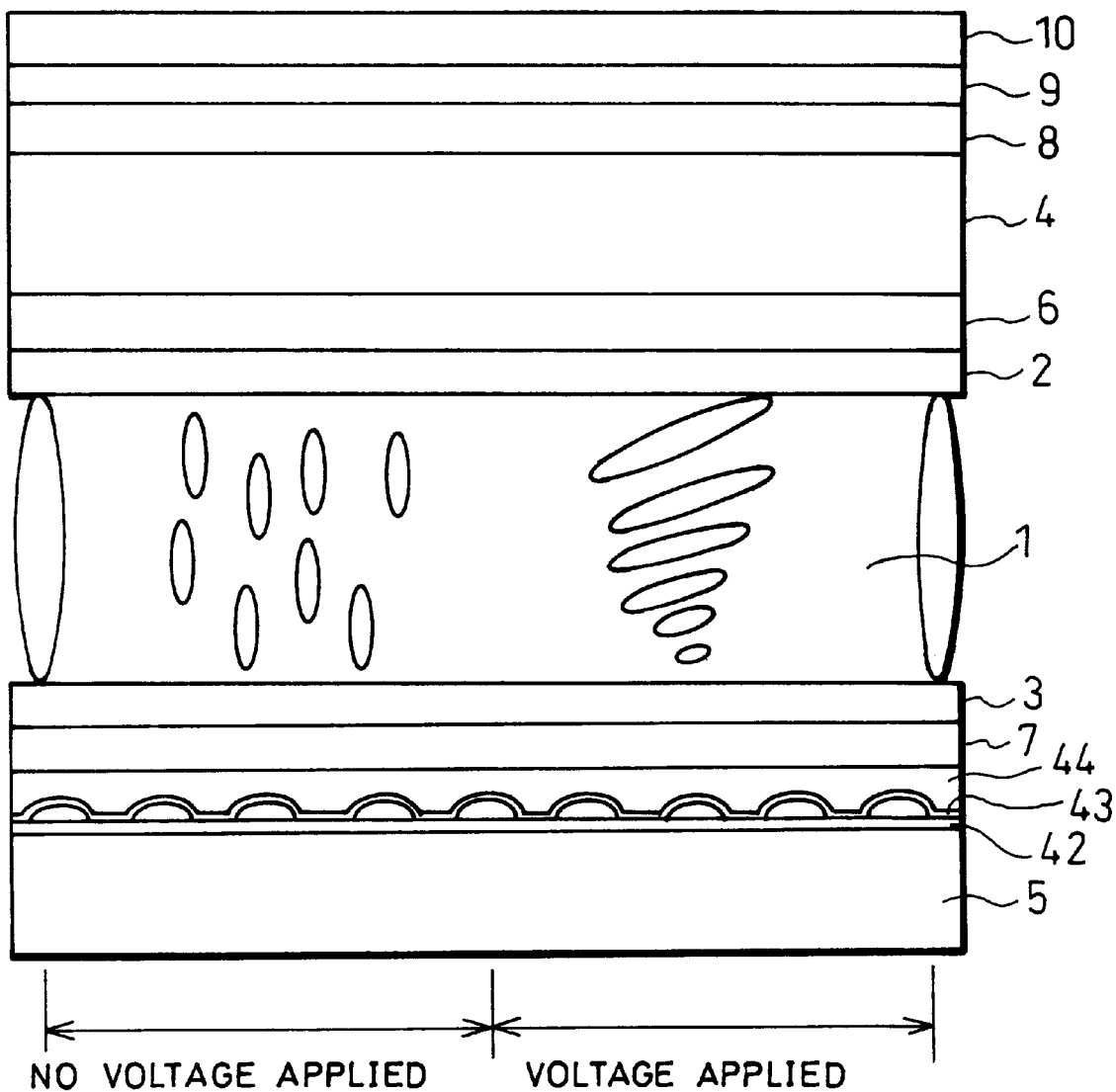
FIG. 48 is a cross-sectional view showing the structure of a liquid crystal display device of Embodiment 14.

FIG. 48 shows a liquid crystal display device of Embodiment 14 in accordance with the present invention. In Embodiment 14, a micro-meter-scale undulation dispersing reflective plate was used as a reflective plate. The micro-meter-scale undulation dispersing reflective plate was specifically prepared by forming an insulating film 42 having continuous micro-meter-scale undulation on the lower substrate 5 and thereafter sequentially forming an aluminum light-reflective film 43, a transparent flattening layer 44, and an ITO transparent electrode 7 on the insulating film 13 by vacuum deposition method, spin coating and curing method, and sputtering method respectively. Then, as in Embodiment 13, a polyimide vertical alignment film was formed by spin coating method and baking, and subjected to rubbing processing to provide a tilt angle. The liquid crystal display device had the same arrangement on the side of the substrate 4 as in Embodiment 13.

The relation between the direction of the axes of the liquid crystal molecules and the direction of reflected light differed when the reflective plate was flat as in Embodiment 13 and when the micro-meter-scale undulation dispersing reflective plate was used as in the present Embodiment. Since different results could be possibly obtained from those of Embodiment 13, an experiment was conducted on the liquid crystal display device adopting the micro-meter-scale undulation dispersing reflective plate so as to observe the recovery process for alignment t disturbance with the same method as in Embodiment 13.

The result s are shown as the groups 46-3 and 46-4, corresponding to the application voltages of 3V and 5V respectively, in the graph in FIG. 46. The groups 46-3 and 46-4 showed no significant difference from the groups 46-1 and 46-2 for r the flat reflective plate.

This is presumably due to the following reasons. That is, it is presumed that the relation between the direction of the a×θs of the liquid crystal molecules and the direction of reflected light, partly differing depending upon whether the flat reflective plate or the micro-meter-scale undulation dispersing reflective plate was used, does not affect the overall averaged results.

Further, as other reasons, since the electricfield on the reflective electrode was parallel to the normal direction of the substrate, it is presumed that the liquid crystal molecules were always tilted a certain angle in a certain invariable direction when viewed from the direction of the electric field.

Further, by using the micro-meter-scale undulation dispersing reflective plate as a reflective plate, the substantially same alignment recovery as with the flat reflective plate was achieved with the same tilt angle as that of the flat reflective plate as previously mentioned, and far superior reflection characteristics were also realized with no unnecessary dispersion compared to the flat reflective plate.

The results show that the present Embodiment was effective not only to the micro-meter-scale undulation designed for light dispersion, but also to micro-meter-scale undulation fundamentally not designed for light dispersion, such as a contact hole used in a three-dimensional wiring structure connecting a pixel drive electrode to a voltage application element for an active matrix substrate.

EMBODIMENT 15

The liquid crystal display device of Embodiment 13 (see FIG. 1) was modified as Embodiment 15 to prepare Sample A and Sample B having respective tilt angles of 0.2° and 4.5°. V10 and V90 were measured by measuring the voltage versus reflectance characteristics. Here, V10 and V90 denote voltages providing respective reflectances of 10% and 90% where the maximum reflectance was designated as 100% and the minimum reflectance was designated as 0%.

The two liquid crystal display device samples A and B were measured for the response times with an ON voltage being set to 3.5V and OFF voltage being set to 1.4V. Table 1 shows the results. The response time in Table 1 is expressed in the sum of a rising time and a falling time.

TABLE 1

|  | Tilt Angle (°) | V10 (V) | V90 (V) | Response Time (msec) |
| --- | --- | --- | --- | --- |
| Sample A | 0.2 | 2.6 | 3.2 | 197.8 |
| Sample B | 4.5 | 2.1 | 2.9 | 62.5 |

As clearly seen in Table 1, a larger tilt angle reduced the driving voltage and displayed images to be changed in a shorter response time. The arrangement of the liquid crystal display device shown in FIG. 1, using a polarizer plate and two optical retardation compensation plates, could hence realize, at a low driving voltage and a shorter response time, good dark display when no voltage was applied and good white display when a voltage was applied.

EMBODIMENT 16

An analysis was made on response time of the liquid crystal display device shown in FIG. 1 as Embodiment 16 by solving with a computer an equation of motion according to the continuum theory of liquid crystal for the case where the alignment of the liquid crystal molecules on the surface of the lower substrate 5 was vertical to the lower substrate 5 and the alignment of the liquid crystal molecules on the surface of the upper substrate 4 toward the viewer was inclined (0.5°, 3°, and 5°) with respect to the normal direction of the upper substrate 4. The equation of motion according to the continuum theory of liquid crystal is explained in detail by, for example, P. G. de Gennes and J. Prost, *The Physics of Liquid Crystals*, 2nd Edition, Oxford University Press, 1993.

Figure 49:
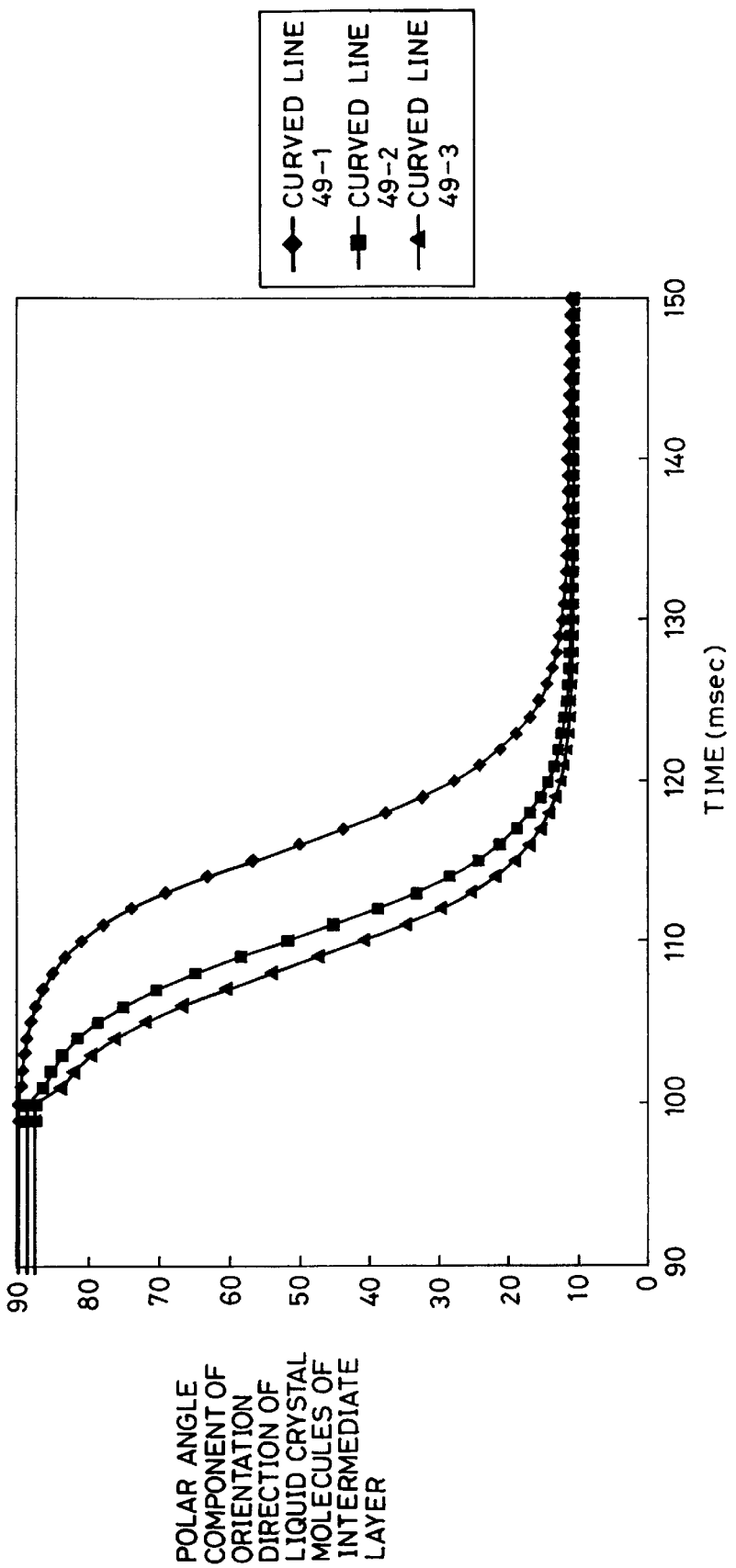
FIG. 49 is a graph showing, for Embodiment 16, time dependent characteristics of a polar angle component of the alignment of liquid crystal molecules when a 5V step voltage is applied.

First, time variation of the polar angle component was calculated along the alignment of the liquid crystal molecules, of the liquid crystal layer 1, equally distanced from the upper and lower substrates when a 5V step voltage was applied. FIG. 49 shows the results. The axis of ordinates represents the polar angle component of the alignment of the liquid crystal molecules equally distanced from the upper and lower substrates, whereas the axis of abscissas represents elapsed time. Here, the polar angle component of the alignment of the liquid crystal molecules was set to be 0° along the substrate and 90° along the normal direction of the substrate, and the applied voltage was maintained at 0V from right after the application to 100 ms and 5V after 100 ms. The results are shown as the curved lines 49-1, 49-2, and 49-3, corresponding to the respective tilt angles, of the liquid crystal molecules on the surface of the upper substrate 4 toward the viewer, of 0.5°, 3°, and 5°. FIG. 49 clearly shows that a larger tilt angle speeded up the response.

Next, the same analysis was made on a liquid crystal display device having twisted liquid crystal in the liquid crystal layer 1. Here, the response time was defined as a period of time starting from the application of voltage until the polar angle component of the alignment of the liquid crystal molecules equally distanced from the upper and lower substrates equaled 10% when the polar angle component of the alignment of the liquid crystal molecules equally distanced from the upper and lower substrates was specified to 100% and 0% before the application of a voltage and after a substantial amount of time had elapsed after the application of a voltage. The twist angle of the liquid crystal layer 1 was adjusted so that $|d/p|$ equaled 0, 0.25, and 0.5 where d was a liquid crystal layer thickness and p was a helical pitch.

In other words, $|d/p|$ of 0 corresponds to the above case where the twist angle equals 0°. $|d/p|$ of 1 corresponds to the liquid crystal molecules revolving 360° from the lower substrate 5 to the upper substrate 4. In order to twist the liquid crystal molecules in the liquid crystal layer 1, cholesteric liquid crystal that voluntarily twists could be used, or a chiral agent could be added. The tilt angle of the liquid crystal molecules on the surface of the upper substrate 4 with respect to the normal direction of the substrate was set to 0.5°, 3°, and 5° in the same manner as the above case where the twist angle equaled 0°. Table 2 shows the results of calculations for the response time.

TABLE 2

|  | Tilt Angle | | |
| --- | --- | --- | --- |
| $|d/p|$ | 0.5° | 3° | 5° |
| 0 | 22.8 ms | 17.0 ms | 15.3 mn |
| 0.25 | 22.4 ms | 16.7 ms | 15.0 ms |
| 0.5 | 20.6 ms | 15.2 ms | 13.6 ms |

As clearly seen in Table 2, a larger tilt angle speeded up the response, regardless of the value of $|d/p|$ and that an applicable value was obtained when the tilt angle was 3°. It was also found that the response time could be further reduced by the twisting.

A reflective-type liquid crystal display device was used in Embodiments 13 through 16. However, optical effects by the time that incident light exited were exactly the same as with the transparent liquid crystal display device and the reflective-type liquid crystal display device, except that the optical path included both the entering path and exiting path or included only the entering path. Therefore, it goes without saying that the present invention was applicable to a transparent liquid crystal display device as well as to a reflective-type liquid crystal display device by replacing the electrode 7 with a transparent electrode and using a transparent substrate as the lower substrate 5 to allow incident light to enter at the lower substrate 5. The same holds true with a trans-flective liquid crystal display device, that was a liquid crystal display device composed partly of a transparent liquid crystal display device and partly of a reflective-type liquid crystal display device.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A reflective-type liquid crystal display device, comprising:

a first substrate including a light-reflective electrode;

a transparent second substrate including a transparent electrode;

a nematic liquid crystal layer, sandwiched between the first and second substrates, having negative dielectric anisotropy and twisting with application of a voltage;

a plurality of optical retardation compensation plates disposed on a light-entering side of the second substrate; and a single polarizer plate disposed on the light-entering side of the second substrate;

wherein surfaces, of the first and second substrates, that are in contact with the liquid crystal layer undergo substantially vertical alignment processing and the single polarizer plate is the only polarizer plate of the reflective-type liquid crystal display device, and wherein the liquid crystal layer has a natural pitch p, a layer thickness d, and a refractive index difference $\Delta n$ with respect to characteristic polarization thereof selected so as to satisfy $0<|d/p|<1$ and $135$ nm $\leq \Delta n \times d \leq 1200$ nm.

2. The reflective-type liquid crystal display device as defined in claim 1, wherein the liquid crystal layer satisfies $0<|d/p|\leq 0.7$ and $200$ nm $\leq \Delta n \times d \leq 1200$ nm.

3. The reflective-type liquid crystal display device as defined in claim 1, wherein liquid crystal molecules on only one of the first and second substrates have an approximately uniform alignment tilted at a certain angle with respect to a normal direction of that substrate, and the liquid crystal layer satisfies $0.22\leq|d/p|\leq 0.42$ and $200$ nm $\leq \Delta n \times d \leq 650$ nm.

4. The reflective-type liquid crystal display device as defined in claim 1, wherein liquid crystal molecules on only one of the first and second substrates have an approximately uniform alignment, titled at a certain angle with respect to a normal direction of that substrate, and the liquid crystal layer satisfies $0.14\leq|d/p|\leq 0.34$ and $135$ nm $\leq \Delta n \times d \leq 350$ nm.

5. The reflective-type liquid crystal display device as defined in claim 1, wherein liquid crystal molecules on both the first and second substrates have an approximately uniform alignment, titled at a certain angle with respect to a normal direction of the respective first and second substrates, the liquid crystal layer satisfies $200$ nm $\leq \Delta n \times d \leq 650$ nm, and liquid crystal molecules on the first and second substrates satisfy $0°\leq\theta 1\leq 200°$ or $250°\leq\theta 1\leq 360°$ where $\theta 1$ is an angle formed by an alignment of the liquid crystal molecules on the first substrate and an alignment of the liquid crystal molecules on the second substrate, and the angle is measured counter-clockwise looking from the light-entering side of the second substrate.

6. The reflective-type liquid crystal display device as defined in claim 5, wherein the liquid crystal layer satisfies $|d/p|=-\theta 1/1000+0.40\pm 0.1$ if the angle formed by the alignment of the liquid crystal molecules on the first substrate and the alignment of the liquid crystal molecules on the second substrate is smaller than $225°$, and the liquid crystal layer satisfies $|d/p|=-\theta 1/1000+0.76\pm 0.1$ if the angle formed by the alignment of the liquid crystal molecules on the first substrate and the alignment of the liquid crystal molecules on the second substrate is larger than $225°$.

7. The reflective-type liquid crystal display device as defined in claim 1, wherein liquid crystal molecules on both the first and second substrates have an approximately uniform alignment, tilted at a certain angle with respect to a normal direction of the respective substrates, the liquid crystal layer satisfies $0.1\leq|d/p|\leq 0.5$ and $600$ nm $\leq \Delta n \times d \leq 1200$ nm, and liquid crystal molecules on the first and second substrates satisfy $200°\leq\theta 1\leq 250°$ where $\theta 1$ is an angle formed by the alignment of the liquid crystal molecules on the first substrate and the alignment of the liquid crystal molecules on the second substrate, and the angle is measured counter-clockwise from the light-entering side of the second substrate.

8. The reflective-type liquid crystal display device as defined in claim 3, wherein the alignment of the liquid crystal molecules having the uniform alignment forms an angle $\theta 2$ with a transmission axis of the polarizer plate disposed on the second substrate so as to satisfy $90°\leq\theta 2\leq 165°$.

9. The reflective-type liquid crystal display device as defined in claim 4, wherein the alignment of the liquid crystal molecules having the uniform alignment forms an angle $\theta 2$ with a transmission axis of the polarizer plate disposed on the second substrate so as to satisfy $90°\leq\theta 2\leq 165°$.

10. The reflective-type liquid crystal display device as defined in claim 3, wherein the alignment of the liquid crystal molecules having the uniform alignment forms an angle $\theta 2$ with a transmission axis of a polarizer plate disposed on the second substrate so as to satisfy $-15°\leq\theta 2\leq 90°$.

11. The reflective-type liquid crystal display device as defined in claim 4, wherein the alignment of the liquid crystal molecules having the uniform alignment forms an angle $\theta 2$ with a transmission axis of a polarizer plate disposed on the second substrate so as to satisfy $-15°\leq\theta 2\leq 90°$.

12. The reflective-type liquid crystal display device as defined in claim 1, wherein the plurality of optical retardation compensation plates include:

a first optical retardation compensation plate specified to have a retardation not less than 100 nm and not more than 180 nm in a normal direction of the second substrate; and a second optical retardation compensation plate disposed on the first optical retardation compensation plate and specified to have a retardation not less than 200 nm and not more than 360 nm in the normal direction of the second substrate, and polarizer plate and the first and second optical retardation compensation plates are disposed so as to satisfy $35°\leq|2\times\theta 4-\theta 3|\leq 55°$ where $\theta 3$ is an angle formed by a transmission axis of the polarizer plate and a slow axis of the first optical retardation compensation plate and $\theta 4$ is an angle formed by the transmission axis of the polarizer plate and a slow axis of the second optical retardation compensation plate.

13. The reflective-type liquid crystal display device as defined in claim 1, wherein the plurality of optical retardation compensation plates include:

a first optical retardation compensation plate specified to have a retardation not less than 10 m and not more than 180 nm in a normal direction of the second substrate;

a second optical retardation compensation plate disposed on the first optical retardation compensation plate and specified to have a retardation not less than 200 nm and not more than 360 nm in the normal direction of the second substrate; and a third optical retardation compensation plate disposed on the second optical retardation compensation plate and specified to have a retardation not less than 200 nm and not more than 360 nm in the normal direction of the second substrate, and polarizer plate and the first, second, and third optical retardation compensation plates are disposed so as to satisfy $35° \leq |\theta3-2\times(\theta4-\theta5)| \leq 55°$, where $\theta3$ is an angle formed by a transmission axis of the polarizer plate and a slow axis of the first optical retardation compensation plate, $\theta4$ is an angle formed by the transmission axis of the polarizer plate and a slow axis of the second optical retardation compensation plate, and $\theta5$ is an angle formed by the transmission axis of the polarizer plate and a slow axis of the third optical retardation compensation plate.

14. The reflective-type liquid crystal display device of claim 1, wherein the plurality of optical retardation compensation plates consists of two plates.

15. The reflective-type liquid crystal display device of claim 1, wherein the plurality of optical retardation compensation plates consists of three plates.

16. The reflective-type liquid crystal display device of claim 1, wherein liquid crystal molecules on a surface of at least one of the first and second substrates tilt 3° to 30° with respect to normal direction of that substrate.

17. An integrated input and display device including a pressure sensitive input device integrated with the reflective-type liquid crystal display device of claim 1.

18. A portable electronic device including the integrated input and display device of claim 17.

19. The reflective-type liquid crystal display device of claim 1, further comprising:

an active element, operatively connected to at least one of the transparent and light-reflective electrodes, for supplying voltage thereto.

20. The reflective-type liquid crystal display device of claim 1, wherein the single polarizer plate linearly polarizes light and the plurality of optical retardation compensation plates change the linearly polarized light to circularly polarized light.

21. A reflective-type liquid crystal display device, comprising:

a first substrate including a light-reflective electrode;

a transparent second substrate including a transparent electrode;

a nematic liquid crystal layer, sandwiched between the first and second substrates, having negative dielectric anisotropy, and twisting with application of a voltage;

a plurality of optical retardation compensation plates disposed on a light-entering side of the second substrate; and a single polarizer plate disposed on the light-entering side of the second substrate, wherein surfaces, of the first and second substrates, that are in contact with the liquid crystal layer undergo substantially vertical alignment processing and the single polarizer plate is the only polarizer plate of the reflective-type liquid crystal display device, and wherein liquid crystal molecules on a surface of at least one of the first and second substrates tilt 3° to 30° with respect to normal direction of that substrate.

22. The reflective-type liquid crystal display device as defined in claim 1, wherein at least one of the plurality of optical retardation compensation plates disposed on the second substrate satisfies nx>nz>ny, where x and y are directions that are parallel to surfaces of the first and second substrates and mutually perpendicular, z is a direction perpendicular to the surfaces of the first and second substrates, and nx, ny, and nz are refractive indices in the x-, y-, and z-directions.

23. The reflective-type liquid crystal display device as defined in claim 1, further comprising an optical retardation compensation plate, disposed between the second substrate and the plurality of optical retardation compensation plates disposed on the second substrate, having a refractive index satisfying nx=ny>nz and substantially equal to the product of the refractive index difference of the liquid crystal layer with respect to characteristic polarization and the layer thickness of the liquid crystal layer.

24. The reflective-type liquid crystal display device as defined in claim 1, wherein the light-reflective electrode has a surface provided with a light-reflective film having smooth continuous micro-meter-scale undulated surface, and the light-reflective film also acts as a voltage application electrode for applying a voltage across the liquid crystal layer with the transparent electrode on the second substrate as an opposite electrode.

25. The reflective-type liquid crystal display device as defined in claim 21, wherein the light-reflective electrode has a surface provided with a light-reflective film having smooth continuous micro-meter-scale undulated surface, and the light-reflective electrode also acts as a voltage application electrode for applying a voltage across the liquid crystal layer with the transparent electrode on the second substrate as an opposite electrode.

26. The reflective-type liquid crystal display device as defined in claim 24, wherein the light-reflective film formed on the surface of the light-reflective electrode has a shape of micro-meter-scale undulation with a mean period of micro-meter-scale undulation variable depending upon a direction in the plane of the substrate.

27. The reflective-type liquid crystal display device as defined in claim 18, wherein the light-reflective film formed on the surface of the light-reflective electrode has a shape micro-meter-scale undulation with a mean period of micro-meter-scale undulation variable depending upon a direction in the plane of the substrate.

28. The reflective-type liquid crystal display device as defined in claim 26, wherein a viewing angle of a viewer is determined to be on a plane defined by a normal direction of a display surface and a direction along which the period of micro-meter-scale undulation of the light-reflective electrode is relatively short.

29. The reflective-type liquid crystal display device as defined in claim 27, wherein a viewing angle of a viewer is determined to be on a plane defined by a normal direction of a display surface and a direction along which the period of micro-meter-scale undulation of the light-reflective electrode is relatively short.

30. The reflective-type liquid crystal display device as defined in claim 1, further comprising a planar pressure sensitive element, provided with a layer-shaped empty space and sandwiched between the second substrate and the optical retardation compensation plate disposed on the light-entering side of the second substrate, for detecting an external pressing force.

31. The reflective-type liquid crystal display device as defined in claim 21, further comprising a planar pressure sensitive element, provided with a layer-shaped empty space and sandwiched between the second substrate and the optical retardation compensation plate disposed on the light-entering side of the second substrate, for detecting an external pressing force.

32. An integrated input and display device including a pressure sensitive input device integrated with the reflective-type liquid crystal display device of claim 21.

33. A portable electronic device including the integrated input and display device of claim 32.

34. The reflective-type liquid crystal display device of claim 21, further comprising: an active element, operatively connected to at least one of the transparent and light-reflective electrodes, for supplying voltage thereto.

35. The reflective-type liquid crystal display device of claim 21, wherein the single polarizer plate linearly polarizes light and the plurality of optical retardation compensation plates change the linearly polarized light to circularly polarized light.

* * * * *

UNITED STATES PATENT AND TRADEMARK OFFICE
CERTIFICATE OF CORRECTION

PATENT NO. : 6,108,064
DATED : August 22, 2000
INVENTOR(S): Kiyoshi MINOURA et al.

It is certified that error appears in the above-identified patent and that said Letters Patent are hereby corrected as shown below:

In category [30] Foreign Application Priority Data, please change the last cited application
    from "Jul. 27, 1998 [JP] Japan .. .. .. .. .. .. .. .. .. .. .. .. 10-2101145"
    to -- Jul. 27, 1998 [JP] Japan .. .. .. .. .. .. .. .. .. .. .. .. 10-210145 --

Signed and Sealed this

Eighth Day of May, 2001

Attest:

NICHOLAS P. GODICI

*Attesting Officer*      *Acting Director of the United States Patent and Trademark Office*